(12) United States Patent
Verdan et al.

(10) Patent No.: US 10,552,050 B1
(45) Date of Patent: Feb. 4, 2020

(54) MULTI-DIMENSIONAL COMPUTER STORAGE SYSTEM

(71) Applicant: BiTMICRO LLC, Reston, VA (US)

(72) Inventors: Marlon B. Verdan, Fremont, CA (US); Ricardo H. Bruce, Fremont, CA (US)

(73) Assignee: BiTMICRO LLC, Reston, VA (US)

( * ) Notice: Subject to any disclaimer, the term of this patent is extended or adjusted under 35 U.S.C. 154(b) by 0 days.

(21) Appl. No.: 15/482,684

(22) Filed: Apr. 7, 2017

(51) Int. Cl.
*G06F 3/06* (2006.01)
*G06F 12/1081* (2016.01)

(52) U.S. Cl.
CPC ............ *G06F 3/0611* (2013.01); *G06F 3/065* (2013.01); *G06F 3/0619* (2013.01); *G06F 3/0659* (2013.01); *G06F 3/0688* (2013.01); *G06F 12/1081* (2013.01); *G06F 2212/656* (2013.01)

(58) Field of Classification Search
None
See application file for complete search history.

(56) References Cited

U.S. PATENT DOCUMENTS

| | | | |
|---|---|---|---|
| 4,402,040 A | 8/1983 | Evett | |
| 4,403,283 A | 9/1983 | Myntii et al. | |
| 4,752,871 A | 6/1988 | Sparks | |
| 4,967,344 A | 10/1990 | Scavezze et al. | |
| 5,111,058 A | 5/1992 | Martin | |
| RE34,100 E | 10/1992 | Hartness | |
| 5,222,046 A | 6/1993 | Kreifels et al. | |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

Office Action for U.S. Appl. No. 14/215,414 dated May 20, 2016.

(Continued)

*Primary Examiner* — Michael Alsip
(74) *Attorney, Agent, or Firm* — Jackson Walker L.L.P.

(57) ABSTRACT

In an embodiment of the invention, an apparatus comprises: a multi-dimensional memory that is expandable in a first direction; wherein the multi-dimensional memory comprises a serial chain; wherein the serial chain comprises a first serial chain that is expandable in a first direction; and wherein the first serial chain comprises a first memory controller, a first memory module coupled to the first memory controller, a second memory controller coupled to the first memory controller, and a second memory module coupled to the second memory controller. In another embodiment of the invention, a method comprises: providing a multi-dimensional memory that is expandable in a first direction; wherein the multi-dimensional memory comprises a serial chain; wherein the serial chain comprises a first serial chain that is expandable in a first direction; and wherein the first serial chain comprises a first memory controller, a first memory module coupled to the first memory controller, a second memory controller coupled to the first memory controller, and a second memory module coupled to the second memory controller. Data can be stored into the serial chain, wherein the data is written by a memory transaction from a host.

13 Claims, 24 Drawing Sheets

(56) References Cited

U.S. PATENT DOCUMENTS

| | | | |
|---|---|---|---|
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A * | 10/1998 | Bruce .................. G06F 11/1068 365/185.33 |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,624,506 B2 * | 9/2003 | Sasaki .................. H01L 23/481 257/686 |
| 6,678,754 B1 | 1/2004 | Soulier |
| 6,728,840 B1 | 4/2004 | Shatil et al. |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischer et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 5/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 | 2/2009 | Pope et al. |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2 | 8/2011 | Bond et al. |
| 8,010,740 B2 | 10/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 5/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |

(56) References Cited

U.S. PATENT DOCUMENTS

| | | |
|---|---|---|
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1* | 4/2003 | Pecone ............... G06F 13/28 710/62 |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0158808 A1* | 7/2007 | Bruce ................. H01L 25/0655 257/686 |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |

(56) References Cited

U.S. PATENT DOCUMENTS

| | | | |
|---|---|---|---|
| 2012/0271967 | A1 | 10/2012 | Hirschman |
| 2012/0303924 | A1 | 11/2012 | Ross |
| 2012/0311197 | A1 | 12/2012 | Larson et al. |
| 2012/0324277 | A1 | 12/2012 | Weston-Lewis et al. |
| 2013/0010058 | A1 | 1/2013 | Pomeroy |
| 2013/0019053 | A1 | 1/2013 | Somanache et al. |
| 2013/0073821 | A1 | 3/2013 | Flynn et al. |
| 2013/0094312 | A1 | 4/2013 | Jang et al. |
| 2013/0099838 | A1 | 4/2013 | Kim et al. |
| 2013/0111135 | A1 | 5/2013 | Bell, Jr. et al. |
| 2013/0206837 | A1 | 8/2013 | Szu |
| 2013/0208546 | A1 | 8/2013 | Kim et al. |
| 2013/0212337 | A1 | 8/2013 | Maruyama |
| 2013/0212349 | A1 | 8/2013 | Maruyama |
| 2013/0212425 | A1 | 8/2013 | Blaine et al. |
| 2013/0246694 | A1 | 9/2013 | Bruce et al. |
| 2013/0254435 | A1 | 9/2013 | Shapiro et al. |
| 2013/0262750 | A1 | 10/2013 | Yamasaki et al. |
| 2013/0282933 | A1 | 10/2013 | Jokinen et al. |
| 2013/0304775 | A1 | 11/2013 | Davis et al. |
| 2013/0339578 | A1 | 12/2013 | Ohya et al. |
| 2013/0339582 | A1 | 12/2013 | Olbrich et al. |
| 2013/0346672 | A1 | 12/2013 | Sengupta et al. |
| 2014/0068177 | A1 | 3/2014 | Raghavan |
| 2014/0095803 | A1 | 4/2014 | Kim et al. |
| 2014/0104949 | A1 | 4/2014 | Bruce et al. |
| 2014/0108869 | A1 | 4/2014 | Brewerton et al. |
| 2014/0189203 | A1 | 7/2014 | Suzuki et al. |
| 2014/0258788 | A1 | 9/2014 | Maruyama |
| 2014/0285211 | A1 | 9/2014 | Raffinan |
| 2014/0331034 | A1 | 11/2014 | Ponce et al. |
| 2015/0006766 | A1 | 1/2015 | Ponce et al. |
| 2015/0012690 | A1 | 1/2015 | Bruce et al. |
| 2015/0032937 | A1 | 1/2015 | Salessi |
| 2015/0032938 | A1 | 1/2015 | Salessi |
| 2015/0067243 | A1 | 3/2015 | Salessi et al. |
| 2015/0149697 | A1 | 5/2015 | Salessi et al. |
| 2015/0149706 | A1 | 5/2015 | Salessi et al. |
| 2015/0153962 | A1 | 6/2015 | Salessi et al. |
| 2015/0169021 | A1 | 6/2015 | Salessi et al. |
| 2015/0261456 | A1 | 9/2015 | Alcantara et al. |
| 2015/0261475 | A1 | 9/2015 | Alcantara et al. |
| 2015/0261797 | A1 | 9/2015 | Alcantara et al. |
| 2015/0370670 | A1 | 12/2015 | Lu |
| 2015/0371684 | A1 | 12/2015 | Mataya |
| 2015/0378932 | A1 | 12/2015 | Souri et al. |
| 2016/0026402 | A1 | 1/2016 | Alcantara et al. |
| 2016/0027521 | A1 | 1/2016 | Lu |
| 2016/0041596 | A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Office Action dated Dec. 5, 2014 for U.S. Appl. No. 14/038,684.
Office Action dated Oct. 8, 2015 for U.S. Appl. No. 14/217,291.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Robert Cooksey et al., A Stateless, Content-Directed Data Prefetching Mechanism, Copyright 2002 ACM.
Office Action for U.S. Appl. No. 14/866,946 dated Jul. 27, 2017.
Office Action for U.S. Appl. No. 14/616,700 dated Jun. 2, 2017.
Office Action for U.S. Appl. No. 15/268,533 dated Jun. 2, 2017.
Office Action for U.S. Appl. No. 15/268,536 dated Apr. 27, 2017.
Office Action for U.S. Appl. No. 15/368,598 dated May 19, 2017.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action for U.S. Appl. No. 14/217,096 dated Jul. 12, 2016.
Notice of Allowance for U.S. Appl. No. 14/217,399 dated Jul. 20, 2016 (Mailed in this current application).
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Office Action for U.S. Appl. No. 14/216,937 dated Aug. 15, 2016.
Working Draft American National Standard Project T10/1601-D Information Technology Serial Attached SCSI—1.1 (SAS-1.1), Mar. 13, 2004 Revision 4.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.

(56) References Cited

OTHER PUBLICATIONS

Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Office Action for U.S. Appl. No. 14/217,291 dated Jun. 15, 2016.
Notice of allowance/allowability for U.S. Appl. No. 14/217,041 dated Apr. 11, 2016.
Notice of allowance/allowability for U.S. Appl. No. 14/803,107 dated Mar. 28, 2016.
Office Action for U.S. Appl. No. 14/217,334 dated Apr. 4, 2016.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution, http://www.design-reuse.com/news/35111/nxgn-data-intelligent-solutions.html, printed on Feb. 13, 2016.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Office Action for U.S. Appl. No. 13/475,878, dated Jun. 23, 2014.
Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
Notice of allowance/allowability for U.S. Appl. No. 14/214,216 dated Apr. 27, 2016.
Notice of allowance/allowability for U.S. Appl. No. 14/217,436 dated May 6, 2016.
Office Action for U.S. Appl. No. 14/616,700 dated Oct. 20, 2016.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Notice of allowance/allowability for U.S. Appl. No. 14/217,365 dated Oct. 18, 2016.
Office Action for U.S. Appl. No. 14/217,249 dated Apr. 21, 2016.
Notice of allowance/allowability for U.S. Appl. No. 14/217,467 dated Apr. 20, 2016.
Advisory Action for U.S. Appl. No. 14/690,305 dated Nov. 25, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version 2013-04-01, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Advisory Action for U.S. Appl. No. 14/217,334 dated Jun. 13, 2016.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Notice of allowance/allowability for U.S. Appl. No. 13/253,912 dated Mar. 21, 2016.

* cited by examiner

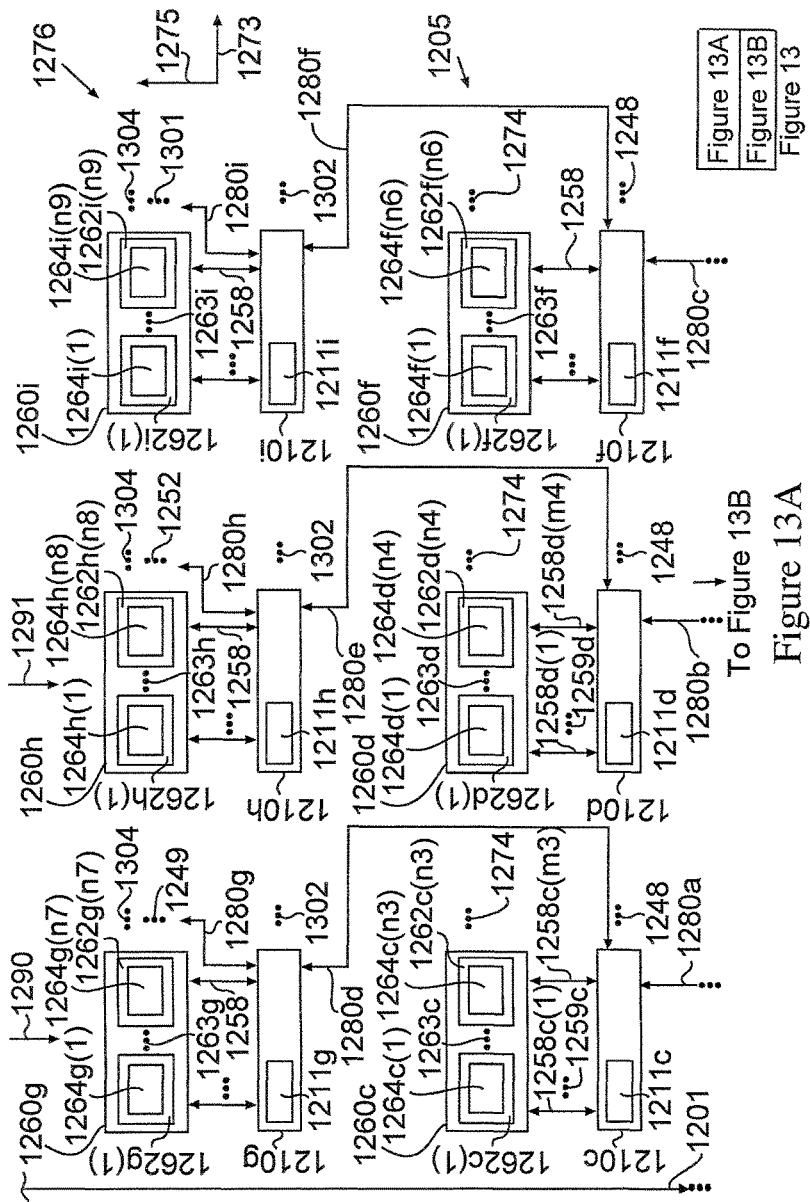

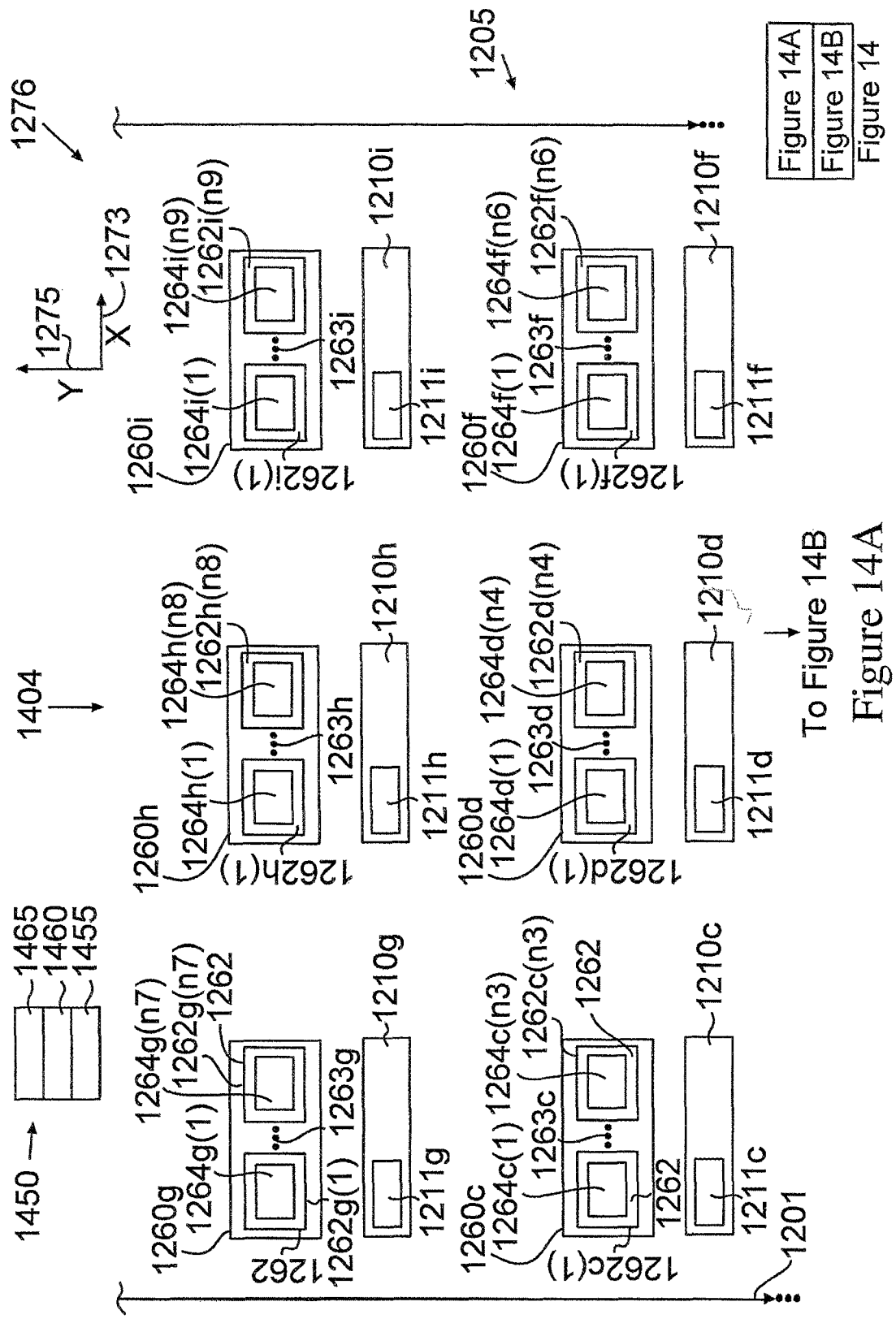

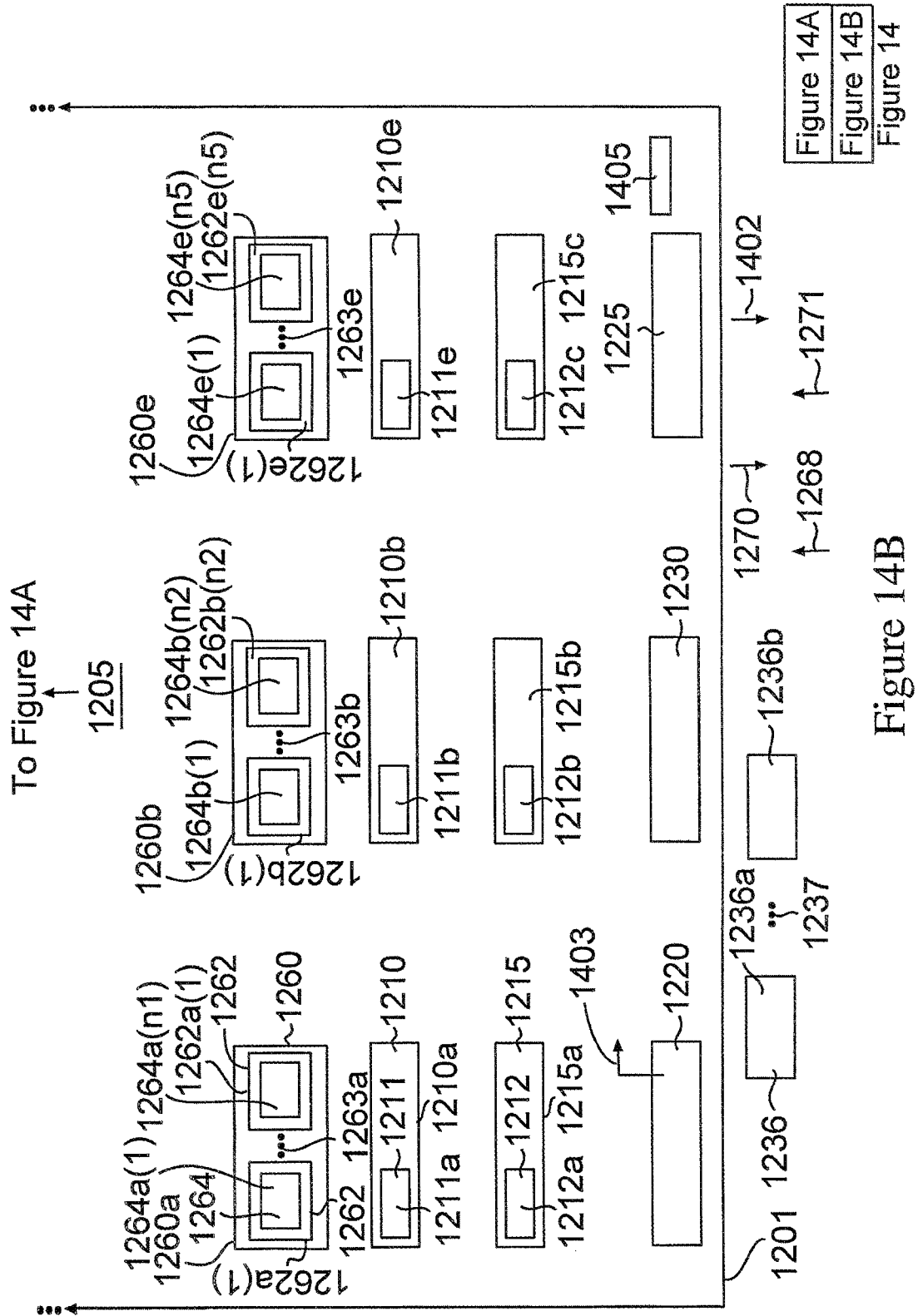

MULTI-DIMENSIONAL COMPUTER STORAGE SYSTEM

FIELD

An embodiment of the invention generally relates to computer storage systems.

An embodiment of the invention relates to solutions for achieving reduced latency memory read transactions in storage devices or memory devices.

More particularly, an embodiment of the invention relates to solutions that achieve reduced latency memory read transactions by allocating a prefetch buffer from a set of buffers that includes at least one buffer such as, for example, a data register from a flash device and/or another buffer in a storage system.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

The relentless increase in Internet usage and electronic commerce (e-commerce) as well as the proliferation of networked digital computing devices has driven the demand for not only a large capacity data storage, but also high data availability and sophisticated data management such as, for example, storage virtualization. To meet these needs, many vendors offer network attached storage (NAS) devices, storage array network (SAN) devices, and/or sophisticated servers that have directly attached arrays of mass storage. These solutions can provide users with managed access to their data directly from their respective computing devices or through a network and with high data availability. However, these solutions are not without challenges.

One challenge includes reducing latency in memory read transactions. For example, in enterprise database applications or in an on-line transaction processing, massive amounts of data may need to be sorted or filtered. This requires that these applications have access to storage devices that not only can provide large data capacity, but can also perform low latency memory read transactions for data stored randomly in the storage devices.

Another example that requires reduced latency in memory read transactions includes on-demand video applications. These applications must have access to storage devices that can retrieve large amounts of sequential data, such as video, with low latency and in multiple streams in order to maximize the viewing enjoyment of the video in real-time by multiple end-users.

Yet another example requiring reduced latency in memory read transactions includes a storage virtualization application that can aggregate a pool of storage that can be used by requesting hosts. This pool of storage may include a set of storage devices that may be interconnected through a LAN (Local Area Network), WAN (Wide Area Network), or both, and that also use mass storage devices that have a relatively high memory transaction read latency, such as hard disk drives (HDD), or/and that are coupled to a network with a relatively low network bandwidth.

Consequently, a need exists for a storage device that can provide low latency memory read transactions in a variety of applications.

SUMMARY

A solution for performing reduced latency memory read transactions is disclosed, in accordance with an embodiment of the invention. In one example, this solution may include a storage apparatus having a memory array that includes: a flash device having a data register, a memory interface coupled to the memory array and a buffer set that includes at least one buffer that is suitable for use as a prefetch buffer. The buffer set, where one buffer in the buffer set includes a data register, is coupled to the memory interface. The memory interface, in response to a memory read transaction request, performs a read operation and, if stored data exists within the memory array that meets at least one prefetch selection criterion, the memory interface also performs an internal read operation. The internal read operation includes allocating a prefetch buffer in the buffer set and storing the data as prefetch data in the prefetch buffer. If the memory interface receives a second memory read transaction request for data and if the data is currently available as prefetch data in the prefetch buffer, the memory interface responds by performing a forwarding transaction that includes retrieving the prefetch data from the prefetch buffer and forwarding the prefetch data to a host.

The above advantages and/or additional advantages of one or more embodiments of the invention will become apparent to those skilled in the art from a reading of the following detailed description when taken in conjunction with the accompanying drawings.

BRIEF DESCRIPTION OF DRAWINGS

Non-limiting and non-exhaustive embodiments of the present invention are described with reference to the following figures, wherein like reference numerals may refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

FIGS. 13A and 13B are block diagrams that illustrate the expandable architecture of a memory interface in a storage apparatus, in accordance with an embodiment of the invention.

FIGS. 14A and 14B are block diagrams of an expandable buffer set in a storage apparatus, in accordance with an embodiment of the invention.

DETAILED DESCRIPTION

Figure 1:
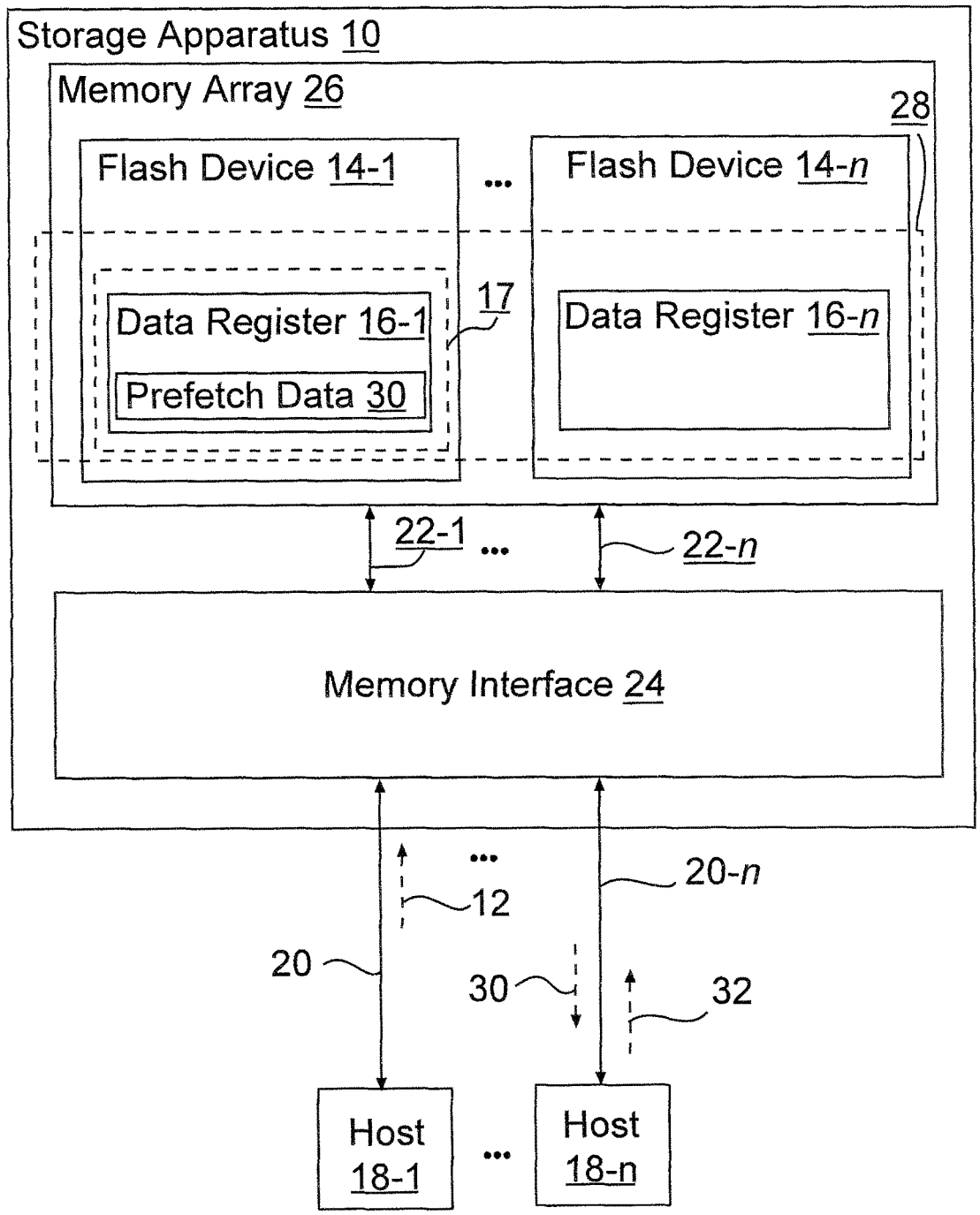
FIG. 1 is a block diagram of a reduced latency storage apparatus in accordance with a first embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

Various embodiments of the invention disclosed herein pertain to achieving a reduced memory transaction read latency in a memory device such as, for example, a storage apparatus that employs a memory interface that is communicatively coupled to a memory array. Reduced latency may be achieved in such a storage apparatus by allocating a buffer from a set of at least one buffer, such as, for example, a data register included in a flash device or at least one buffer in the memory interface, and by using this one or more allocated buffers to store prefetch data. The number of buffers allocated as prefetch buffers for storing prefetch data may be selected at the time of manufacture, at the time of boot-up, or dynamically as needed by the storage apparatus. In this example, this flash device comprises at least a portion of the memory array.

Reference is now made to FIG. 1. In an embodiment of the invention, a reduced memory read transaction latency may be achieved by using a storage apparatus 10 that includes a memory interface 24 that is coupled via a memory bus 22-1 to a memory array 26. Memory array 26 includes at least one flash device, such as flash devices 14-1 through 14-n, where n may be any number greater than zero (0). The flash devices may include data registers. For example, flash devices 14-1 and 14-n may respectively include data registers 16-1 through 16-n. The data registers 16-1 through 16-n form part of the buffer set 28. The term "flash device" is intended to include any form of non-volatile memory that includes a set of non-volatile memory cells. These non-volatile memory cells may include, for example, multi-level memory cells. This flash device permits read and write operations to be performed on these memory cells according to a protocol supported by the flash device. This flash device may be implemented by using a flash memory device that complies with the Open NAND Flash Interface Specification, commonly referred to as ONFI Specification. The term "ONFI Specification" is a known device interface standard created by a consortium of technology companies known as the "ONFI Workgroup". The ONFI Workgroup develops open standards for NAND Flash memory devices and for devices that communicate with these NAND flash memory devices. The ONFI Workgroup is headquartered in Hillsboro, Oreg. Using a flash device that complies with the ONFI Specification is not intended to limit the embodiment(s) disclosed herein. One of ordinary skill in the art having the benefit of this disclosure would readily recognize that other types of flash devices employing different device interface protocols may be used, such as protocols that are compatible with the standards created through the Non-Volatile Memory Host Controller Interface (NVMHCI) working group. Members of the NVMHCI working group include Intel Corporation of Santa Clara, Calif., Dell Inc. of Round Rock, Tex., and Microsoft Corporation of Redmond, Wash.

Memory interface 24 responds to a memory read transaction request 12 received via bus 20 from host 18-1. Memory interface 24 performs, on memory array 26, a memory operation that corresponds to the transaction requested by host 18-1. For example, if memory interface 24 receives a memory read transaction request 12, memory interface 24 performs a read operation on memory array 26 and returns the result of the read operation, such as read data, along bus 20 to host 18-1. Data returned as a result of the read operation is hereinafter called "read data". Memory interface 24 may also perform an internal read operation if data exists in memory array 26, wherein that existing data meets at least one prefetch selection criterion. This prefetch selection criterion may include a relationship between the read data, and a data portion existing in memory array 26, named "stored data". The type of relationship between the read data and stored data is not intended to be limiting in any way. Any type of relationship may be used that increases the likelihood that the stored data selected for prefetching will be later requested by a host (e.g., host 18-1) that is communicatively coupled to a memory interface 24. For example, this prefetch selection criterion may be met if stored data exists (in memory array 26) that has a memory address that differs from the address of the read data within a selected memory address range. In another example, memory interface 24 determines whether the prefetch selection criterion is met by determining whether any stored data exists (in memory array 26) that has a memory address within the same page as a memory address associated with the read data.

The term "host", such as host 18-1 shown in this embodiment, can be defined as any device that has the ability to transmit a memory read transaction request to storage apparatus 10. For example, this device may include host 18-1 that can generate a memory read transaction request 12 and that can receive a response resulting from the processing of memory read transaction request 12 by memory interface 24. Memory interface 24 may process memory transactions from one or more requesting device, such as at least one of the hosts 18-1 through 18-n. For example, as shown in FIG. 1, host 18-1 may generate a memory read transaction request 12, while another host 18-n may receive a response, such as prefetch data 30 that is a result of another subsequent memory read transaction request 32 that is sent by host 18-n.

The term "data portion" is intended to refer to any data size granularity used by storage apparatus 10 to address data which is stored in memory array 26. For example, data may be addressed in increments that may include a flash page, flash block, a file, or the like.

If memory interface 24 determines that the prefetch selection criterion is met, the memory interface 24 initiates an internal read operation. This internal read operation includes memory interface 24 retrieving data that meets the prefetch selection criterion from memory array 26. Memory interface 24 may perform this internal read operation without host prompting. However, if memory interface 24 determines that the prefetch selection criterion has not been met, memory interface 24 does not perform this internal read operation. Data retrieved from memory array 26 that meets the prefetch selection criterion is hereinafter called "prefetch data".

As part of the internal read operation, memory interface 24 allocates at least one buffer from buffer set 28 to store prefetch data 30. The number of buffers allocated by memory interface 24 as prefetch buffers for storing prefetch data may be selected at the time of manufacture, at the time of initialization, or dynamically as needed by the storage apparatus. In one embodiment of the invention, the number of buffers allocated as prefetch buffers may be initially selected by memory interface 24. Memory interface 24 may then dynamically adjust the number of buffers after initialization, depending on an amount of storage needed for data treated as prefetch data during the processing of memory read transaction requests. For example, in FIG. 1, memory interface 24 may allocate data register 16-1 as a storage space suitable for storing prefetch data 30. This action may render non-allocated buffers, such as registers 16-n in buffer set 28, as available to storage apparatus 10 for other memory uses as needed. Buffers allocated for storing prefetch data, such as buffer 16-1, are hereinafter called "prefetch buffers". Storing prefetch data 30 in a prefetch buffer, such as prefetch buffer 17, renders prefetch data 30 readily available to a requesting host if requested by the host, such as through a subsequent memory read transaction request.

Allocation of a prefetch buffer in the above manner is not to be taken as a limitation in any way. One of ordinary skill in the art having the benefit of this disclosure may use other techniques or procedures to allocate a buffer as a prefetch buffer for storing prefetch data. For example, memory array 26 may further include at least one HDD which is not shown to avoid overcomplicating this disclosure. During initialization, memory interface 24 (which is operating under program control) may, by default, perform a prefetch of data from random areas in this HDD. This configuration option may be preferable when low latency performance during random access is required, such as in database applications. Another option may include configuring memory interface 24 through program code to provide an option in the form of a vendor-specific interface command to allow a host, such as host 18-1, to select the prefetching method to be used by memory interface 24 during initialization. For instance, if storage apparatus 10 will be used to store large files that tend to be stored sequentially, such as, for example, video files, memory interface 24 may be configured to prefetch sequential data rather than random data. To reduce the initialization time of storage apparatus 10, these prefetching options during initialization may be disabled. In another possible configuration, storage apparatus 10 may support a host-controlled non-volatile cache command set. This allows a host, such as host 18-1, to keep selected data in low latency non-volatile memory that may form a portion of memory array 26, such as flash devices 14-1 through 14-*n*, rendering this selected data to be available as prefetch data during initialization. During initialization, memory interface 24 (operating under program control) detects this selected data and automatically prefetches this data by storing the data in a prefetch buffer.

If memory interface 24 receives memory read transaction request 32, which may be subsequent to memory read transaction request 12, and the data requested by memory read transaction request 32 is currently available in prefetch buffer 17 as prefetch data 30, memory interface 24 will initiate a forwarding transaction, reducing the read latency of the memory read transaction resulting from memory read transaction request 32. This forwarding transaction includes retrieving the prefetch data previously stored in a prefetch buffer, such as prefetch data 30 and prefetch buffer 17, respectively, and forwarding prefetch data 30 to the requesting host, such as host 18-*n*.

Storage apparatus 10 also includes a data transmission conduit, such as a memory bus 22-1, for coupling memory interface 24 and memory array 26. Memory interface 24 uses memory bus 22-1 as a conduit for transferring data between memory interface 24 and memory array 26. Memory bus 22-1 may include additional memory bus 22-*n*, wherein n may be any number greater than zero. Additional memory buses, such as memory bus 22-*n*, may be implemented to accompany an expansion of memory array 26. Memory buses 22-1 through 22-*n* are provided as one possible implementation feature and are not intended to be limiting in any way. Bus 20 may be used to couple host 18-1 to storage apparatus 10. Additional buses, such as bus 20-*n*, may be implemented to enable additional hosts, such as host 18-*n*, to communicate with memory interface 24.

Figure 2:
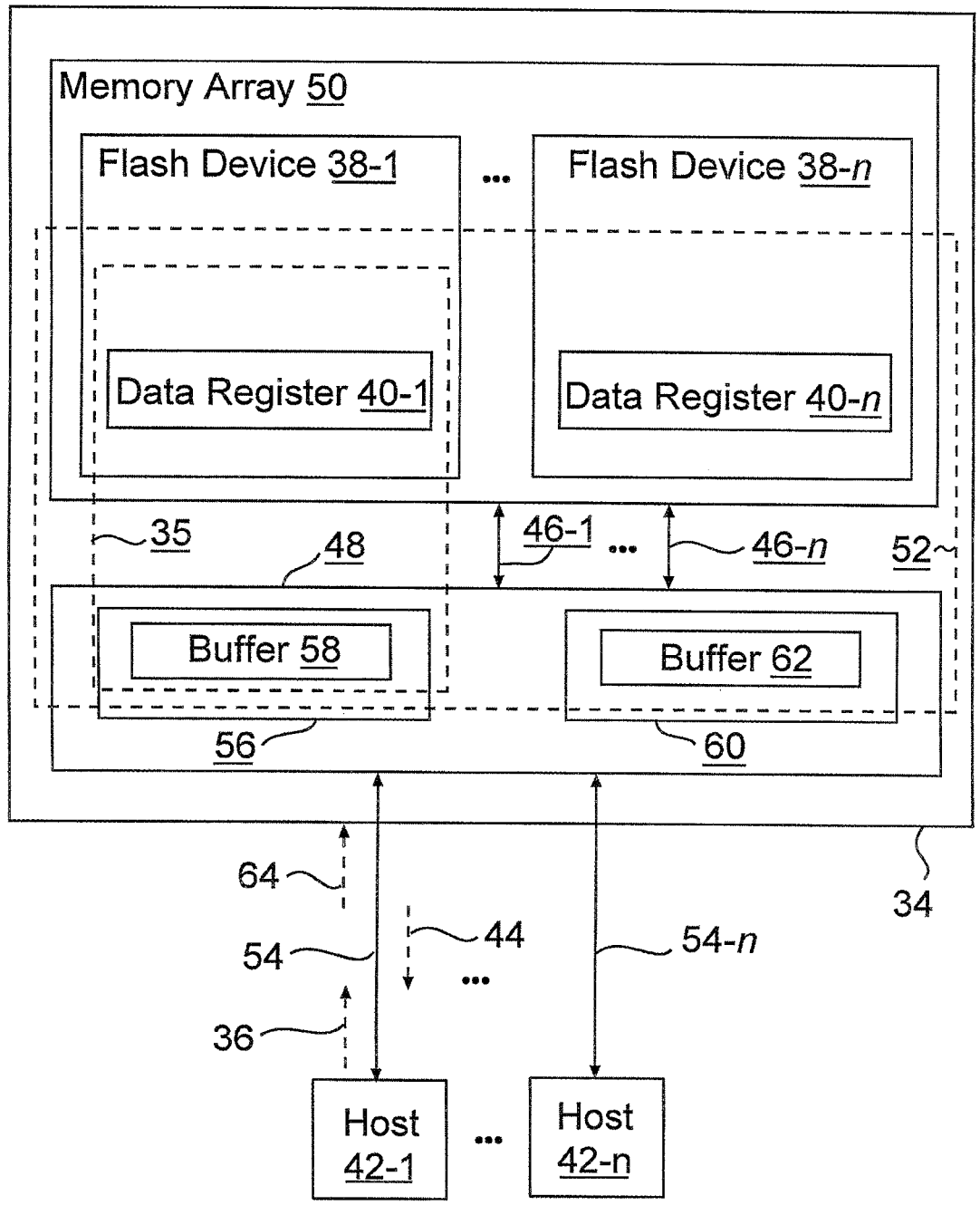
FIG. 2 is a block diagram of a reduced latency memory interface for use in a storage apparatus in accordance with a second embodiment of the invention.

FIG. 2 illustrates another embodiment of a storage apparatus 34 that supports prefetching transactions and that employs a reduced latency memory interface 48. Storage apparatus 34 includes a memory array 50, which is coupled to memory interface 48 via a memory bus 46. Memory interface 48 is responsive to a memory read transaction request 36 sent via bus 54 from a host 42, and enables storage apparatus 34 to perform reduced latency memory transactions in response to receiving a second memory read transaction request 64. In this embodiment, memory interface 48 includes a DMA (Direct Memory Access) controller 56 and flash memory controller 60. Buffer set 52 includes the following: data registers 40-1 to 40-*n* from flash devices 38-1 through 38-*n*, respectively; at least one buffer from DMA controller 56, such as buffer 58; at least one buffer from flash memory controller 60, such as buffer 62; or any combination of these data registers and buffers. As previously described, a prefetch buffer is a data store that has been allocated to store prefetch data.

The number of buffers allocated as prefetch buffers may be selected at the time of manufacture, during initialization, or during the processing of memory operations. In one example, memory interface 48 may initially allocate a selected number of buffers at the time of initialization, and then dynamically adjust the number of buffers allocated as prefetch buffers after initialization, depending on an amount of storage needed for data treated as prefetch data during the processing of memory read transaction requests. This example is not intended to limit the various embodiments disclosed herein. Other embodiments for allocating a selected number of buffers that may be applicable to the example shown in FIG. 2 have been previously disclosed with reference to FIG. 1. In addition, the number of buffers allocated as prefetch buffers may depend on an amount of storage needed for the prefetch data. For instance, memory interface 48 may allocate data register 40-1 and buffer 58 as storage space suitable for storing prefetch data 44. This action may also render non-allocated buffers, such as data registers 40-*n* and buffer 62 in buffer set 52 as available to storage apparatus 34 for other memory uses as needed. Buffers allocated for storing prefetch data, such as buffer 58 and data register 40-1 are hereinafter called "prefetch buffers".

Memory array 50, hosts 42-1 through 42-*n*, flash devices 38-1 through 38-*n*, buses 54 through 54-*n*, memory read transaction request 36, second memory read transaction request 64, and memory buses 46-1 through 46-*n* may be implemented to have substantially the same function and structure as memory array 26, hosts 18-1 through 18-*n*, flash devices 14-1 through 14-*n*, buses 20 through 20-*n*, memory read transaction request 12, second memory read transaction request 32, and memory buses 22-1 through 22-*n*, respectively, as disclosed above with reference to FIG. 1.

In this embodiment, buffer set 52 includes buffer 58 and buffer 62. Like data registers 40-1 through 40-*n*, buffers 58 and 62 form part of buffer set 52 and can be used as prefetch buffers if memory interface 48 allocates these buffers as prefetch buffers. Otherwise, memory interface 24 in FIG. 1 is similar to memory interface 48 in function. For example, when prefetch data 44 is found during an internal read operation, memory interface 48 stores prefetch data 44 into prefetch buffer 35, such as buffer 58 and data register 40-1. Also, if memory interface 48 receives a second memory read transaction request 64, which may be subsequent to the earlier memory read transaction request 36, for data, and this data has been previously stored as prefetch data, such as prefetch data 44, and prefetch data 44 is stored in prefetch buffer 35, then memory interface 48 initiates a forwarding transaction. This forwarding transaction is similar to the forwarding transaction described earlier with respect to the embodiment that is described with reference to FIG. 1. However, unlike the forwarding transaction described with respect to FIG. 1 which only shows data registers which may be allocated as prefetch buffers, the forwarding transaction described with respect to FIG. 2 may include obtaining prefetch data from any of the buffers in buffer set 52 if memory interface 48 allocates those buffers as prefetch buffers.

For example, if the data requested in the second memory read transaction 64 has been stored as prefetch data 44, and prefetch data 44 is stored in buffer 58, the forwarding transaction includes retrieving prefetch data 44 from buffer 58 and forwarding prefetch data 44 to the host that sent the second memory read transaction request 64. In another example, if the data requested in the second memory read transaction request 64 is stored as prefetch data 44, and prefetch data 44 is stored in data register 40-1, the forwarding transaction includes retrieving prefetch data 44 from the data register 40-1 and forwarding the prefetch data 44 to the host that sent the second memory read transaction request 64. Thus, memory interface 48 may perform an internal read operation and forwarding transaction using any of the buffers, such as data registers 40-1 through 40-*n*, buffer 58, and buffer 62 that memory interface 48 has allocated as prefetch buffers.

Figure 3:
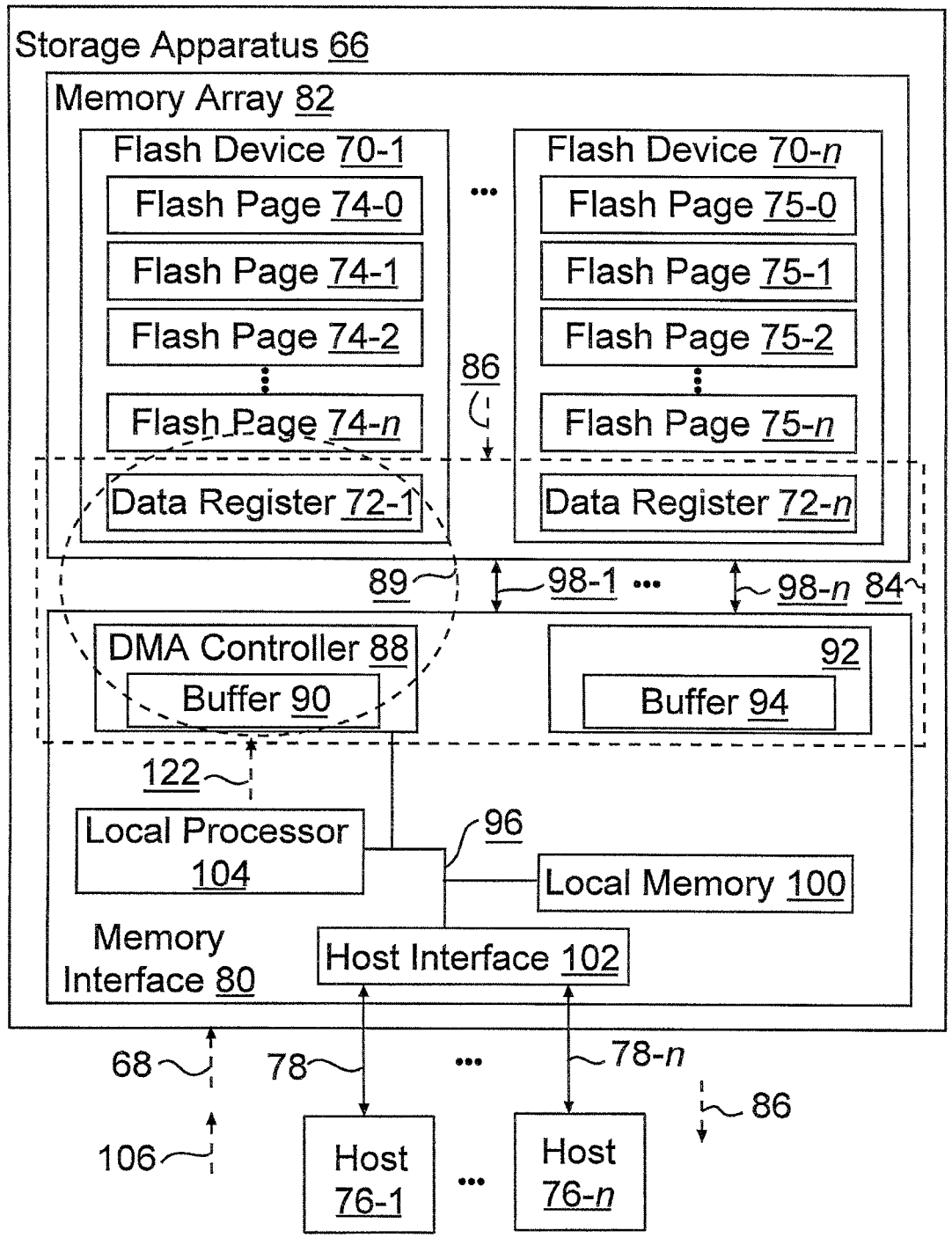
FIG. 3 is a block diagram of a reduced latency memory interface for use in a storage apparatus in accordance with a third embodiment of the invention.

FIG. 3 illustrates another embodiment of a storage apparatus 66 that supports prefetching transactions and that employs a reduced latency memory interface 80 in accordance with another embodiment of the invention. Storage apparatus 66 includes a memory array 82 coupled to a memory interface 80 via a memory bus 98. Memory interface 80 is responsive to a memory read transaction request 68 sent via bus 78 from a host 76-1. Memory interface 80 enables storage apparatus 66 to perform a reduced latency memory transaction in response to receiving a second memory read transaction request 106.

Memory interface 80 includes a DMA controller 88, flash memory controller 92, system bus 96, local memory 100, host interface 102, and local processor 104. Host interface 102 allows at least one device, such as host 76-1, to communicate with devices within storage apparatus 66. These devices may include local processor 104, local memory 100, and DMA controller 88 of memory interface 80. For example, memory read transaction request 68 may be received by memory interface 80 through host interface 102, and, as a result, memory interface 80 can process this request 68 as disclosed herein. System bus 96 is a conduit for transferring data between DMA controller 88, local processor 104, local memory 100, and host interface 102. Local processor 104, host interface 102, and DMA controller 88 may access local memory 100 via system bus 96 as needed. Local memory 100 may be implemented using any form of memory, such as, for example, various types of DRAM, non-volatile memory, or other types of memory devices.

Memory array 82 includes at least one flash device, such as flash devices 70-1 through 70-n, where n may be any number greater than zero (0). Each flash device may include flash pages and data registers. For example, flash devices 70-1 and 70-n may each respectively include flash pages 74-0 through 74-n, flash pages 75-0 through 75-n, and data registers 72-1 through 72-n. In this embodiment, data registers form part of buffer set 84. Memory array 82, host 76-1 through 76-n, buses 78 through 78-n, buffer set 84, memory read transaction request 68, second memory read transaction request 106, and memory buses 98-1 through 98-n may be respectively implemented to have substantially the same function and structure as memory array 50, hosts 42-1 through 42-n, buses 54 through 54-n, buffer set 52, memory read transaction request 36, second memory read transaction request 64, and memory buses 46-1 through 46-n, respectively, as disclosed above with reference to FIG. 2.

Host 76-1 sends memory read transaction request 68 to storage apparatus 66 for data located in memory array 82. Operating under program control, local processor 104 analyzes and responds to memory read transaction request 68 by generating DMA instructions that will cause DMA controller 88 to read this data from memory array 82 through flash memory controller 92. If this data is available, flash memory controller 92 retrieves this data, which is transferred to local memory 100 by DMA controller 88, and eventually transferred to host 76-1 via host interface 102. Data obtained during this memory read transaction request is hereinafter named "read data".

Local processor 104 also identifies "prefetch data". Prefetch data is any data currently stored in memory array 82 that meets a prefetch selection criterion. This prefetch selection criterion may include a relationship between the read data and any stored data. For example, this prefetch selection criterion may be met if stored data exists that has a memory address within a selected memory address range from the memory address of the read data. In another example, memory interface 80 determines whether this prefetch selection criterion is met by determining whether any stored data exists in memory array 82 that has a memory address within the same page as a memory address associated with the read data. The type of relationship between the read data and stored data is not intended to be limiting in any way. Any type of relationship may be used that increases the likelihood that the stored data selected for prefetching will be later requested by a host coupled to a memory interface 80, such as host 76-1.

Local processor 104 may also perform an additional read operation, called an internal read operation. This internal read operation is a process executed by the local processor 104 to retrieve prefetch data 86 from memory array 82. This internal read operation includes local processor 104 sending an instruction, such as instruction 122, to DMA controller 88 to retrieve (via flash memory controller 92) a prefetch data 86 from memory array 82. For example, if memory array 82 addresses stored data by flash page, instruction 122 contains the address of the specific flash page within a flash device that holds prefetch data 86, such as flash page 74-0 and flash device 70-1, respectively. Instruction 122 also causes DMA controller 88 to retrieve (via flash memory controller 92) a prefetch data 86 from the flash page and flash device identified by the address mentioned above.

When DMA controller 88 receives instruction 122, instruction 122 causes DMA controller 88 to use flash memory controller 92 to cause flash device 70-1 to transfer prefetch data 86. The internal read operation also includes local processor 104 allocating a buffer in buffer set 84 to store prefetch data 86. Allocating a buffer as a prefetch buffer may be performed statically, such as at the time of manufacture, performed dynamically by local processor 104, or both. In one implementation, the number of buffers allocated as prefetch buffers depends on an amount of storage needed for the prefetch data. For example, in FIG. 3, memory interface 80 may allocate data register 72-1 and buffer 90 as storage space suitable for storing prefetch data 86. This action may also render non-allocated buffers, such as data registers 72-n and buffer 94 in buffer set 84 to be available to storage apparatus 66 for other memory uses. Buffers allocated for storing prefetch data, such as buffer 90 and data register 72-n, are hereinafter called "prefetch buffers". If a host, such as host 76-1, issues a second memory read transaction request 106 for data and this data has been previously stored as prefetch data in a prefetch buffer such as prefetch data 86 in prefetch buffer 89, local processor 104 responds by retrieving prefetch data 86 from prefetch buffer 89 and by placing prefetch data 86 into local memory 100. When local processor 104 determines that local memory 100 contains prefetch data 86, local processor 104 forwards prefetch data 86 from local memory 100 to host interface 102, which in turn transfers the prefetch data 86 to host 76-1. One of ordinary skill in the art having the benefit of this disclosure would readily recognize that rather than using a local memory 100 to store prefetch data, prefetch data may instead be sent directly to the host or processed in any other manner envisioned by a user.

Figure 4:
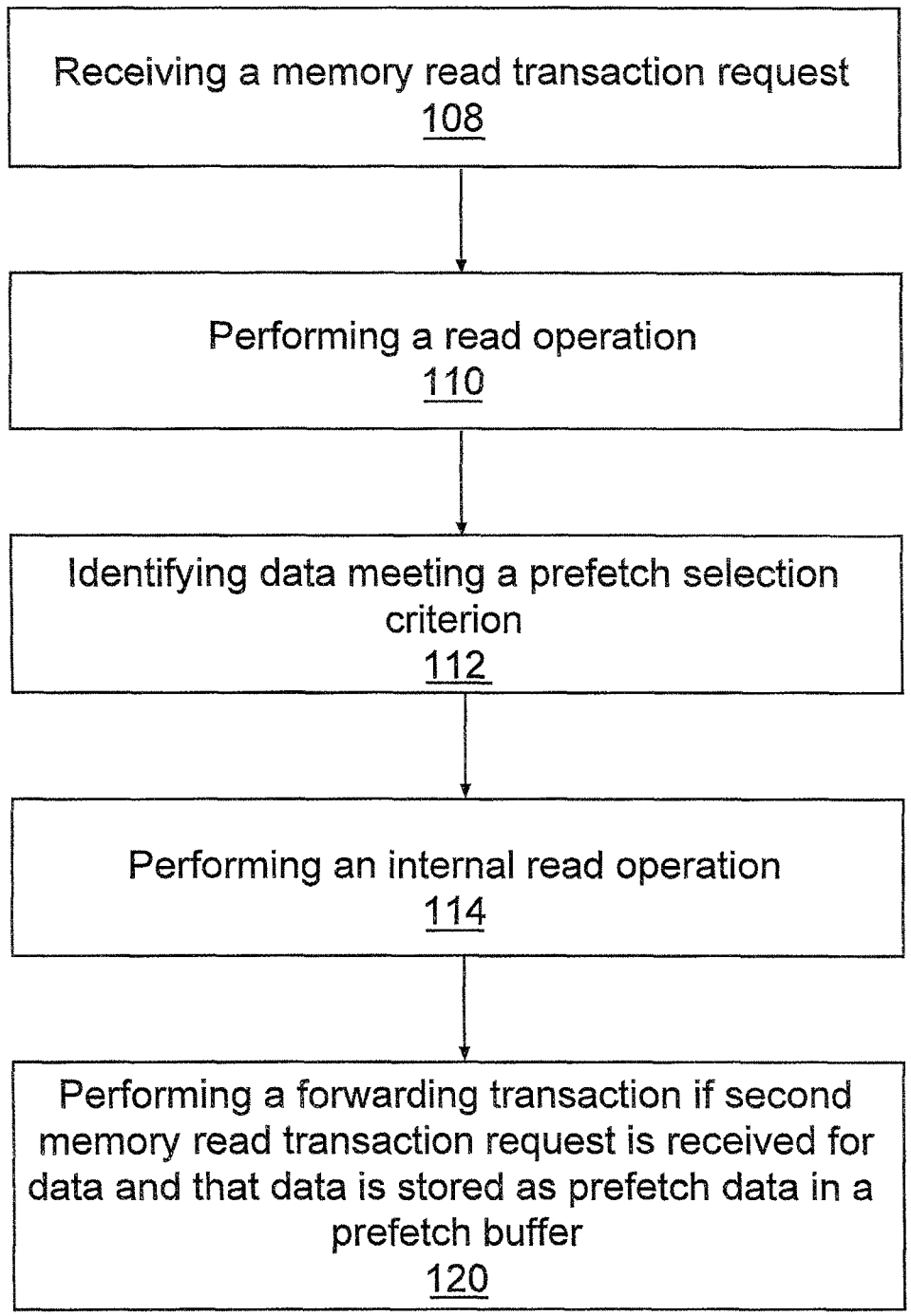
FIG. 4 is a flow diagram of a method for using a reduced latency memory interface in a storage apparatus in accordance with a fourth embodiment of the invention.

FIG. 4 discloses a method for reducing latency in memory read transactions in accordance with another embodiment of the invention. This method may be performed by using a reduced latency memory interface that is coupled to a memory array that includes a flash device and that is also coupled to a buffer set that includes a buffer. These elements may be provided in a storage apparatus, such as storage apparatus 10, 34, or 66 in FIGS. 1, 2, and 3, respectively.

Under the method shown, a memory read transaction request is received 108. For example, as shown in FIG. 3, a host 76-1 may send a memory read transaction request 68 to storage apparatus 66, which uses host interface 102 to receive memory read transaction request 68. A read operation is then performed 110. This read operation may be performed by memory interface 80 by obtaining read data requested by host 76-1 from memory array 82. For example, in FIG. 3, memory array 82 responds to memory read transaction request 68 and obtains read data from memory array 82, returning read data to host 76-1 if this data is available.

Local processor 104 identifies 112 data currently stored in memory array 82 that meets a prefetch selection criterion. For example, in FIG. 3, local processor 104 identifies stored data in memory array 82 that are within a selected address range of the address range of the read data.

If prefetch data is identified, an internal read operation is performed 114. For example, in FIG. 3, memory interface 80 causes a flash device in memory array 82 that holds this prefetch data, such as prefetch data 86, to transfer the prefetch data 86 from a flash page storing the prefetch data. Additionally, the internal read operation includes local processor 104 allocating a buffer as a prefetch buffer in buffer set 84 for storing prefetch data 86. The internal read operation further includes storing prefetch data 86 in a prefetch buffer, such as prefetch buffer 89.

If a second memory read transaction request is received for data and that data is stored as prefetch data in a prefetch buffer, a forwarding transaction is performed 120. For example, referring to FIG. 3, if a second memory read transaction request 106 is received for data and that data is stored as prefetch data 86 in prefetch buffer 89, local processor 104 responds to memory read transaction request 106 and retrieves prefetch data 86 from prefetch buffer 89. Local processor 104 forwards prefetch data 86 from prefetch buffer 89 to local memory 100. Local processor 104 forwards prefetch data 86 from local memory 100 to host 76-1. This transfer of prefetch data 86 from buffer set 84 to local memory 100 is not depicted in FIG. 3 to avoid overcomplicating this disclosure herein in this application. In this example, flash devices 70-1 through 70-*n* function as mass storage devices. However, in another embodiment (not shown), these flash devices may function as a cache to another type of storage device such as, for example, a set of HDDs arranged in a RAID, JBOD, or other configuration. As an example, this set of HDDs is not shown in the drawings to avoid overcomplicating the disclosure herein, but may be included as part of the memory array such as, for example, memory array 82 in FIG. 3.

Figure 5:
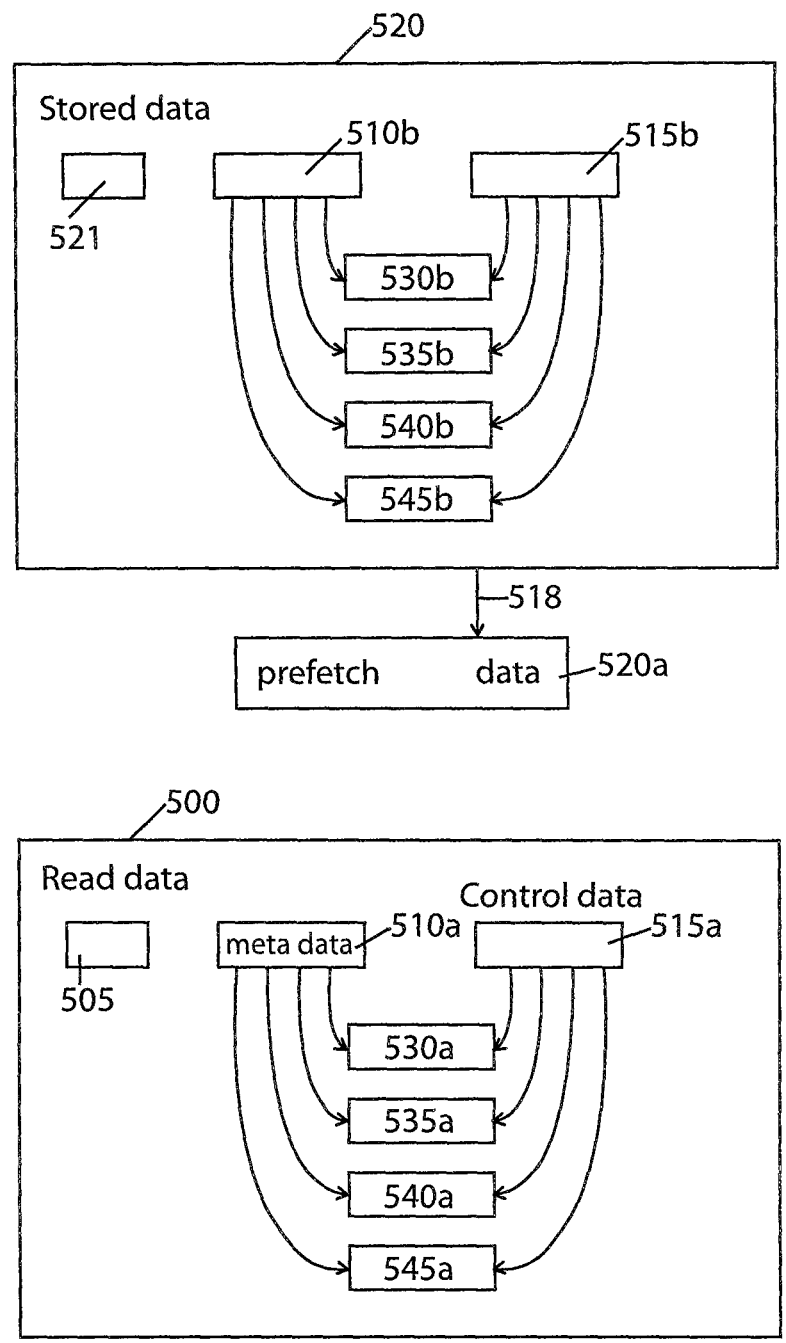
FIG. 5 is a block diagram that illustrates other prefetch selection criteria, in accordance with an embodiment of the invention.

Reference is now made to FIG. 3 and FIG. 5.

FIG. 5 is a block diagram that illustrates other prefetch selection criteria, in accordance with an embodiment of the invention. As similarly discussed above, host 76-1 (FIG. 3) sends memory read transaction request 68 to storage apparatus 66 for data located in memory array 82. Operating under program control (e.g., by execution of a software program or firmware), local processor 104 analyzes and responds to a first memory read transaction request 68 (first read operation 68) by generating DMA instructions that will cause memory interface 80 to read this data from memory array 82 (i.e., DMA instructions will cause DMA controller 88 to read this stored data from memory array 82 through flash memory controller 92). If this data is available, flash memory controller 92 retrieves this data, which is transferred to local memory 100 by DMA controller 88, and eventually transferred to host 76-1 via host interface 102. Therefore, memory interface 80 retrieves this data from memory array 82 and transfers this data to the host 76-1. Data obtained during this memory read transaction request is known as "read data" as similarly discussed above.

Local processor 104 also identifies "prefetch data" which is any data currently stored in memory array 82 and that also meets a prefetch selection criterion (or prefetch selection criteria). In an embodiment of the invention, this prefetch selection criterion may be included in a metadata or included in a control data. Metadata or control data are each contained in the read data.

In an example shown in FIG. 3 and FIG. 5, the memory interface 80 (FIG. 3) reads the read data 500 (FIG. 5) from a memory array 82 and returns this read data 500 to a requesting host (e.g., host 76-1), in response to a first memory read transaction request 68 (first read operation 68) from the requesting host.

As also shown in FIG. 5, the read data 500 includes a data portion 505 and also includes a data property or data properties such as, for example, metadata 510*a* and/or control data 515*a*. If the metadata 510*a* contains a particular metadata value(s) and/or the control data 515*a* contains a particular control data value(s), then the read data 500 can provide a prefetch selection criterion based on these metadata values and/or control values, and the DMA controller 88 (of memory interface 80) then uses the flash memory controller 92 to cause a flash device (in memory array 82) to transfer 518 a copy of the stored data 520 (in memory array 82) to the prefetch buffer 89 as a prefetch data 520*a*, if the stored data 520 includes data properties such as metadata 510*b* that contains the particular metadata value(s) matching (or corresponding to) the particular metadata value(s) of the metadata 510*a* of read data 500 and/or if the stored data 520 includes data properties such as control data 515*b* that contains the particular control data value(s) matching (or corresponding to) the particular control data value(s) of control data 515*a* of read data 500. After the memory interface 80 (via DMA controller 88 using flash memory controller 92) has prefetched (518) the copy of stored data 520, the DMA controller 88 will store a copy of the stored data 520 as a prefetch data 520*a* into the prefetch buffer(s) 89 as similarly discussed above in an internal read operation.

The particular metadata value(s) and particular control data value(s) described herein can be programmable values that can be programmed in, for example, a program or firmware to be executed by the local processor 104. Any type of values or range of values may be used to increase the likelihood that the stored data selected for prefetching (from prefetch buffer(s) 89) will be later requested by a host coupled to a memory interface 80, such as, for example, hosts 76-1 or 76-*n*.

The internal read operation includes local processor 104 sending an instruction, such as instruction 122, to DMA controller 88 to retrieve (by use of flash memory controller 92) the prefetch data 520*a* from the memory array 82. For example, instruction 122 contains the particular values of metadata 510*a* (FIG. 5) and/or particular values of control data 515*a* as the prefetch selection criterion (or prefetch selection criteria). Instruction 122 also causes DMA controller 88 to retrieve (by use of flash memory controller 92) the prefetch data 520*a* (which is a copy of stored data 520) from the memory array 82 if the stored data 520 has the particular value of metadata 510*a* and/or has the particular value of control data 515*a* of the read data 500.

Figure 11:
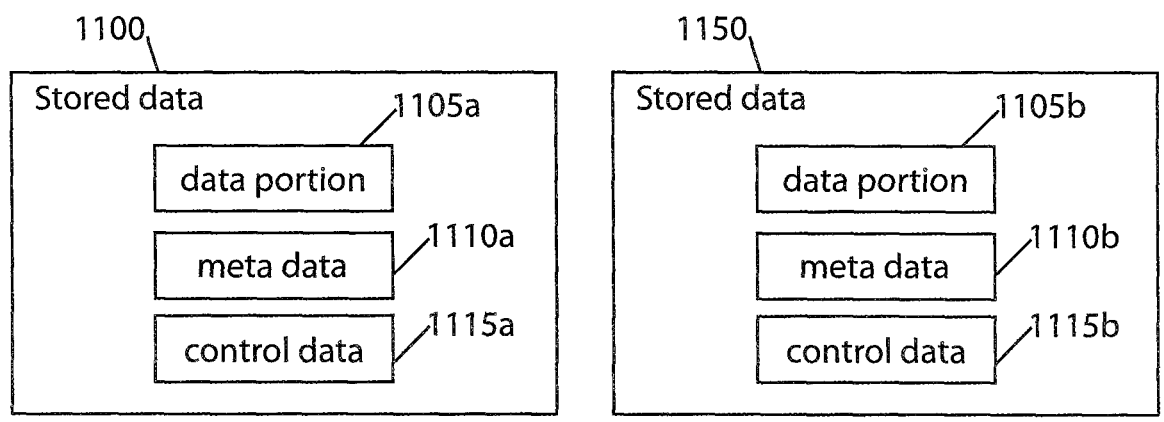
FIG. 11 is a block diagram that illustrates a reduced read latency method applied to deduplication/repeating pattern elimination method, in accordance with an embodiment of the invention.

When DMA controller 88 receives instruction 122, instruction 122 causes DMA controller 88 to use flash memory controller 92 to cause memory array 82 (or one or more flash devices 70-1 through 70-*n* in memory array 82) to transfer prefetch data 520*a* to the prefetch buffer 89. The internal read operation also includes local processor 104 allocating a prefetch buffer 89 in buffer set 84 to store the prefetch data 520*a*. Allocating a buffer as a prefetch buffer may be performed statically, such as at the time of manufacture, performed dynamically by local processor 104, or both. In one implementation, the number of buffers allocated as prefetch buffers 89 depends on an amount of storage needed for the prefetch data. For example, in FIG. 3, memory interface 80 may allocate buffer 90 and/or buffer 94 and may additionally allocate any of the data registers 72-1 and 72-*n* as prefetch buffers having the storage space suitable for storing the prefetch data 520*a*. Alternatively, the memory interface may allocate buffer 90 or buffer 94 as prefetch buffers 89. This action may also render non-allocated buffers in the buffer set 84 to be available to storage apparatus 66 for other memory uses. If a host, such as host 76-1 or host 76-*n*, issues a second memory read transaction request 106 for data and this data has been previously stored as prefetch data in a prefetch buffer such as prefetch data 520*a* in prefetch buffer 89, local processor 104 responds by retrieving prefetch data 520*a* from prefetch buffer 89 and by forwarding prefetch data 520*a* to local memory 100 and placing prefetch data 520*a* into local memory 100. When local processor 104 determines that local memory 100 contains prefetch data 520*a*, local processor 104 forwards prefetch data 520*a* from local memory 100 to host interface 102, which in turn transfers the prefetch data 520*a* to host 76-1 or host 76-*n*, depending on which one of the hosts issued the second memory read transaction request 106. One of ordinary skill in the art having the benefit of this disclosure would readily recognize that rather than using a local memory to store prefetch data, prefetch data may be sent directly to the host or processed in any other manner envisioned by a user. As will also be discussed below, FIG. 11 is a block diagram that illustrates a deduplication/repeating pattern elimination method for reducing read latency, in accordance with an embodiment of the invention.

As also shown in FIG. 5, one (or both) of the metadata 510*a* (and/or control data 515*a*) includes an address 530*a* (or addresses 530*a*), pointer 535*a* (or pointers 535*a*), index 540*a* (or indices 540*a*), and/or flag 545*a* (or flags 545*a*), in one embodiment of the invention. For example, a prefetch selection criterion is met if any stored data 520 (in any of flash devices 70-1 and 70-*n*) includes a metadata 510*b* (and/or control data 515*b*) having an address 530*b* (or addresses 530*b*) matching or corresponding to respective address 530*a* (or addresses 530*a*), pointer 535*b* (or pointers 535*b*) matching or corresponding to respective pointer 535*a* (or pointers 535*a*), index 540*b* (or indices 540*b*) matching or corresponding to respective index 540*a* (or indices 540*a*), and/or flag 545*b* (or flags 545*b*) matching or corresponding to respective flag 545*a* (or flags 545*a*) of read data 500. If a stored data 520 meets a prefetch selection criterion, then the memory interface 80 will store (518) a copy of the stored data 520 as a prefetch data 520*a* into a prefetch buffer 89, in accordance with an internal read operation as similarly discussed above.

Figure 6:
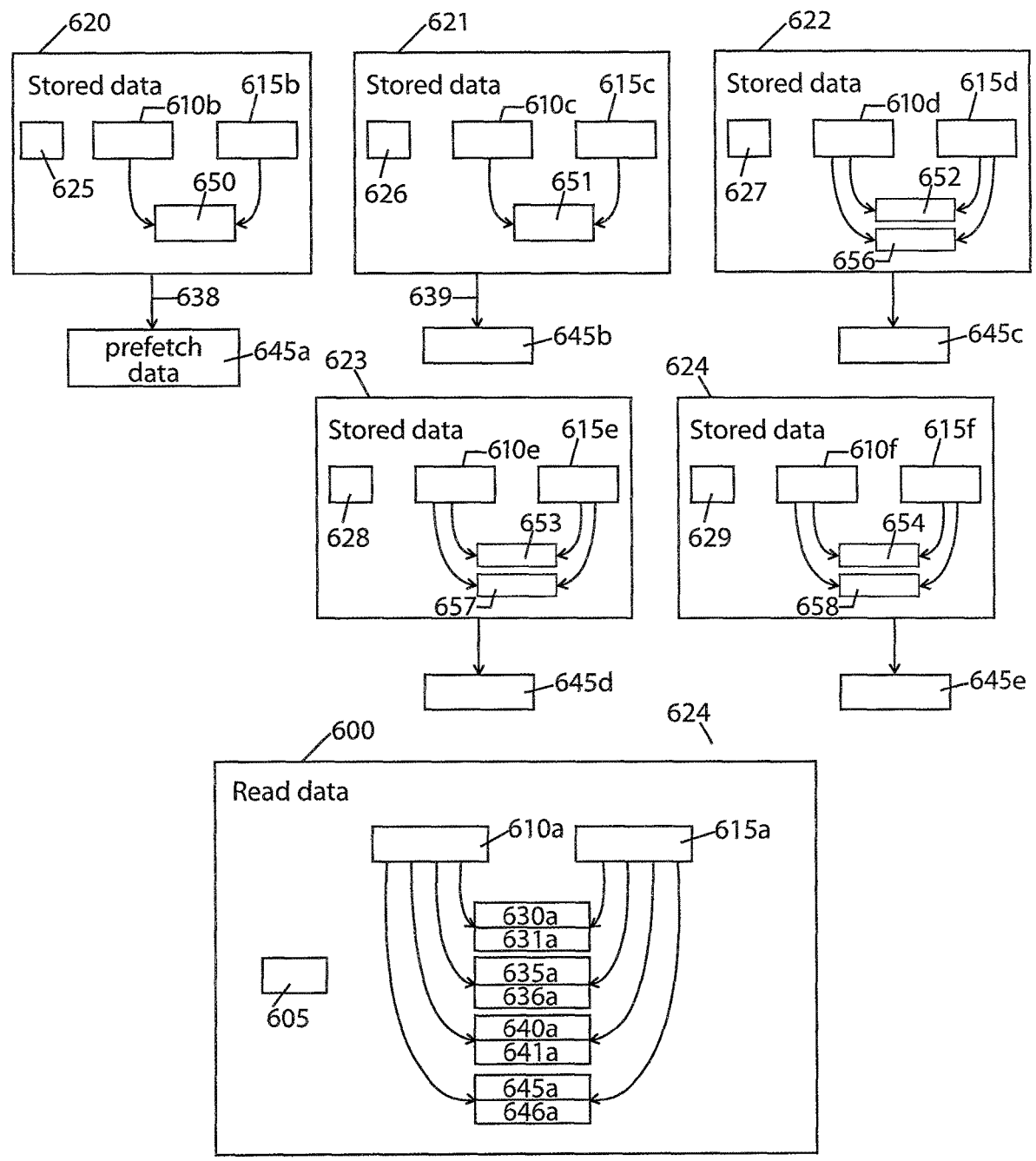
FIG. 6 is a block diagram that illustrates multiple prefetch reads (multiple prefetching of data) that are performed in relation to a single read data, in accordance with an embodiment of the invention.

Reference is now made to FIG. 3 and FIG. 6.

FIG. 6 is a block diagram that illustrates multiple prefetch reads (multiple prefetching of data) that are performed in relation to a single read data 600, in accordance with an embodiment of the invention. As shown in FIG. 6, the read data 600 includes a data portion 605 and data properties such as metadata 610*a* and/or control data 615*a*. As will be discussed below, since the read data 600 contains metadata 610*a* (and/or control data 615*a*) containing multiple addresses, pointers, flags, and/or indices, the memory interface 80 will perform one or multiple prefetch reads in relation to the single read data 600 as long as resources (e.g., prefetch buffer space) or configuration settings (of storage apparatus 66) permit the multiple prefetch reads.

If one or more stored data in one or more flash devices in memory array 82 has metadata (or control data) with a value that matches a value in the metadata 610*a* (or control data 615*a*) of read data 600, then memory interface 80 will perform an internal read operation so that a copy of the one or more stored data are stored as prefetch data (or prefetch datum) in at least one prefetch buffer 89.

For example, the single read data 600 includes multiple addresses 630*a* and 631*a*, multiple pointers 635*a* and 636*a*, multiple indices 640*a* and 641*a*, and/or multiple flags 645*a* and 646*a*. Each of the addresses, pointers, indices, and/or flags in the single read data 600 can vary in number. If any value of any of the multiple addresses 630*a* and 631*a*, multiple pointers 635*a* and 636*a*, multiple indices 640*a* and 641*a*, and/or multiple flags 645*a* and 646*a* matches a value of any of the addresses, pointers, indices, and/or flags in one or more stored data 620, 621, 622, 623, and 624 in the memory array 82, then a prefetch selection criterion is met and the memory interface 80 will then retrieve a copy of the one or more stored data 620-624 and will store this one or more retrieved stored data 620-624 into at least one prefetch buffer 89, in accordance with the memory interface 80 performing multiple prefetch reads of the stored data meeting the prefetch selection criterion during multiple internal read operations. The stored data in the example of FIG. 6 can vary in number. In FIG. 6, stored data 620-624 include data portions 625-629, respectively.

In one embodiment, for example, a prefetch selection criterion is met if any (or all) of the stored data 620-624 (in any of flash devices 70-1 and 70-*n*) includes one or more addresses matching or corresponding to any of the multiple addresses 630*a* and 631*a* of read data 600, one or more pointers matching or corresponding to any of the multiple pointers 635*a* and 636*a*, one or more multiple indices matching or corresponding to any of the multiple indices 640*a* and 641*a*, and/or one or more multiple flags matching or corresponding to any of the multiple flags 645*a* and 646*a* in the read data 600. If any (or all) of the stored data 620-624 meets a prefetch selection criterion, then the memory interface 80 will store a copy of the stored data matching the prefetch selection criterion as a prefetch data into a prefetch buffer 89.

By way of example and not by way of limitation, the stored data 620-624 include the following data properties in the form of metadata and/or control data. Stored data 620 includes the metadata 610*b* and/or control data 615*b*. Stored data 621 includes the metadata 610*c* and/or control data 615*c*. Stored data 622 includes the metadata 610*d* and/or control data 615*d*. Stored data 623 includes the metadata 610*e* and/or control data 615*e*. Stored data 624 includes the metadata 610*f* and/or control data 615*f*.

As an example, a prefetch selection criterion is met if: (1) stored data 620 includes a metadata 610*b* (and/or control data 615*b*) that matches the metadata 610*a* and/or control data 615*a*; and additionally, (2) stored data 621 includes a metadata 610*c* (and/or control data 615*c*) that matches the metadata 610*a* and/or control data 615*a* of the single read data 600. In this example, the memory interface 80 will perform multiple prefetch reads (multiple prefetching of stored data 620 and 621) in relation to a single read data 600 during internal read operations, since the stored data 620 and 621 meet the prefetch selection criteria. Therefore, the memory interface 80 perform a prefetch read (638) of the stored data 620 and store a copy of the stored data 620 into the prefetch buffer 89 as a prefetch data 645*a*, and the memory interface 80 will subsequently perform a prefetch read (639) of the stored data 621 and store a copy of the stored data 621 into the prefetch buffer(s) 89 as a prefetch data 645*b*. The process of performing prefetch reads and storing prefetch data into the prefetch buffer(s) 89 was similarly described above. Subsequently, a forwarding transaction, as similarly discussed above, can be performed wherein the memory interface 80 retrieves the prefetch data 645*a* and/or 645*b* (stored in prefetch buffer(s) 89) and forwards the prefetch data 645*a* and/or 645*b* to a requesting host, such as host 76-1 or host 76-*n*.

As another specific example, a prefetch selection criterion is met if: (1) stored data 620 includes a metadata 610*b* (and/or control data 615*b*) comprising a data property 650 which can be an address, pointer, index or flag that matches the address 630*a*, pointer 635*a*, index 640*a*, or flag 645*a* in the single read data 600, respectively; and additionally, (2) stored data 621 includes a metadata 610*c* (and/or control data 615*c*) comprising a data property 651 which can be an address, pointer, index or flag that matches the address 630*a*, pointer 635*a*, index 640*a*, or flag 645*a* in the read data 600, respectively. The memory interface 80 will perform multiple prefetch reads (multiple prefetching of stored data 620 and 621) in relation to a single read data 600, since the stored data 620 and 621 meet the prefetch selection criteria in accordance with an embodiment of the invention.

As another specific example, a prefetch selection criterion is met if most or all of the stored data 621, 622, 623, and 624 include data properties 651, 652, 653, and 654, respectively, that matches any of the addresses 630*a* or 631*a*, pointers 635*a* or 636*a*, indices 640*a* or 641*a*, or flags 645*a* or 646*a* in the single read data 600. The memory interface 80 will perform multiple prefetch reads (multiple prefetching) of any of the stored data 620-624 that meet the prefetch selection criteria in relation to a single read data 600. If the stored data 620, 621, 622, 623, or 624 meets the prefetch selection criteria, then the memory interface 80 will store a copy of these stored data as prefetch data 645*a*, 645*b*, 645*c*, 645*d*, or 645*e*, in the prefetched buffer(s) 89 in multiple prefetched reads and these prefetch data 645*a*-645*e* are available in a forwarding transaction.

The metadata and/or control data in a stored data can also have two or more data properties that meet the prefetch selection criteria so that the stored data can be prefetched by the memory interface 80 in prefetched reads. For example, the metadata 610*d* and/or control data 615*d* in stored data 622 includes data properties 652 and 656 which can be, for example, any two of data properties comprising an address, a pointer, an index, or a flag. Similarly, the metadata 610*e* and/or control data 615*e* in stored data 623 includes data properties 653 and 657 which can be, for example, any two of data properties comprising an address, a pointer, an index, or a flag. Similarly, the metadata 610*f* and/or control data 615*f* in stored data 624 includes data properties 654 and 658 which can be, for example, any two of data properties comprising an address, a pointer, an index, or a flag.

Figure 7:
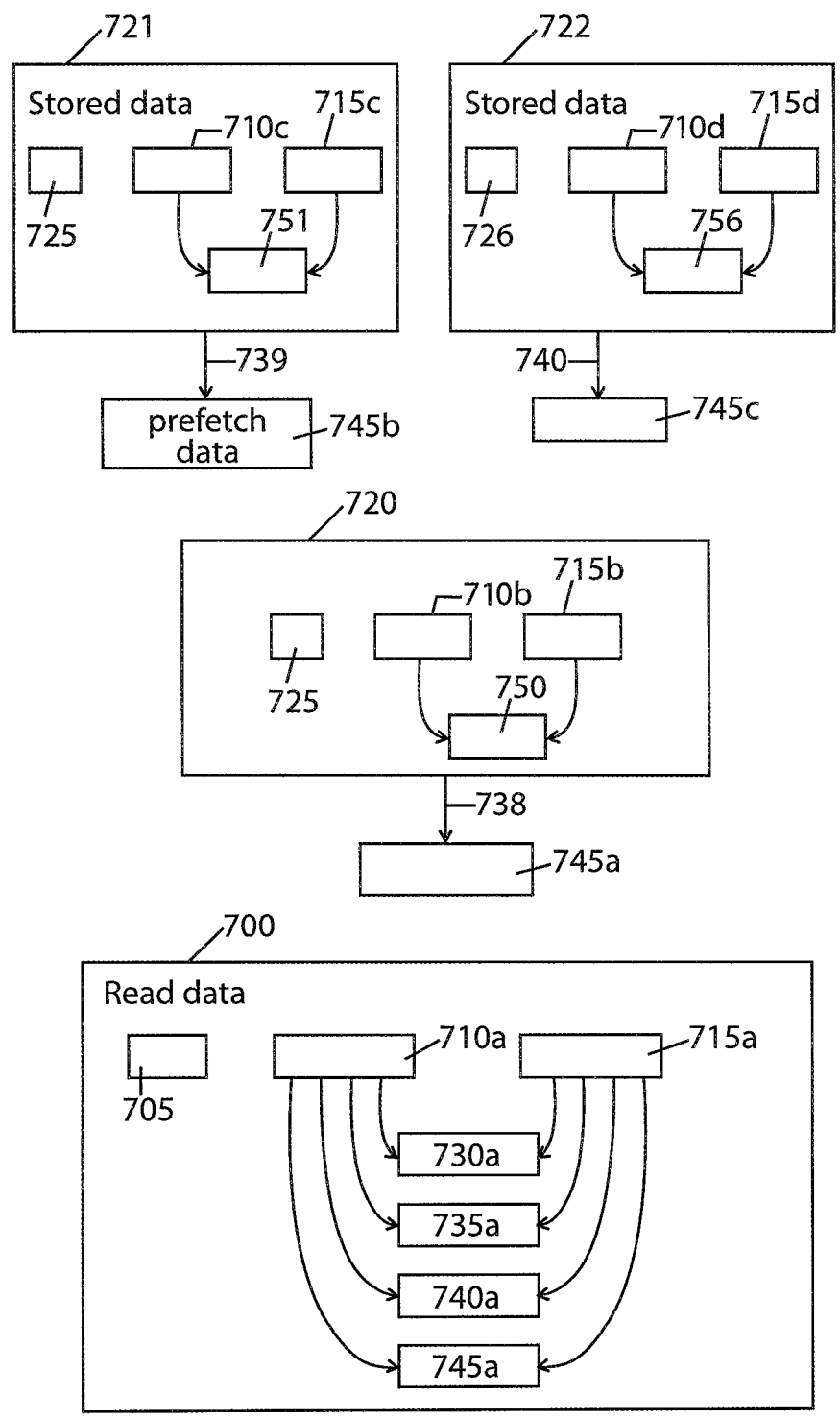
FIG. 7 is a block diagram that illustrates multiple prefetch reads (successive multiple prefetching of data), wherein a prefetch data contains metadata (and/or control data) that points to (or is linked with) an additional one or more stored data to be prefetched as prefetch data, in accordance with an embodiment of the invention.

Reference is now made to FIGS. 3 and 7.

FIG. 7 is a block diagram that illustrates multiple prefetch reads (successive multiple prefetching of data), wherein a prefetch data contains metadata (and/or control data) that points to (or is linked with) an additional one or more stored data to be prefetched as prefetch data, in accordance with an embodiment of the invention. The read data 700 includes a data portion 705 and data properties such as metadata 710*a* and/or control data 715*a*. As similarly discussed above, if one or more stored data in one or more flash devices in memory array 82 has metadata (or control data) with a value that matches a value in the metadata 710*a* (or control data 715*a*) of read data 700, then the stored data meets a prefetch selection criterion and the memory interface 80 will perform an internal read operation so that a copy of the one or more stored data are stored (738) as prefetch data (or prefetch datum) in at least one prefetch buffer 89. For example, the single read data 700 includes multiple address 730*a*, pointer 735*a*, index 740*a*, and/or flags 745*a*. Each of the addresses, pointers, indices, and/or flags in the single read data 700 can vary in number. If any value of the address 730*a*, pointers 735*a*, index 740*a*, and/or flag 745*a* matches a value of any of the address, pointer, index, and/or flag in the stored data 720 (having data portion 725), then a prefetch selection criterion is met and the memory interface 80 will then retrieve a copy of stored data 720 from memory array 82 and will store this retrieved copy into the prefetch buffer 89 as a first prefetch data 745*a* during a first internal read operation (738).

The stored data 721 in the memory array 82 includes a data portion 726, and also includes metadata 710*c* and control data 715*c*. The stored data 722 in the memory array 82 includes a data portion 728, and also includes metadata 710*d* and control data 715*d*.

In one embodiment, the first prefetch data 745*a* contains metadata 710*b* (and/or control data 715*b*) that points to (or is linked with) an additional one or more stored data to be prefetched as prefetch data. For example, a prefetch selection criterion is also met if any or all of the stored data 721 and 722 (in any of flash devices 70-1 and 70-*n*) includes one or more data properties 751 and 756 matching or corresponding to any of the data properties 750 of the prefetch data 745*a*. If any (or all) of the stored data 721 and/or 722 meets a prefetch selection criterion, then the memory interface 80 will store a copy of the stored data matching the prefetch selection criterion as a prefetch data into a prefetch buffer 89.

As an example, a prefetch selection criterion is met if: (1) stored data 721 includes a metadata 710*c* (and/or control data 715*c*) that matches the metadata 710*b* and/or control data 715*b*; and additionally, (2) stored data 722 includes a metadata 710*d* (and/or control data 715*d*) that matches the metadata 710*b* and/or control data 715*b* of the prefetch data 745*a*. In this example, the memory interface 80 will perform multiple prefetch reads (multiple prefetching of stored data 721 and 722) in relation to a first single prefetch data 745*a*, since the stored data 721 and 722 meet the prefetch selection criteria, in accordance with an embodiment of the invention. Therefore, the memory interface 80 performs a second prefetch read (739) of the stored data 720 and stores a copy of the stored data 720 into the prefetch buffer 89 as a second prefetch data 745*b*, and the memory interface 80 will subsequently perform a third prefetch read (740) of the stored data 722 and store a copy of the stored data 722 into the prefetch buffer(s) 89 as a prefetch data 745*c*. The process of performing prefetch reads and storing prefetch data into the prefetch buffer(s) 89 are multiple internal read operations (738, 739, and 740) similarly described above. Subsequently, a forwarding transaction, as similarly discussed above, can be performed wherein the memory interface 80 retrieves the prefetch data 745*b* and/or 745*c* (stored in prefetch buffer(s) 89) and forwards the prefetch data 745*b* and/or 745*c* to a requesting host, such as host 76-1 or host 76-*n*.

If only one of the stored data 721 or 722 meet the prefetched selection criteria, then that stored data 721 or 722 meeting the prefetched selection criteria is stored in prefetch buffer(s) 89 during an internal read operation. Similarly, more two stored data in the memory array 82 can meet the prefetched selection criteria and stored in prefetch buffer(s) 89 during an internal read operation.

The metadata or control data of a prefetch data can be configured to point to other data to be prefetched by use of a suitable technique or mechanism such as, e.g., table mapping, that can be read by the local processor 104 in one embodiment. For example, the metadata could be a list of addresses as follows:

0x0000 flashdeviceindexA, flash addressA
0x0010 flashdeviceindexB, flash addressB
0x0020 flashdeviceindexC, flash addressC
0x0030 flashdeviceindexD, flash addressD
. . .
0x0040 flashdeviceindexE, flash addressE.

Alternatively, the metadata/control data could be any applicable existing or proprietary directory structure, e.g., FAT, NTFS, the data structure disclosed in commonly-owned and commonly-assigned U.S. Pat. No. 7,506,098 entitled "OPTIMIZED PLACEMENT POLICY FOR SOLID STATE STORAGE DEVICES" and related commonly-assigned and commonly-owned patents, or other suitable structures.

As a specific example, a prefetch selection criterion is met if: (1) stored data 721 includes a metadata 710c (and/or control data 715c) comprising a data property 751 which can be an address, pointer, index or flag that matches the address, pointer, index, or flag in the data property 750 in the single prefetch data 745a; and additionally, (2) stored data 722 includes a metadata 710d (and/or control data 715d) comprising a data property 756 which can be an address, pointer, index or flag that matches the address, pointer, index, or flag in the data property 750 in the single prefetch data 745a. The memory interface 80 will perform multiple prefetch reads (multiple prefetching of stored data 720 and 722) in relation to a prefetch data 745a, since the stored data 721 and 722 meet the prefetch selection criteria in accordance with an embodiment of the invention.

Additionally, in FIG. 6 as previously discussed above, any or a plurality of the prefetch data 645a-645e (FIG. 6) may contain metadata (or control data) that includes addresses, pointers, indices, and/or flags that points to (matches) the data properties of one or more additional stored data in the memory array 82 so that the memory interface 80 also subsequently performs an internal read for this one or more additional stored data and will store a copy of this one or more additional stored data in the prefetched buffer 89 as prefetch data (or prefetched datum). The memory interface 80 can perform a forwarding operation on this prefetch data or prefetched datum, as similarly discussed above.

Figure 8:
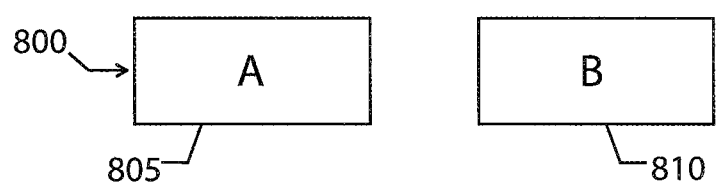
FIG. 8 is a block diagram that illustrates example first and second configuration settings that were discussed with reference to FIG. 6 and/or FIG. 7, in accordance with an embodiment of the invention.

FIG. 8 is a block diagram that illustrates example configuration settings that were discussed with reference to FIG. 6 and/or FIG. 7, in accordance with an embodiment of the invention. As discussed above, these configuration settings 800 can be used by the storage apparatus 66 during the prefetching of stored data from the memory array 82.

The example configuration settings 800 are as follows. For example, first configuration settings 805 will set the number of outstanding prefetches (prefetch reads) per read data. Therefore, for every read data that is read by the memory interface 80 (via DMA controller 88 and flash memory controller 92) from the memory array 82, the configuration settings 805 will limit the maximum number "A" of outstanding prefetches per the read data, where "A" can be any suitable integer value above zero. Therefore, for a read data, the memory interface 80 will first read the read data and then perform any additional subsequent prefetches of additional stored data in the memory array 82 at a given maximum number "A" (or a number less that "A") wherein the additional stored data meets a prefetch selection criterion that was similarly discussed above.

As another example, second example configuration settings 810 will set the number of outstanding prefetches (prefetch reads) per flash die. Therefore, for every read data that is read by the memory interface 80 from the memory array 82, the configuration settings 805 will limit the maximum number "B" of outstanding prefetches per flash die (that includes the memory array 82) per read data, where "B" can be any suitable integer value above zero. Therefore, for a read data, the memory interface 80 will first read the read data and then perform any additional subsequent prefetches of additional stored data in the memory array 82 at a given maximum number "B" (or a number less than "B") wherein the additional stored data meets a prefetch selection criterion that was similarly discussed above.

The above-described configuration settings 800 are just some examples of configuration settings that can be used by the storage apparatus 66 during the prefetching of stored data from the memory array 82. Those skilled in the art with the benefit of the disclosure herein will appreciate that other types of configuration settings or combinations of different types of configuration settings are possible in an embodiment of the invention.

Figure 9:
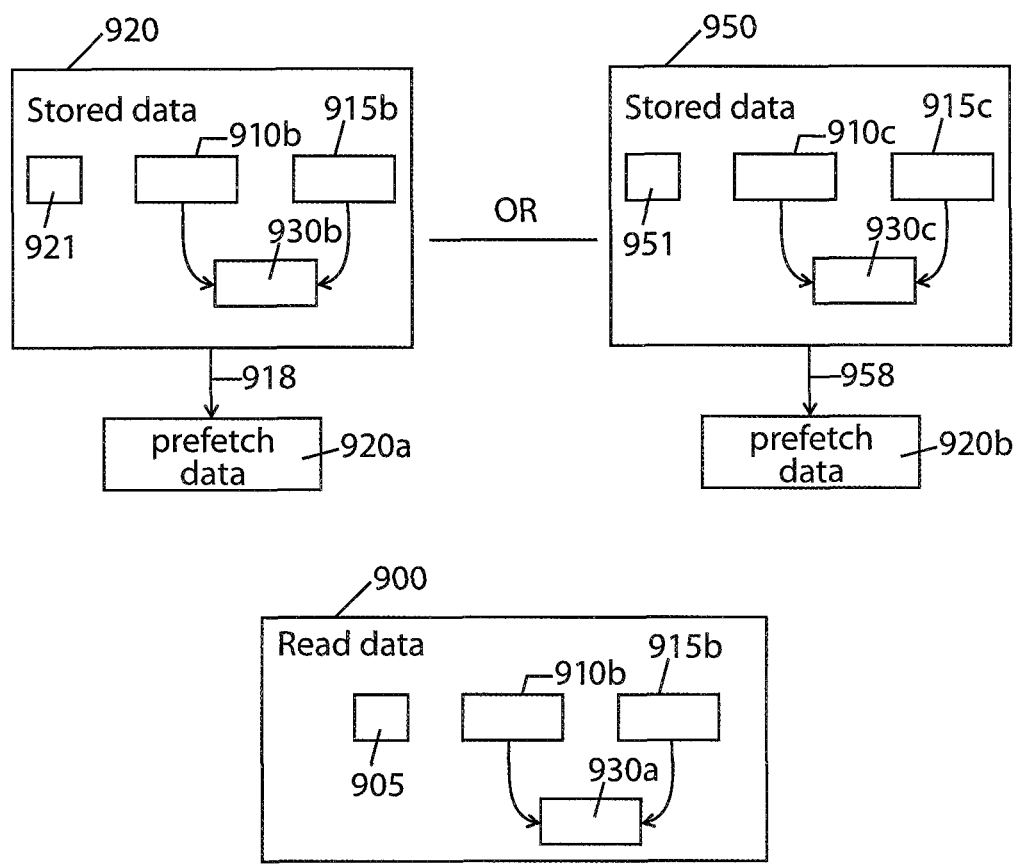
FIG. 9 is a block diagram that illustrates other prefetch selection criteria, in accordance with an embodiment of the invention.

Reference is now made to FIG. 3 and FIG. 9.

FIG. 9 is a block diagram that illustrates other prefetch selection criteria, in accordance with an embodiment of the invention. The memory interface 80 (FIG. 3) reads the read data 900 (FIG. 9) from a memory array 82 and returns this read data 900 to a requesting host (e.g., host 76-1), in response to a first memory read transaction request 68 (read operation 68) from the requesting host. The read data 900 includes a data portion 905 and also includes data properties such as metadata 910a and/or control data 915a and these data properties include the address 930b in the memory array 92 of the stored data 920. The stored data 920 in the memory array 82 includes a data portion 921 and data properties such as metadata 910b and/or control data 915b. In an embodiment of the inventions, as another prefetch selection criteria, if the stored data 920 has a data address 930b that is the next odd flash address in relation to the flash address 930a of read data 900, then the stored data 920 meets a prefetch selection criteria, and the memory interface 80 will perform an internal read operation in order to store (918) a copy of the stored data 920 into prefetch buffer 89 as a prefetch data 920a. The memory interface 80 can then perform a forwarding operation on the prefetch data 920a, as similarly discussed above.

The stored data 950 in the memory array 82 includes a data portion 951 and data properties such as metadata 910c and/or control data 915c. In an embodiment of the invention, as another prefetch selection criteria, if the stored data 950 has a data address 930c that is the next even flash address in relation to the flash address 930a of read data 900, then the stored data 950 instead meets a prefetch selection criteria, and the memory interface 80 will perform an internal read operation in order to store (958) a copy of the stored data 950 into prefetch buffer 89 as a prefetch data 920b. The memory interface 80 can then perform a forwarding operation on the prefetch data 920b, as similarly discussed above.

Another embodiment of the invention considers the characteristics of certain flash devices having "fast" and "slow" pages. Assuming that the processor or the memory interface or the metadata/control data having knowledge which flash pages are "fast" and which ones are "slow", it is possible to have a prefetching sequence as follows:

1. Fast-slow-fast-slow
2. slow-fast-slow-fast
3. Fast-fast-fast-fast
4. slow-slow-slow-slow
5. and any other pattern as deemed beneficial.

Figure 10:
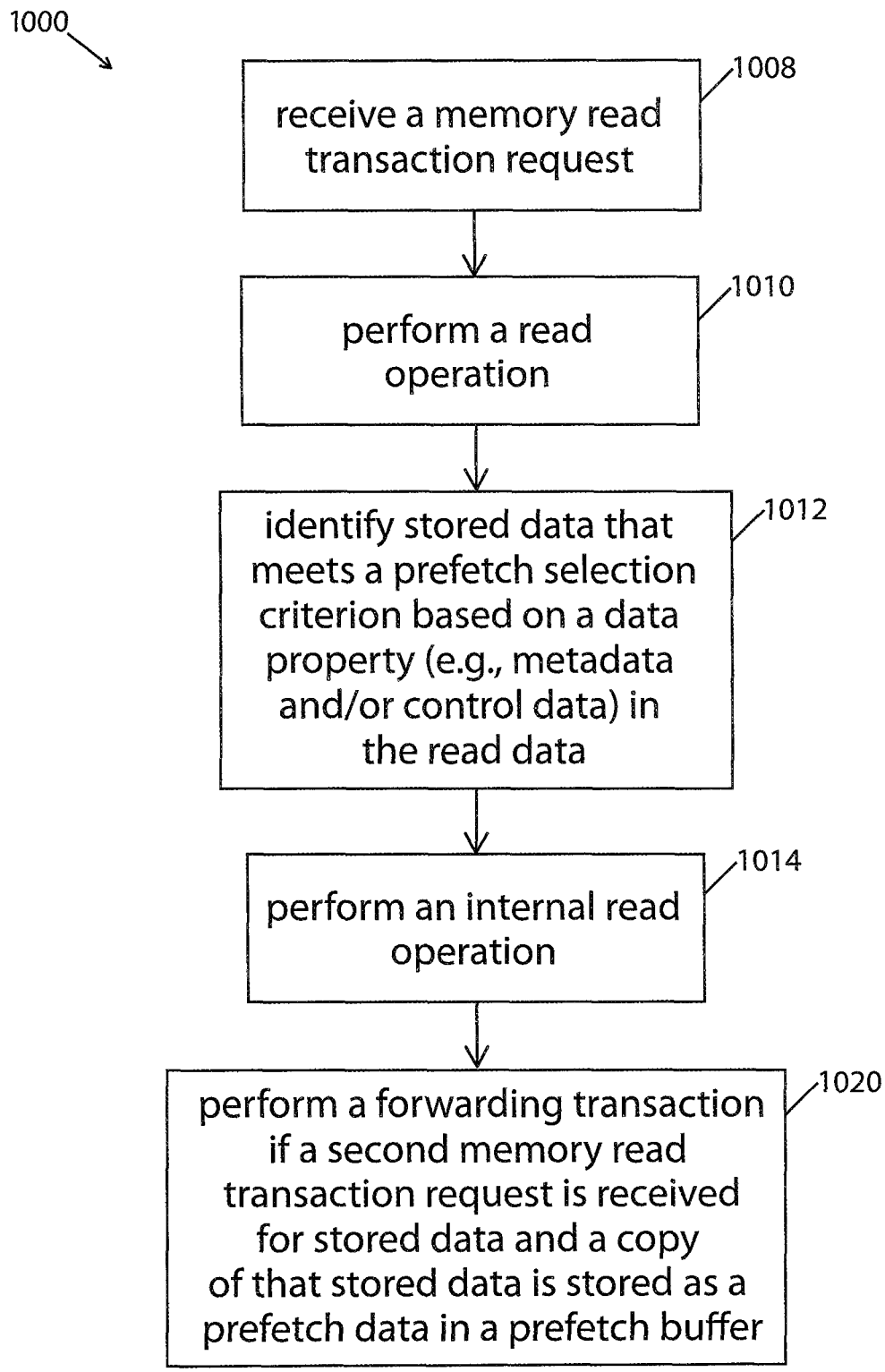
FIG. 10 is a flow diagram of another method for performing a reduced latency memory transaction, in accordance with another embodiment of the invention.

FIG. 10 is a flow diagram of another method 1000 for performing a reduced latency memory transaction, in accordance with another embodiment of the invention. This method 1000 may be performed by using a reduced latency memory interface that is coupled to a memory array that includes a flash device and also coupled to a buffer set that includes a buffer. These elements may be provided in a storage apparatus, such as storage apparatus 66 in FIG. 3 and any or all of the components in FIGS. 5, 6, 7, 8, and/or 9.

Under the method shown, a memory read transaction request is received 1008. For example, as shown in FIG. 3, a host 76-1 may send a first memory read transaction request 68 to storage apparatus 66, which uses host interface 102 to receive memory read transaction request 68. A read operation is then performed 1010. This read operation may be performed by memory interface 80 by obtaining read data requested by host 76-1 from memory array 82. For example, in FIG. 3, memory array 82 responds to memory read transaction request 68 and obtains read data from memory array 82, returning read data to host 76-1 if this data is available.

Local processor 104 identifies 1012 data currently stored in memory array 82 that meets a prefetch selection criterion. For example, in FIG. 3, local processor 104 identifies stored data in memory array 82 wherein the stored data meets a prefetch selection criterion based on a data property (e.g., metadata and/or control data) in the read data.

If prefetch data is identified, an internal read operation is performed 1014. For example, in FIG. 3, memory interface 80 causes a flash device in memory array 82 that holds this prefetch data, such as prefetch data 86, to transfer the prefetch data 86 from a flash page storing the prefetch data. Additionally, the internal read operation includes local processor 104 allocating a buffer as a prefetch buffer in buffer set 84 for storing prefetch data 86. The internal read operation further includes storing prefetch data 86 in a prefetch buffer, such as prefetch buffer 89.

If a second memory read transaction request is received for data and that data is stored as prefetch data in a prefetch buffer, a forwarding transaction is performed 1020. For example, referring to FIG. 3, if a second memory read transaction request 106 is received for data and that data is stored as prefetch data 86 in prefetch buffer 89, local processor 104 responds to memory read transaction request 106 and retrieves prefetch data 86 from prefetch buffer 89. Local processor 104 forwards prefetch data 86 from prefetch buffer 89 to local memory 100. Local processor 104 forwards prefetch data 86 from local memory 100 to host 76-1. This transfer of prefetch data 86 from buffer set 84 to local memory 100 is not depicted in FIG. 3 to avoid overcomplicating this disclosure herein in this application. In this example, flash devices 70-1 through 70-n function as mass storage devices. However, in another embodiment (not shown), these flash devices may function as a cache to another type of storage device such as, for example, a set of HDDs arrange in a RAID, JBOD, or other configuration. As an example, this set of HDDs is not shown in the drawings to avoid overcomplicating the disclosure herein, but may be included as part of the memory array such as, for example, memory array 82 in FIG. 3.

FIG. 11 is a block diagram that illustrates a reduced read latency method applied to deduplication/repeating pattern elimination method, in accordance with an embodiment of the invention. This method for reducing read latency can also be performed by the storage apparatus 66 in FIG. 3.

Let there be stored data 1100 and stored data 1150. Let there be data portion 1105a, metadata 1110a, and control data 1115a associated with stored data 1100. Likewise, let there be data portion 1105b, metadata 1110b, and control data 1115b associated with stored data 1150.

There are embodiments wherein identical data are stored in the flash array, for example, stored data 1100 and stored data 1150. In this case the data portion 1105a is identical to data portion 1105b. However, in an effort to reduce the effective space occupied inside the flash array, the data portion 1105a of stored data 1100 is not physically stored inside the flash array. Instead, the metadata 1110a and control data 1115a of stored data 1100 points to stored data 1150, indicating that the contents of the data portion 1105a of stored data 1100 can be found by reading the contents of the data portion 1105b of stored data 1150. Additional details directed to repeating pattern elimination are disclosed in commonly-owned and commonly-assigned U.S. patent application Ser. No. 14/855,245, which is entitled "Write-to-Flash Elimination of Patterned-Data Host Writes" and which lists Carlos Jr. Rosco Jones, Jik-Jik Oyong Abad, and Mark Edward Ching Belmonte as inventors. U.S. patent application Ser. No. 14/855,245 is hereby fully incorporated herein by reference.

This repeating pattern elimination feature relates to reduced read latency as follows. For example, the host (e.g. host 76-1 or host 76-n in FIG. 3) only requested to read data 1100. However, the local processor 104 knows that the data portion 1105a of read data 1100 can be found by reading the data portion 1105b of stored data 1150. In this case, the local processor 104 can use a concept in this reduced read latency invention so that when the local processor 104 reads data 1100, the succeeding read of stored data 1150 would have reduced latency. The requesting host will then receive stored data 1100 wherein the data portion 1105b is sent to the host in lieu of data portion 1105a.

Figure 12A:
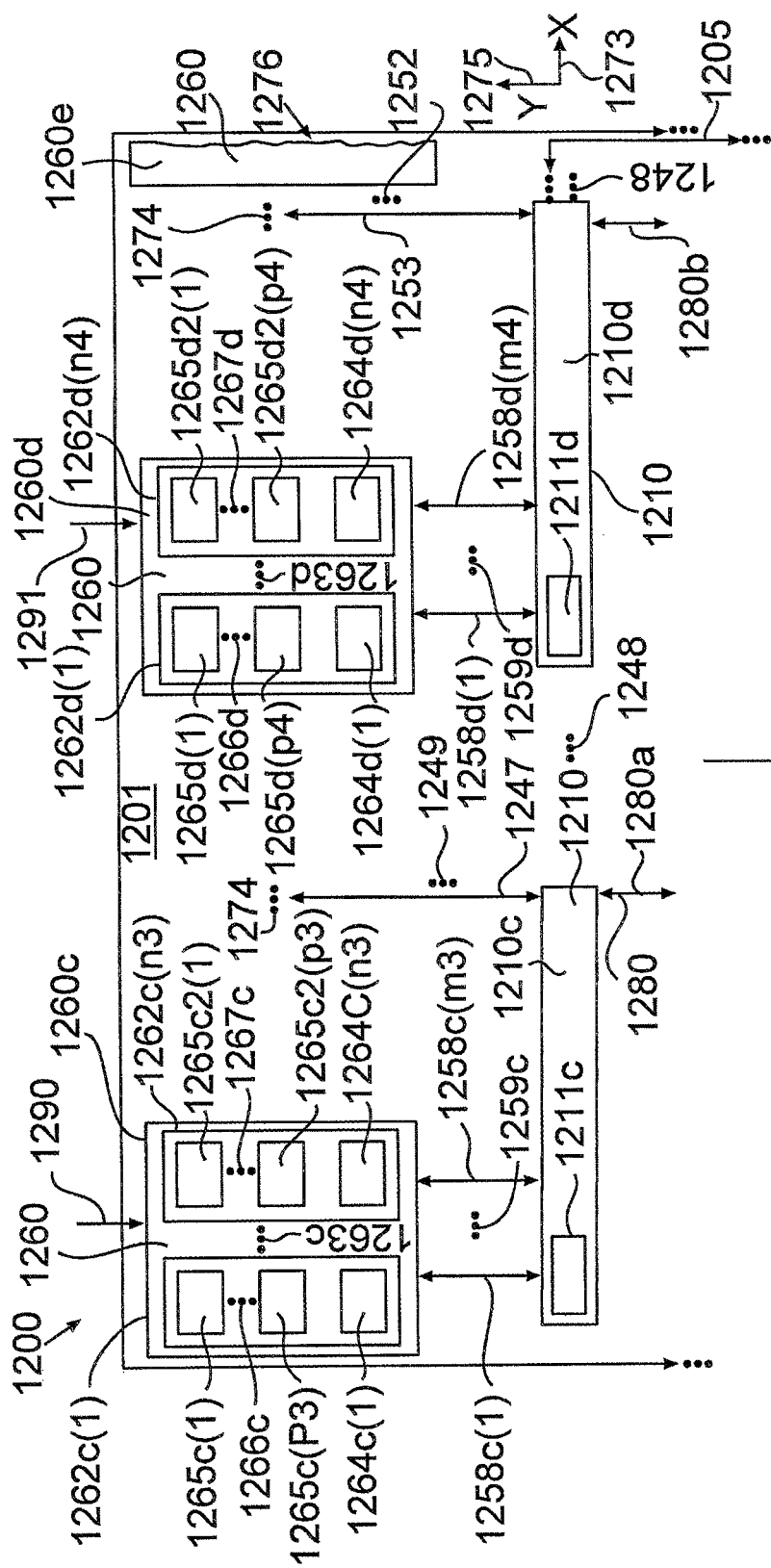
FIGS. 12A, 12B, and 12C are block diagrams that illustrate a system or apparatus with a memory interface with an expandable architecture that reduces latency, in accordance with an embodiment of the invention.
Figure 12B:
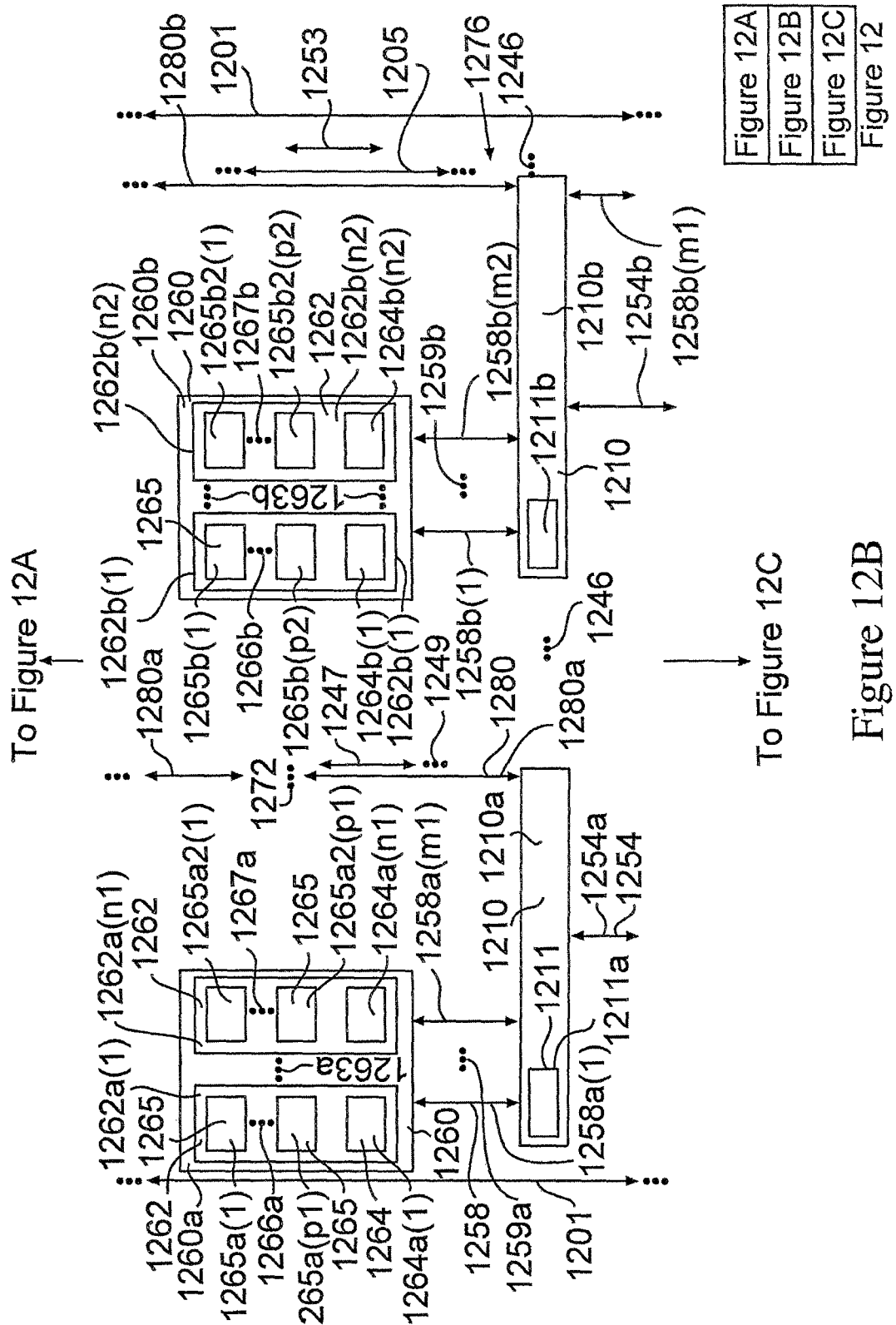
Figure 12C:
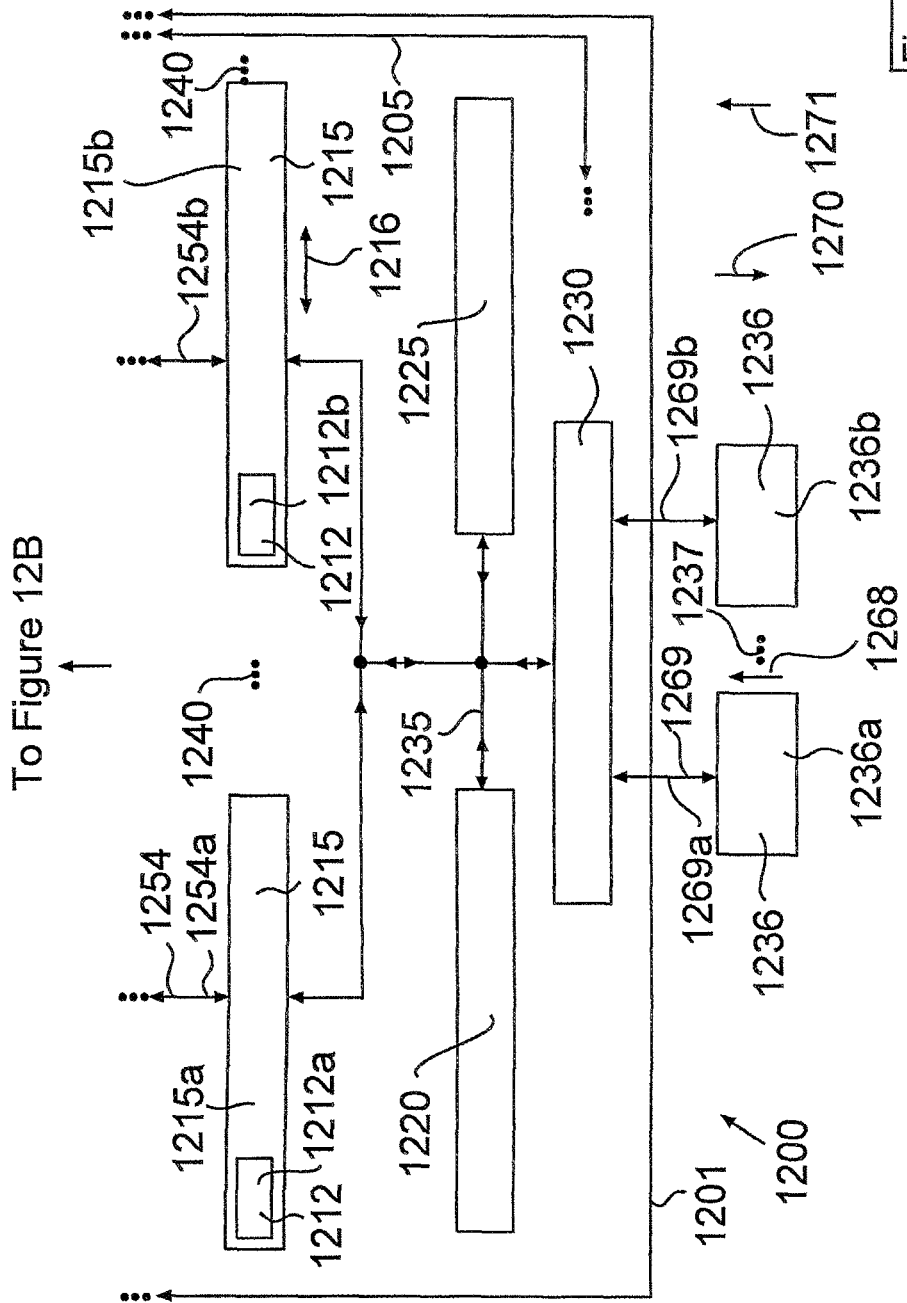

FIG. 12 is a block diagram that illustrates a system 1200 (or apparatus 1200) with a memory interface 1205 with an expandable architecture that reduces latency, in accordance with an embodiment of the invention. The system 1200 comprises a storage apparatus 1201 (storage system 1201) with the memory interface 1205 that will be discussed below. At least some of the features previously discussed above may be combined with or/and included in the storage apparatus 1201.

In FIG. 12, as well as in the subsequent figures discussed below and previous figures discussed above, for purposes of explanation and/or clarity, numerous specific details are set forth in order to provide a thorough understanding thereof. It may be evident, however, that the novel embodiments can be practiced without these specific details shown in the figures. In other instances, well known structures and devices are shown in block diagram form in order to facilitate a description thereof. The intention is to cover all modifications, equivalents, and alternatives consistent with the claimed subject matter.

The storage apparatus 1201 comprises the memory interface 1205 with the expandable architecture for reducing memory read latency. In one embodiment, the memory interface 1205 comprises multiple components that form a network-like fabric memory interface that will be discussed below.

In an embodiment of the invention, the memory interface 1205 comprises an IC (input/output) flash interconnect which can be embodied as a network of DMA controllers, flashbus (or memory bus) links, and flashbus (memory) controllers, and/or as a point-to-point serial bus topology and/or network-like fabric, similar to the way the point-to-point serial bus topology and/or network-like fabric are disclosed in, for example, commonly-owned and commonly-assigned. U.S. application Ser. No. 14/217,161, which is entitled MULTI-CHIP MEMORY CONTROLLER CONNECTED TO A PLURALITY OF MEMORY ARRAY VIA COMMUNICATION BUS. U.S. application Ser. No. 14/217,161 is hereby fully incorporated herein by reference.

In an embodiment of the invention, the memory interface 1205 comprises a plurality of memory controllers (generally referred to as memory controllers 1210 or flash memory controllers 1210), a plurality of DMA (Direct Memory Access) controllers (generally referred to as DMA controllers 1215), and bus links or channels that couple these controllers 1210 to each other, and/or that couple the controllers 1210 to the controllers 1215.

In an embodiment of the invention, the plurality of memory controllers 1210 comprises a plurality of flash memory controllers 1210.

In the description herein, the elements 1210 are shown as example elements 1210a, 1210b, 1210c, 1210d, and other similar numeral reference with the prefix "1210". The element 1210 is generally referred to as memory controller 1210 or flash memory controller 1210 for convenience. The element 1210 can be a flash memory controller 1210 or another type of memory controller 1210 that can function with nonvolatile memory devices in a memory module 1260, depending on the type of nonvolatile memory devices in a memory module 1260 that functions with the memory controller 1210.

The DMA controllers 1215 are coupled to at least one local processor 1220, at least one local memory 1225, and at least one host interface 1230 via a system bus 1235.

Each flash memory controller 1210 comprises an associated flash memory controller buffer 1211, or each memory controller 1210 comprises an associated memory controller buffer 1211. Each DMA controller 1215 comprises an associated DMA controller buffer 1212. Examples of a local processor 1220, local memory 1225, host interface 1230, and flash memory devices 1262 that are shown in FIG. 12 were similarly discussed above.

In an embodiment of the invention, the storage apparatus 1201 comprises one local processor 1220 or a plurality of processors 1220, one local memory 1225 or a plurality of local memories 1225, and one host interface 1230 or a plurality of host interfaces 1230.

One host 1236 or a plurality of hosts 1236 are coupled, via the host interface 1230, to the storage apparatus 1201. The one or more hosts 1236 that are coupled to the storage apparatus 1201 may vary in number as symbolically shown by the dot symbols 1237. As an example, the hosts 1236 comprise a host 1236a and a host 1236b that are both coupled, via the host interface 1230, to the storage apparatus 1201. As another example, the hosts 1236 comprise: (1) a host 1236a that is coupled, via a first host interface 1230, to the storage apparatus 1201, and (2) a host 1236b that is coupled, via a second host interface (not shown in FIG. 12), to the storage apparatus 1201. As another example, only a single host 1236 is coupled, via the host interface 1230, to the storage apparatus 1201.

In one embodiment of the invention, the memory interface 1205 comprises a plurality of flash memory controllers 1210 and a plurality of DMA controllers 1215 wherein the memory interface 1205 is coupled, via a system bus 1235, to at least one local processor 1220, at least one local memory 1225, and at least one host interface 1230. The DMA controllers 1215 are coupled in parallel (i.e., are coupled in a parallel connection 1216) to the system bus 1235.

In another embodiment of the invention, the memory interface 1205 instead comprises a plurality of flash memory controllers 1210, a plurality of DMA controllers 1215, at least one local processor 1220, at least one local memory 1225, and at least one host interface 1230, wherein the DMA controllers 1215 are coupled, via the system bus 1235, to at least one local processor 1220, at least one local memory 1225, and at least one host interface 1230.

The memory interface 1205 comprises at least two DMA controllers 1215 that are each coupled to respective flash memory controllers 1210 via a point-to-point topology, and wherein the at least two DMA controllers 1215 are both coupled in parallel (i.e., are coupled in a parallel connection 1216) to the system bus 1235. For example, the memory interface 1205 comprises: (1) a DMA controller 1215a that is coupled to the system bus 1235 and to a flash memory controller 1210a; and (2) a DMA controller 1215b that is coupled to the system bus 1235 and to a flash memory controller 1210b. The DMA controllers 1215a and 1215b are coupled in parallel to the system bus 1235, as similarly noted above. More than two DMA controllers 1215 can be coupled in parallel to the system bus 1235, as symbolically shown the dot symbols 1240.

The DMA controllers 1215 are coupled to the flash memory controllers 1210 via the point-to-point topology that is disclosed in, for example, commonly-owned and commonly-assigned U.S. application Ser. No. 14/217,161 or that is formed by data bus configurations that use a standard specification.

The memory interface 1205 can have more than two DMA controllers 1215 that are coupled to respective flash memory controllers 1210 and that are coupled in parallel (i.e., are coupled in a parallel connection 1216) to the system bus 1235. Therefore, the memory interface 1205 can be expanded, as symbolically shown by the dot symbols 1240, to include a plurality of DMA controllers 1215 that are coupled to the system bus 1235 and that are also coupled to respective flash memory controllers 1210. Accordingly, the memory interface 1205 comprises an expandable architecture 1276 by connecting two or more DMA controllers 1215 to the system bus 1235 in order to advantageously provide reduced latency in memory read operations as discussed herein.

The memory interface 1205 further comprises at least one flash memory controller 1210 that is coupled in series to at least one other flash memory controller 1210 via point-to-point topology that is disclosed in, for example, commonly-owned and commonly-assigned U.S. application Ser. No. 14/217,161 or that is formed by data bus configurations that use a standard specification. For example, the flash memory controller 1210a is coupled in series (i.e., is coupled in a serial connection 1247) to the flash memory controller 1210c. The flash memory controller 1210c may be a coupled in series to another flash memory controller that is not shown in FIG. 12 but is shown, for example, in FIG. 13. Therefore, the memory interface 1205 provides an expandable architecture 1276 that can be expanded, as symbolically shown by the dot symbols 1249, to include one or more flash memory controllers 1210 that are coupled in series (i.e., that are coupled in a serial connection 1247) to the flash memory controller 1210a. The number of flash memory controllers 1210 that are connected in series in the memory interface 1205 may vary. For example, the memory interface 1205 comprises the DMA controller 1215*a*, flash memory controller 1210*a*, and flash memory controller 1210*c* that are all connected together in series. As another example, the memory interface 1205 comprises the DMA controller 1215*a*, flash memory controller 1210*a*, flash memory controller 1210*c*, and another flash memory controller that are all connected together in series. As another example, the memory interface 1205 comprises the DMA controller 1215*a* and four or more flash memory controllers 1210 that are all connected in series.

As another example, the memory interface 1205 provides an expandable architecture 1276 if the flash memory controller 1210*b* is coupled in series to the flash memory controller 1210*d*. The flash memory controller 1210*d* may be a coupled to another flash memory controller, as symbolically shown by the dot symbols 1252. As such, one or more flash memory controllers 1210 may be coupled in series (are coupled in a serial connection 1253) to the flash memory controllers 1210*b*. For example, the memory interface 1205 comprises the DMA controller 1215*b*, flash memory controller 1210*b*, and flash memory controller 1210*d* that are all connected together in series. As another example, the memory interface 1205 comprises the DMA controller 1215*b*, flash memory controller 1210*b*, flash memory controller 1210*d*, and another flash memory controller that are all connected together in series. As another example, the memory interface 1205 comprises the DMA controller 1215*b* and four or more flash memory controllers 1210 that are all connected in series. Therefore, the memory interface 1205 provides an expandable architecture when additional flash memory controllers 1210 are coupled to the DMA controllers 1215 in order to advantageously provide reduced latency in memory read operations as discussed herein.

Since the number of DMA controllers 1215 can vary and can be increased, as shown by dot symbols 1240, the number of flash memory controllers 1210 (which are directly coupled to the DMA controllers 1215 by one or more bus 1254) can also vary and can be increased, as shown by dot symbols 1246, so that a given DMA controller 1215 is directly coupled to a corresponding given flash memory controller 1210. For example, the DMA controller 1215*a* is directly coupled by bus 1254*a* to the flash memory controller 1210*a* and the DMA controller 1215*b* is directly coupled by bus 1254*b* to the flash memory controller 1210*b*. Each bus 1254 (as well as bus 1254*a*, bus 1254*b*, and bus 1254*c*) are also referred herein as a DMA-controller-to-Memory-controller bus 1254.

The DMA controllers 1215*a* and 1215*b* include the DMA controller buffers 1212*a* and 1212*b*, respectively.

The flash memory controllers 1210*a*, 1210*b*, 1210*c*, and 1210*d* include the memory controller buffers 1211*a*, 1211*b*, 1211*c*, and 1211*d*, respectively.

As discussed above, the DMA controllers 1215*a* and 1215*b* are coupled to a first group of flash memory controllers 1210 comprising flash memory controllers 1210*a* and 1210*b*, respectively. The first group of flash memory controllers comprising flash memory controllers 1210*a* and 1210*b* are also denoted herein as upstream flash memory controllers 1210*a* and 1210*b*. The number of upstream flash memory controllers may vary.

The first group of flash memory controllers comprising upstream flash memory controllers 1210*a* and 1210*b* are, in turn, directly coupled to a second group of flash memory controllers 1210 comprising flash memory controllers 1210*c* and 1210*d*, respectively. The second group of flash memory controllers comprising flash memory controllers 1210*c* and 1210*d* are also denoted herein as downstream flash memory controllers 1210*c* and 1210*d*. The number of downstream flash memory controllers may vary. As also discussed above, one or more additional downstream flash memory controllers may be coupled to the downstream flash memory controller 1210*c* and included in the memory interface 1205, as symbolically shown by dot symbols 1249. Similarly, one or more additional downstream flash memory controllers may be coupled to downstream memory controller 1210*d* and included in the memory interface 1205, as symbolically shown by dot symbols 1252.

Each flash memory controller 1210 is directly coupled by a memory bus 1258 to a corresponding flash memory module 1260 (flash memory array 1260). A corresponding additional memory module 1260 (corresponding additional memory array 1260) can be coupled to each of the one or more additional downstream flash memory controllers 1210 (as symbolically shown by dot symbols 1249). Similarly, a corresponding additional memory module 1260 can be coupled to each of the one or more additional downstream flash memory controllers 1210 (as symbolically shown by dot symbols 1252). As will be discussed below, these additional flash memory controllers 1210 and additional flash memory modules 1260 permit a buffer set (comprising buffers in flash memory controllers 1210, buffers in DMA controllers 1215, and data registers in memory modules 1260) to be expanded in the storage apparatus 1201, as will be discussed below in additional details.

Accordingly, the number of upstream flash memory controllers 1210, as determined by the dot symbols 1246, will depend on the number of DMA controllers 1215, as determined by the dot symbols 1240. For example, in the storage apparatus 1201, if there are two DMA controllers 1215*a* and 1215*b*, then there will be two upstream flash memory controllers 1210*a* and 1210*b* that are directly coupled to the two DMA controllers 1215*a* and 1215*b*, respectively.

Similarly, the number of downstream flash memory controllers 1210, as determined by the dot symbols 1248 and 1249 and 1252, will depend, in part, on the number of upstream flash memory controllers 1210 that are determined by the dot symbols 1246. For example, in the storage apparatus 1201, if there are two upstream flash controllers 1210*a* and 1210*b*, then there will be two downstream flash memory controllers 1210*c* and 1210*d* that are directly coupled to the two upstream flash controllers 1210*a* and 1210*b*, respectively, and potentially one or more additional downstream flash memory controllers that are serially coupled to the flash controllers 1210*c* and/or 1210*d*.

Each flash memory controller 1210 is coupled, via memory bus 1258 (or flash bus 1258), to a memory module 1260 (memory array 1260). For example, in the storage apparatus 1201, the flash memory controllers 1210*a*, 1210*b*, 1210*c*, and 1210*d* are coupled by memory buses 1258 to the memory modules 1260*a*, 1260*b*, 1260*c*, and 1260*d*, respectively.

The number of memory bus (memory bus links) 1258 coupled between a flash memory controller 1210 and memory module 1260 may vary, as symbolically shown by the dot symbols 1259*a*. For example, the memory bus 1258 coupled between the flash memory controller 1210*a* and memory module 1260*a* comprises the memory bus 1258*a*(1) through memory bus 1258*a*(m1), where m1 may be any number greater than zero (0). In the discussion herein, each of the values m1, m2, m3, and m4 can be the same value, can each be different values, or at least two of the values of m1, m2, m3, and/or m4 can be the same value.

As another example, the memory bus 1258 coupled between the flash memory controller 1210a and upstream memory module 1260a comprises a single memory bus 1258a(1).

Each memory module 1260 includes at least one flash device 1262 (i.e., flash memory device 1262). For example, the upstream memory module 1260a comprises at least one flash device 1262. In FIG. 12, the storage apparatus 1201 comprises a memory module 1260a having the flash device 1262a(1) through flash device 1262a(n1), where n1 may be any number greater than zero (0). In the discussion herein, each of the values n1, n2, n3, and n4 can be the same value, can each be different values, or at least two of the values of n1, n2, n3, and/or n4 can be the same value.

The number of flash devices in a memory module 1260 may vary. For example, the number of flash devices 1262 in the memory module 1260a may vary, as symbolically shown by the dot symbols 1263a. As another example, the memory module 1260a comprises a single flash device 1262a(1).

The flash memory devices 1262a(1) through 1262a(n1) comprise the data registers 1264a(1) through 1264a(n1), respectively, wherein n1 may be any number greater than zero (0).

Each flash device 1262 may include data registers 1264 and flash pages 1265. For example, in the memory module 1260a, the flash device 1262a(1) comprises data register 1264a(1) and flash pages 1265a(1) through 1265a(p1), where p1 may be any number greater than zero (0). In the discussion herein, each of the values p1, p2, p3, p4, p5, p6, p7, and p8 can be the same value, can each be different values, or at least two of the values of p1, p2, p3, p4, p5, p6, p7, and/or p8 can be the same value. The number of flash pages in a flash device may vary. For example, the number of flash pages 1265 in the flash device 1262a(1) may vary, as symbolically shown by the dot symbols 1266a.

Similarly, the flash device 1262a(n1) comprises data register 1264a(n1) and flash pages 1265a2(1) through 1265a2(p1), where p1 may be any number greater than zero (0). The number of flash pages in a flash device may vary. For example, the number of flash pages 1265 in the flash device 1262a(n1) may vary, as symbolically shown by the dot symbols 1267a.

The data registers 1264 also form part of an expandable buffer set in the storage system 1201, as will be discussed below in additional details. The term "flash device" is intended to include any form of non-volatile memory that includes a set of non-volatile memory cells as similarly discussed above.

The memory interface 1205 responds to a memory transaction request 1268 received via bus 1269a from host 1236a and received via the host interface 1230. The memory interface 1205 can respond to another memory transaction request 1271 received via bus 1269b from another host 1236b. One or more host 1236 can send memory transaction requests 1268 to the memory interface 1205 of the storage apparatus 1201 via one or more bus 1269. The number of hosts 1236 and buses 1269 that can be coupled to the storage apparatus 1201 can vary as symbolically shown by the dot symbols 1237. The memory interface 1205 performs, on at least one memory module 1260, a memory operation (e.g., a memory write operation or a memory read operation) that corresponds to the memory transaction request 1268 that is requested by a host 1236. For example, if memory interface 1205 receives a memory read transaction request 1268, memory interface 1205 performs a read operation on at least one of the memory module 1260 and returns the result of the read operation, such as read data, along a bus 1269 to a host 1236 that sent the memory transaction request 1268. Data returned as a result of the read operation is hereinafter called "read data".

The term "host", such as host 1236 shown in this embodiment, can be defined as any device that has the ability to transmit a memory read (or/and write) transaction request to storage apparatus 1201. For example, this device may include host 1236 that can generate a memory read transaction request 1268 (or/and memory write transaction request 1268) and that can receive a response resulting from the processing of the memory transaction request 1268 by the memory interface 1205. The memory interface 1205 may process memory transactions from one or more requesting device, such as at least one of the hosts 1236a through 1236b. For example, as shown in FIG. 12, the host 1236a may generate a memory read transaction request 1268 that will cause the storage apparatus 1201 to return a read data 1270, while another host 1236b may receive a response, such as a prefetch data that is a result of another subsequent memory read transaction request 1271 that is sent by the host 1236b.

In the storage apparatus 1201, the number of upstream memory modules 1260 may vary, as symbolically shown by the dot symbols 1272. For example, the number of upstream memory module 1260 is the same as the number of upstream flash memory controllers 1210. In a particular example, the two upstream memory arrays 1260a and 1260b is the same number as the two upstream flash memory controllers 1210a and 1210b. The number of memory modules 1260 may vary in the X-direction 1273 (or a first direction 1273). For example, the number of upstream memory modules 1260 in the X-direction 1273 may be increased to a given number as shown by the dot symbols 1272.

In the storage apparatus 1201, the number of downstream memory modules 1260 may vary in the X-direction 1273 (or a first direction 1273). For example, the number of downstream memory modules 1260 in the X-direction 1273 may be increased to a given number as shown by the dot symbols 1274. In a particular example, the two downstream memory arrays 1260c and 1260d is the same number as the two downstream flash memory controllers 1210c and 1210d, but the number of downstream memory modules 1260 may be increased in the storage apparatus 1201.

As also discussed above, the number of memory modules 1260 can also be varied in the Y-direction 1275 (or a second direction 1275). For example, the number of memory modules 1260 in the Y-direction 1275 may be increased to a given number as shown by the dot symbols 1249 and 1252. Therefore, the storage apparatus 1201 provides flash memory modules 1260 that are configured in an expandable architecture 1276 (or expandable configuration 1276) that can be expanded (or varied) in the X-direction 1273 and/or that can be expanded (or varied) in the Y-direction 1275. In an embodiment of the invention, the expandable architecture 1276 is an expandable X-Y matrix architecture 1276 and that can be varied and/or expanded in the X-direction 1273 and/or Y-direction 1275. Therefore, the expandable architecture 1276 (or configurable architecture 1276) can also be defined as or can be called as a multi-dimensional memory 1276, as an expandable (or configurable) multi-dimensional memory 1276, as an expandable (or configurable) multi-dimensional memory system 1276, or as an expandable (or configurable) multi-dimensional memory architecture 1276. This expandable or configurable architecture 1276 is novel and provides at least some of the aforementioned advantages that are generally lacking in conventional systems.

In an embodiment of the invention, the multi-dimensional memory 1276 can be a two-dimensional memory 1276 or a v-dimensional memory 1276 wherein v>2.

If the expandable architecture 1276 is expanded in the X-direction 1273 (as also symbolically shown by the dot symbols 1274), then a flash memory module (e.g., flash memory module 1260e) would also be included in the storage apparatus 1201 and would be coupled to a flash memory controller (not shown in FIG. 12) as similarly discussed in the above.

Since the storage apparatus 1201 provides an expandable architecture 1276 comprising flash memory modules 1260, flash memory controllers 1210, and DMA controllers 1215, this expandable architecture 1276 provides a buffer set that is also expandable in the X-direction 1273 and/or Y-direction 1275. In other words, the resulting topology comprises the expandable architecture 1276 with a plurality of flash memory modules 1260, flash memory controllers 1210, and/or DMA controllers 1215 that may be replicated so as to advantageously expand the buffer set in the storage apparatus 1201. As will be discussed below in additional details, this buffer set is formed by data registers 1264 in the memory modules 1260, buffers 1211 in the flash memory controllers 1210, and/or buffers 1212 in DMA controllers 1215. Therefore, if one or more flash memory modules 1260, flash memory controllers 1210, and/or DMA controllers 1215 are replicated (or added) in the expandable architecture 1276, then the resulting buffer set (formed by data registers in the flash memory modules 1260, buffers in the flash memory controllers 1210, and/or buffers in the DMA controllers 1215) in the expandable architecture 1276 is also, in turn, advantageously expanded in order to reduce latency in memory read transactions.

The other example flash memory controllers 1210 and flash memory modules 1260 in the storage apparatus 1201 will now be discussed. As discussed above, each memory module 1260 includes at least one flash device 1262. For example, in FIG. 12, the storage apparatus 1201 comprises an upstream memory module 1260b having the flash device 1262b(1) through flash device 1262b(n2), where n2 may be any number greater than zero (0).

In the description herein, the elements 1262 are shown as example elements 1262a(1) through 1262a(n1), example elements 1262b(1) through 1262b(n2), and other example elements with the prefix "1262". The element 1262 is generally referred to as a flash device 1262, flash memory device 1262, memory device 1262, or nonvolatile memory device 1262. The element 1262 can be any type of nonvolatile memory device 1262 such as, for example, a flash memory device, read-only memory, ferroelectric random access memory, a volatile memory device that is powered by a battery, capacitor, supercapacitor (or ultra-capacitor), or Tantalum capacitor so that the volatile memory device functions as a nonvolatile memory device, a magnetic computer storage device (e.g., hard disk memory, floppy disk or magnetic tape), or another type of nonvolatile memory device.

As another example, the memory module 1260b comprises a single flash device 1262b(1).

The number of flash devices in a memory module may vary. For example, the number of flash devices 1262 in the memory module 1260b may vary, as symbolically shown by the dot symbols 1263b.

In the memory module 1260b, the flash device 1262b(1) comprises data register 1264b(1) and flash pages 1265b(1) through 1265b(p2), where p2 may be any number greater than zero (0). The number of flash pages in a flash device may vary. For example, the number of flash pages 1265 in the flash device 1262b(1) may vary, as symbolically shown' by the dot symbols 1266b.

Similarly, the flash device 1262b(n2) comprises data register 1264b(n2) and flash pages 1265b2(1) through 1265b2(p2), where p2 may be any number greater than zero (0). The number of flash pages in a flash device may vary. For example, the number of flash pages 1265 in the flash device 1262b(n2) may vary, as symbolically shown by the dot symbols 1267b.

The number of memory bus 1258 coupled between the flash memory controller 1210b and memory module 1260b may vary, as symbolically shown by the dot symbols 1259b. For example, the memory bus 1258 coupled between the flash memory controller 1210b and memory module 1260b comprises the memory bus 1258b(1) through memory bus 1258b(m2), where m2 may be any number greater than zero (0). As another example, the memory bus 1258 coupled to the flash memory controller 1210b and memory module 1260b comprises a single memory bus 1258b(1).

As another example, in FIG. 12, the storage apparatus 1201 comprises a downstream memory module 1260c having the flash device 1262c(1) through flash device 1262c(n3), where n3 may be any number greater than zero (0).

As another example, the downstream memory module 1260c comprises a single flash device 1262c(1).

The number of flash devices in a memory module may vary. For example, the number of flash devices 1262 in the memory module 1260c may vary, as symbolically shown by the dot symbols 1263c.

In the memory module 1260c, the flash device 1262c(1) comprises data register 1264c(1) and flash pages 1265c(1) through 1265c(p3), where p3 may be any number greater than zero (0). The number of flash pages in a flash device may vary. For example, the number of flash pages 1265 in the flash device 1262c(1) may vary, as symbolically shown by the dot symbols 1266c.

Similarly, the flash device 1262c(n3) comprises data register 1264c(n3) and flash pages 1265c2(1) through 1265c2(p3), where p3 may be any number greater than zero (0). The number of flash pages in a flash device may vary. For example, the number of flash pages 1265 in the flash device 1262c(n3) may vary, as symbolically shown by the dot symbols 1267c.

The number of memory bus 1258 coupled between the flash memory controller 1210c and memory module 1260c may vary, as symbolically shown by the dot symbols 1259c. For example, the memory bus 1258 coupled between the flash memory controller 1210c and memory module 1260c comprises the memory bus 1258c(1) through memory bus 1258c(m3), where m3 may be any number greater than zero (0). As another example, the memory bus 1258 coupled between the flash memory controller 1210c and memory module 1260c comprises a single memory bus 1258c(1).

As another example, in FIG. 12, the storage apparatus 1201 comprises a downstream memory module 1260d having the flash device 1262d(1) through flash device 1262d (n4), where n4 may be any number greater than zero (0).

As another example, the downstream memory module 1260d comprises a single flash device 1262d(1).

The number of flash devices in a memory module may vary. For example, the number of flash devices 1262 in the memory module 1260d may vary, as symbolically shown by the dot symbols 1263d.

In the memory module 1260d, the flash device 1262d(1) comprises data register 1264d(1) and flash pages 1265d(1) through 1265d(p4), where p4 may be any number greater than zero (0). The number of flash pages in a flash device may vary. For example, the number of flash pages 1265 in the flash device 1262d(1) may vary, as symbolically shown by the dot symbols 1266d.

Similarly, the flash device 1262d(n4) comprises data register 1264d(n4) and flash pages 1265d2(1) through 1265d2(p4), where p4 may be any number greater than zero (0). The number of flash pages in a flash device may vary. For example, the number of flash pages 1265 in the flash device 1262d(n4) may vary, as symbolically shown by the dot symbols 1267d.

The number of memory bus 1258 coupled between the flash memory controller 1210d and memory module 1260d may vary, as symbolically shown by the dot symbols 1259d. For example, the memory bus 1258 coupled between the flash memory controller 1210d and memory module 1260d comprises the memory bus 1258d(1) through memory bus 1258d(m4), where m4 may be any number greater than zero (0). As another example, the memory bus 1258 coupled between the flash memory controller 1210d and memory module 1260d comprises a single memory bus 1258d(1).

As an example, if the memory module 1260e is included in the storage apparatus 1201, then the memory module 1260e would also include one or more flash devices 1262, wherein each flash device includes flash pages 1265 and a data register 1264, and wherein the memory module 1260e would be coupled, via at least one memory bus 1258, to a flash memory controller 1210.

Any two given flash memory controllers 1210 are connected to each other by a channel 1280. For example, the flash memory controllers 1210a and 1210c are connected to each other by a channel 1280a, and the flash memory controllers 1210b and 1210d are connected to each other by a channel 1280b. The channel 1280 comprises one or more point-to-point lines which can be, for example, one flashbus or a plurality of flashbuses for transmitting signals such as command, status, response, address, and data bytes between the flash memory controllers 1210. Two flash memory controllers 1210 can transmit the above-mentioned signals to each other via a channel 1280 between the two flash memory controllers 1210. A flash memory controller 1210 can process the above-mentioned signals via cutthrough, store forward, or/and buffering.

It is also noted that a bus 1254 that connects a given flash memory controller 1210 and a given DMA controller 1215 also transmits signals such as command, status, response, address, and data bytes between the given flash memory controller 1210 and given DMA controller 1215. In the example of FIG. 12, the DMA controller 1215a is connected via a bus 1254a to the flash memory controller 1210a, and the DMA controller 1215b is connected via a bus 1254b to the flash memory controller 1210b. A DMA controller 1215 can also process the above-mentioned signals via cutthrough, store forward, or/and buffering.

Examples of channels 1280 that connect flash memory controllers 1210 to each other, and examples of communication paths or buses 1254 that connect a DMA controller 1215 to a flash memory controller 1210 are disclosed in, for example, in commonly-owned and commonly-assigned U.S. patent application Ser. No. 14/217,161, entitled MULTI-CHIP MEMORY CONTROLLER CONNECTED TO A PLURALITY OF MEMORY ARRAY VIA COMMUNICATION BUS, which is hereby fully incorporated herein by reference.

Handshaking and data transmission between two flash memory controllers 1210 (as well as handshaking and data transmission between a flash memory controller 1210 and a DMA controller 1215) can be performed by different IO protocols. A memory controller 1210 can receive and transmit command, status, response, address, and data bytes to and from a DMA controller 1215, as similarly disclosed in U.S. patent application Ser. No. 14/217,161. A discussion of the handshaking between a DMA controller 1215 and a memory controller 1210 over a bus 1254 (e.g., a flashbus 1254) is also presented in greater detail in commonly-owned and commonly-assigned U.S. Pat. No. 8,447,908, issued on 21 May 2013, entitled MULTILEVEL MEMORY BUS SYSTEM FOR SOLID-STATE MASS STORAGE, which is hereby fully incorporated herein by reference.

A memory controller 1210 can also receive and transmit sideband signals to and from a DMA controller 1215, wherein the sideband signals may be, for example, arbitration signals, messaging signals, and/or protocol handshakes.

A flash memory controller 1210 (e.g., flash memory controller 1210a) can also receive and transmit command, status, response, address, and data bytes to and from another flash memory controller 1210 (e.g., flash memory controller 1210c that is directly coupled via channel 1280a to flash memory controller 1210a). A memory controller 1210 can also receive and transmit sideband signals to and from another memory controller 1210, wherein the sideband signals may be, for example, arbitration signals, messaging signals, and/or protocol handshakes.

A flash memory controller 1210 checks information in an incoming command, status, response, address, and data bytes (or in an incoming sideband signal) in order to determine if the incoming command, status, response, address, and/or data bytes are intended (or are not intended) for the flash memory controller 1210 that is receiving a signal. If so, then the receiving flash memory controller 1210 will accordingly process the received signal such as an incoming command, status response, address, and/or data bytes. If not, then the receiving flash memory controller 1210 will then pass the aforementioned incoming command, status, response, address, and/or data bytes to another flash memory controller 1210 (e.g., a flash memory controller 1210 that is coupled via a channel 1280 to the receiving flash memory controller 1210). A flash memory controller 1210 can pass an incoming command, status, response, address and data bytes to another flash memory controller 1210 via cutthrough, store forward, or buffering.

A channel 1280 which communicatively couples two flash memory controllers 1210 comprises, for example, one or more flashbuses that connect two flash memory controllers 1210. As another example, a channel 1280 that communicatively couples two flash memory controllers 1210 comprises one or more flashbuses that connect two flash memory controllers 1210 and at least one shared line, wherein a shared line transmits sideband signals and connects at least two flash memory controllers 1210 to each other and to a DMA controller 1215.

Other IO protocols may be alternatively used by the flash memory controllers 1210 and DMA controllers 1215 in the transmission and reception of signals.

An embodiment of a serial chain in a point-to-point topology in the expandable architecture 1276 of a memory interface 1205 is now discussed.

Figure 13B:
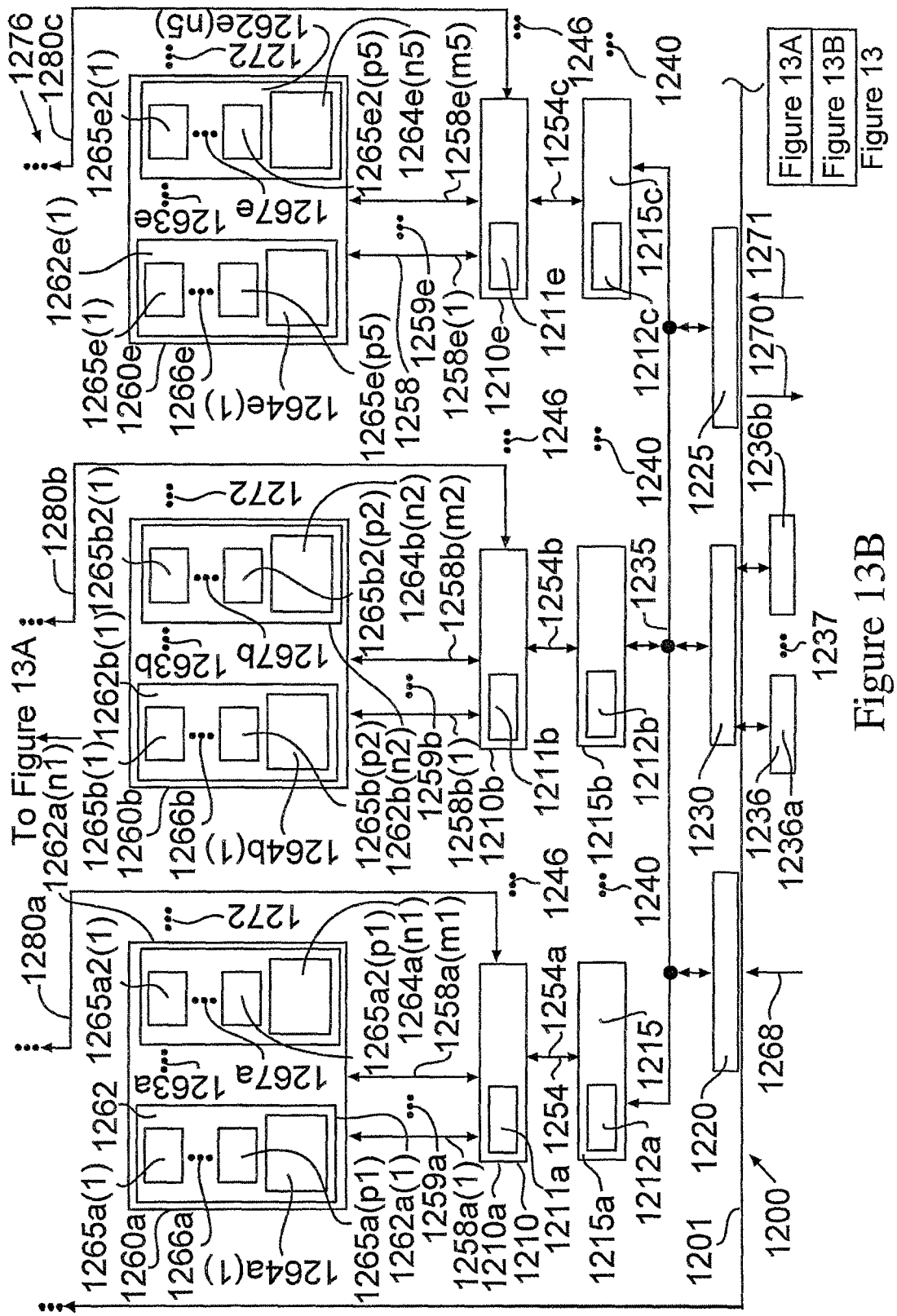

In an embodiment of the invention, the expandable architecture 1276 of a memory interface 1205 comprises a plurality of DMA controllers 1215, wherein each DMA controller 1215 is associated in a one-to-one fashion to a single serial chain. In other words, a DMA controller 1215 is coupled to an associated single serial chain as shown in FIGS. 12 and 13. However, in another embodiment of the invention that will be discussed below with reference to FIG. 15, a DMA controller 1215 is associated with a plurality of (two or more) serial chains.

In FIG. 12, the DMA controller 1215a is associated with (coupled to) a single serial chain 1290 and the DMA controller 1215b is associated with (coupled to) a single serial chain 1291.

The number of flash memory controllers 1210 and memory modules 1260 in a serial chain may vary. For example, the serial chain 1290 comprises a single flash memory controller 1210a that is coupled via bus 1254a to the DMA controller 1215a and further comprises a memory module 1260a that is coupled via memory bus (memory buses) 1258 to the flash memory controller 1210a.

As another example, the serial chain 1290 comprises the following elements: a flash memory controller 1210a that is coupled via bus 1254a to the DMA controller 1215a, a memory module 1260a that is coupled via memory bus (memory buses) 1258 to the flash memory controller 1210a, a flash memory controller 1210c that is coupled via channel 1280a to the flash memory controller 1210a, and a memory module 1260c that is coupled via memory bus (memory buses) 1258 to the flash memory controller 1210c.

As another example, the serial chain 1290 comprises the following elements as shown in FIG. 13: a flash memory controller 1210a that is coupled via bus 1254a to the DMA controller 1215a, a memory module 1260a that is coupled via memory bus (memory buses) 1258 to the flash memory controller 1210a, a flash memory controller 1210c that is coupled via channel 1280a to the flash memory controller 1210a, a memory module 1260c that is coupled via memory bus (memory buses) 1258 to the flash memory controller 1210c, a flash memory controller 1210g that is coupled via channel 1280d to the flash memory controller 1210c, and a memory module 1260g that is coupled via memory bus (memory buses) 1258 to the flash memory controller 1210g.

As another example, the serial chain 1290 comprises the above-mentioned elements that are shown in FIG. 13 and further comprises another flash memory controller 1210 that is coupled via a channel 1280 to the flash memory controller 1210g and another memory module 1260 that is coupled via a memory bus (or memory buses) 1258 to that another flash memory controller 1210. Therefore, the number of flash memory controllers 1210 and memory modules 1260 in the serial chain 1290 may vary.

As another example, the serial chain 1291 comprises a single flash memory controller 1210b that is coupled via bus 1254b to the DMA controller 1215b and further comprises a memory module 1260b that is coupled via memory bus (memory buses) 1258 to the flash memory controller 1210b.

As another example, the serial chain 1291 comprises the following elements: a flash memory controller 1210b that is coupled via bus 1254b to the DMA controller 1215b, a memory module 1260b that is coupled via memory bus (memory buses) 1258 to the flash memory controller 1210b, a flash memory controller 1210d that is coupled via channel 1280b to the flash memory controller 1210b, and a memory module 1260d that is coupled via memory bus (memory buses) 1258 to the flash memory controller 1210d.

As another example, the serial chain 1291 comprises the following elements as shown in FIG. 13: a flash memory controller 1210b that is coupled via bus 1254b to the DMA controller 1215b, a memory module 1260b that is coupled via memory bus (memory buses) 1258 to the flash memory controller 1210b, a flash memory controller 1210d that is coupled via channel 1280b to the flash memory controller 1210b, a memory module 1260d that is coupled via memory bus (memory buses) 1258 to the flash memory controller 1210d, a flash memory controller 1210h that is coupled via channel 1280e to the flash memory controller 1210d, and a memory module 1260h that is coupled via memory bus (memory buses) 1258 to the flash memory controller 1210h.

As another example, the serial chain 1291 comprises the above-mentioned elements that are shown in FIG. 13 and further comprises another flash memory controller 1210 that is coupled to the flash memory controller 1210h and another memory module 1260 that is coupled to that another flash memory controller 1210. Therefore, the number of flash memory controllers 1210 and memory modules 1260 in the serial chain 1291 may vary.

In another embodiment of the invention, the bus 1269 (or link 1269), which communicatively couples at least one host 1236 to the storage apparatus 1201, may be a wireless communication link such as, by way of example and not by way of limitation, an optical communication link or another type of wireless communication link.

FIG. 13 is a block diagram that illustrates the expandable architecture 1276 of a memory interface 1205 in the storage apparatus 1201, in accordance with an embodiment of the invention. The flash pages are not shown in most of the flash memory devices 1262 in order to avoid overcrowding the drawing in FIG. 13.

The expandable architecture 1276 of the memory interface 1205 has been expanded with the additions of one or more of the following: DMA controller 1215c; and flash memory controllers 1210e, 1210f, 1210g, 1210h, and/or 1210i; and/or memory modules 1260e, 1260f, 1260g, 1260h, and/or 1260i. The expandable architecture 1276 can be expanded further by adding more DMA controllers, flash memory controllers and/or memory modules. It is noted that the expandable architecture 1276 can instead be expanded by adding only one of (or at least some of) the DMA controller 1215c, flash memory controllers 1210e, 1210f, 1210g, 1210h, and/or 1210i, and/or memory modules 1260e, 1260f, 1260g, 1260h, and/or 1260i. Therefore, the expandable architecture 1276 can be varied or expanded by use of different combinations of components comprising the DMA controllers 1215, memory controllers 1210, and/or memory modules 1260.

As an example, the expandable architecture 1276 can be expanded in the X-direction 1273 by adding the DMA controller 1215c, flash memory controller 1210e, and memory module 1260e into the memory interface 1205. The newly-added DMA controller 1215c is coupled to the system bus 1235 and is also coupled via a bus 1254c to the newly-added upstream flash memory controller 1210e. The newly-added upstream flash memory controller 1210e is coupled via flash memory bus 1258 (e.g., flashbus 1258) to the memory module 1260e. The number of flash memory buses 1258 that couple the memory controller 1210e to the memory module 1260e may vary as shown by the dot symbols 1259e and as similarly discussed with reference to FIG. 12.

One or more additional DMA controllers 1215 can further be added in the X-direction 1273 in the expandable architecture 1276 and coupled to the system bus 1235 as shown by the dot symbols 1240. One or more additional upstream flash memory controllers 1210 can further be added in the X-direction 1273 in the expandable architecture 1276 as shown by the dot symbols 1246. One or more additional upstream memory modules 1260 can further be added in the X-direction 1273 in the expandable architecture 1276 as shown by the dot symbols 1272.

By adding the DMA controller 1215c, upstream memory controller 1210e, and upstream memory module 1260e, the buffer set in the storage apparatus 1201 is expanded in the X-direction 1273. In particular, the buffer set has now been expanded based on the following storage elements that are now added into the storage apparatus 1201: the DMA controller buffer 1212c of DMA controller 1215c, memory controller buffer 1211e of memory controller 1210e, and at least one of the data register 1264e(1) through data register 1264e(n5) of flash memory device 1262e(1) through flash memory device 1262e(n5), respectively, wherein n5 is an integer value.

As similarly discussed above, in one example, the memory bus 1258 coupled between the flash memory controller 1210e and memory module 1260e comprises the memory bus 1258e(1) through memory bus 1258e(m5), where m5 may be any number greater than zero (0).

As another example, the memory bus 1258 coupled between the flash memory controller 1210e and upstream memory module 1260e comprises a single memory bus 1258e(1).

As similarly discussed above with regard to the memory modules 1260, in one example, the upstream memory module 1260e comprises at least one flash device 1262. In FIG. 13, the storage system 1201 comprises a memory module 1260e having the flash device 1262e(1) through flash device 1262e(n5), where n5 may be any number greater than zero (0).

As another example, the memory module 1260e comprises a single flash device 1262e(1).

The number of flash devices in a memory array may vary. For example, the number of flash devices 1262 in the memory module 1260e may vary, as symbolically shown by the dot symbols 1263e. Therefore, the flash memory devices 1262e(1) through 1262e(n5) comprises the data registers 1264e(1) through 1264e(n5), respectively, wherein n5 may be any number greater than zero (0).

Each flash devices 1262 may include flash pages 1265. For example, in the memory module 1260e, the flash device 1262e(1) comprises flash pages 1265e(1) through 1265e (p5), where p5 may be any number greater than zero (0). The number of flash pages in a flash device may vary. For example, the number of flash pages 1265 in the flash device 1262e(1) may vary, as symbolically shown by the dot symbols 1266e.

Similarly, the flash device 1262e(n5) comprises flash pages 1265e2(1) through 1265e2(p5), where p5 may be any number greater than zero (0). The number of flash pages in a flash device may vary. For example, the number of flash pages 1265 in the flash device 1262e(n5) may vary, as symbolically shown by the dot symbols 1267e. For purposes of clarity and brevity, the other flash pages in flash devices in the storage apparatus 1201 will not be discussed.

Additionally or alternatively, the expandable configuration 1276 can be expanded in the Y-direction 1275 by adding at least one of the following sets: (1) downstream flash memory controller 1210f and downstream memory module 1260f (if the DMA controller 1215c, flash memory controller 1210e, and memory module 1260e have also been added to the storage apparatus 1201); (2) downstream flash memory controller 1210g and downstream memory module 1260g; (3) downstream flash memory controller 1210h and downstream memory module 1260h; and/or (4) downstream flash memory controller 1210i and downstream memory module 1260i (if flash memory controller 1210f and memory module 1260f have also been added).

The newly-added downstream flash memory controller 1210f is coupled via flash memory bus 1258 to the newly-added downstream memory module 1260f. Similar to flash memory controller 1210e and memory module 1260e, the memory controller 1210f and memory module 1260f are coupled together by at least one flash memory bus 1258. The memory controller 1210f is coupled via channel 1280c to the memory controller 1210e.

The newly-added downstream flash memory controller 1210g is coupled via flash memory bus 1258 to the newly-added downstream memory module 1260g. Similar to flash memory controller 1210e and memory module 1260e, the memory controller 1210g and memory module 1260g are coupled together by at least one flash memory bus 1258. The memory controller 1210g is coupled via channel 1280d to the memory controller 1210c.

The newly-added downstream flash memory controller 1210h is coupled via flash memory bus 1258 to the newly-added downstream memory module 1260h. Similar to flash memory controller 1210e and memory module 1260e, the memory controller 1210h and memory module 1260h are coupled together by at least one flash memory bus 1258. The memory controller 1210h is coupled via channel 1280e to the memory controller 1210d.

The newly-added downstream flash memory controller 1210i is coupled via flash memory bus 1258 to the newly-added downstream memory module 1260i. Similar to flash memory controller 1210e and memory module 1260e, the memory controller 1210i and memory module 1260i are coupled together by at least one flash memory bus 1258. The memory controller 1210i is coupled via channel 1280f to the memory controller 1210f.

One or more additional downstream flash memory controllers 1210 and one or more additional downstream memory modules 1260 can be added in the Y-direction 1275 in the expandable architecture 1276 as shown by the dot symbols 1249, wherein an additional downstream flash memory controller 1210 may be coupled via a channel 1280g to the memory controller 1210g and wherein an additional downstream additional memory module 1260 is coupled to the additional downstream flash memory controller 1210.

One or more additional downstream flash memory controllers 1210 and one or more additional downstream memory modules 1260 can be added in the Y-direction 1275 in the expandable configuration 1276 as shown by the dot symbols 1252, wherein an additional downstream flash memory controller 1210 is coupled via a channel 1280h to the memory controller 1210h and wherein an additional downstream additional memory module 1260 is coupled to the additional downstream flash memory controller 1210.

One or more additional downstream flash memory controllers 1210 and one or more additional downstream memory modules 1260 can be added in the Y-direction 1275 in the expandable configuration 1276 as shown by the dot symbols 1301, wherein an additional downstream flash memory controller 1210 is coupled via a channel 1280i to the memory controller 1210i and wherein an additional downstream additional memory module 1260 is coupled to the additional downstream flash memory controller 1210.

One or more additional memory controllers 1210 can be added in the X-direction 1273 in the expandable architecture 1276 as shown by the dot symbols 1248.

One or more additional memory modules 1260 can be added in the X-direction 1273 in the expandable architecture 1276 as shown by the dot symbols 1274.

One or more additional memory controllers 1210 can be added in the X-direction 1273 in the expandable architecture 1276 as shown by the dot symbols 1302.

One or more additional memory modules 1260 can be added in the X-direction 1273 in the expandable architecture 1276 as shown by the dot symbols 1304.

By adding the memory controller 1210*f* and memory module 1260*f*, the buffer set in the storage apparatus 1201 is expanded in the Y-direction 1275. In particular, the downstream memory controller 1210*f* comprises a memory controller buffer 1211*f* that is also added to the buffer set, and the memory module 1260*f* comprises at least one of the data register 1264*f*(1) through data register 1264*f*(n5) that are also added to the buffer set. The flash devices 1262*f*(1) through 1262*f*(n6) comprise the data registers 1264*f*(1) through 1264*f*(n6), respectively, wherein n6 may be any number greater than zero (0). The number of flash devices 1262 in the memory module 1260*f* may vary, as symbolically shown by the dot symbols 1263*f*.

By adding the memory controller 1210*g* and memory module 1260*g*, the buffer set in the storage apparatus 1201 is expanded in the Y-direction 1275. In particular, the downstream memory controller 1210*g* comprises a memory controller buffer 1211*g* that is also added to the buffer set, and the memory module 1260*g* comprises at least one of the data register 1264*g*(1) through data register 1264*g*(n7) that are also added to the buffer set. The flash memory devices 1262*g*(1) through 1262*g*(n7) comprise the data registers 1264*g*(1) through 1264*g*(n7), respectively, wherein n7 may be any number greater than zero (0). The number of flash devices 1262 in the memory module 1260*g* may vary, as symbolically shown by the dot symbols 1263*g*.

By adding the memory controller 1210*h* and memory module 1260*h*, the buffer set in the storage apparatus 1201 is expanded in the Y-direction 1275. In particular, the downstream memory controller 1210*h* comprises a memory controller buffer 1211*h* that is also added to the buffer set, and the memory module 1260*h* comprises at least one of the data register 1264*h*(1) through data register 1264*h*(n8) that are also added to the buffer set. The flash memory devices 1262*h*(1) through 1262*h*(n8) comprise the data registers 1264*h*(1) through 1264*h*(n8), respectively, wherein n8 may be any number greater than zero (0). The number of flash devices 1262 in the memory module 1260*h* may vary, as symbolically shown by the dot symbols 1263*h*.

By adding the memory controller 1210*i* and memory module 1260*i*, the buffer set in the storage apparatus 1201 is expanded in the Y-direction 1275. In particular, the downstream memory controller 1210*i* comprises a memory controller buffer 1211*i* that is also added to the buffer set, and the memory module 1260*i* comprises at least one of the data register 1264*i*(1) through data register 1264*i*(n9) that are also added to the buffer set. The flash memory devices 1262*i*(1) through 1262*i*(n9) comprise the data registers 1264*i*(1) through 1264*i*(n9), respectively, wherein n9 may be any number greater than zero (0). The number of flash devices 1262 in the memory module 1260*i* may vary, as symbolically shown by the dot symbols 1263*i*.

FIG. 14 is a block diagram of the expandable buffer set in a storage apparatus 1201, in accordance with an embodiment of the invention. Sample illustrative movements of prefetching of data from the memory modules 1260 and the storage of prefetch data into buffers in the expandable buffer set will now be discussed. The storage apparatus 1201 supports prefetching transactions and that employs the above-discussed reduced latency memory interface 1205 (see FIGS. 12 and 13). The memory interface 1205 is responsive to a memory read transaction request 1268 from a host 1236 (e.g., host 1236*a*). The memory interface 1205 enables the storage apparatus 1201 to perform a reduced latency memory transaction in response to receiving a second memory read transaction request 1271. For purposes of clarity in the drawings, the channels and bus links in the storage apparatus 1201 are not shown in FIG. 14.

As an example, the host 1236*a* sends a memory read transaction request 1268 to the storage apparatus 1201 for data located in one or more of the memory modules 1260. Operating under program control, the local processor 1220 analyzes and responds to memory read transaction request 1268 by generating DMA instructions that will cause one or more of the DMA controllers 1215 to read this data from one or more of the memory modules 1260 through one or more of the flash memory controllers 1210. If this data is available, one or more of the flash memory controllers 1210 retrieves this data, which is transferred to the local memory 1225 by one or more of the DMA controllers 1215, and eventually transferred to the host 1236 via the host interface 1230. Data obtained during this memory read transaction request is hereinafter named "read data" 1270.

Local processor 1220 also identifies "prefetch data". Prefetch data is any data currently stored in one or more of the memory modules 1260 that meets a prefetch selection criterion. This prefetch selection criterion may include a relationship between the read data and any stored data. For example, this prefetch selection criterion may be met if stored data exists that has a memory address within a selected memory address range from the memory address of the read data. In another example, memory interface 1205 determines whether this prefetch selection criterion is met by determining whether any stored data exists in one or more of the memory modules 1260 that has a memory address within the same page as a memory address associated with the read data 1270. The type of relationship between the read data 1270 and stored data is not intended to be limiting in any way. Any type of relationship may be used that increases the likelihood that the stored data selected for prefetching will be later requested by a host coupled to a memory interface 1205, such as a host 1236*b*.

The local processor 1220 may also perform an additional read operation, called an internal read operation. This internal read operation is a process executed by the memory interface 1205 to retrieve prefetch data 1402 from one or more of the memory modules 1260 and store the prefetch data 1402 into a prefetch buffer. This internal read operation includes the local processor 1220 sending an instruction, such as instruction 1403, to one or more of the DMA controllers 1215 to retrieve (via one or more of the flash memory controllers 1210) a prefetch data 1402 from one or more of the memory modules 1260. For example, if the memory module 1260*a* addresses stored data by flash page, the instruction 1403 contains the address of the specific flash page within a flash device that holds prefetch data 1402, such as a flash page in the flash device 1262*a*(1), respectively. The instruction 1403 also causes DMA controller 1215*a* to retrieve (via flash memory controller 1210*a*) a prefetch data 1402 from the flash page and flash device identified by the address mentioned above.

However, if memory interface 1205 determines that a prefetch selection criterion has not been met, then the memory interface 1205 does not perform this internal read operation.

When the DMA controller 1215*a* receives the instruction 1403, the instruction 1403 causes the DMA controller 1215*a* to use flash memory controller 1210*a* to cause the flash device 1262*a*(1) to transfer the prefetch data 1402. The internal read operation also includes local processor 1220 allocating a buffer in the expandable buffer set 1404 (in the storage apparatus 1201) to store the prefetch data 1402. Allocating a buffer as a prefetch buffer may be performed statically, such as at the time of manufacture, performed dynamically by the local processor 1220, or both. In one example or implementation, the number of buffers allocated as prefetch buffers depends on an amount of storage needed for the prefetch data. For example, in FIG. 14, the memory interface 1205 may allocate one or more of the data registers 1264 in one or more of the memory modules 1260 and/or one or more of the memory controller buffers 1211 and/or one or more of the DMA controller buffers 1212 as prefetch buffers or storage space suitable for storing one or more of the prefetch data 1402. This action may also render non-allocated buffers, such as any data register 1264, memory controller buffer 1211, and/or DMA controller buffer 1212 in the buffer set 1404 to be available to storage apparatus 1201 for other memory uses since these non-allocated buffers will not be used to store prefetch data. Buffers allocated for storing prefetch data are also referred to herein as "prefetch buffers". If a host, such as the host 1236*b*, issues a second memory read transaction request 1271 for data and this data has been previously stored as prefetch data in a prefetch buffer such as prefetch data 1402 that can be in a given prefetch buffer, then local processor 1220 responds by retrieving prefetch data 1402 from the given prefetch buffer and by placing prefetch data 1402 into the local memory 1225. When the local processor 1220 determines that the local memory 1225 contains a prefetch data 1402, the local processor 1220 forwards prefetch data 1402 from the local memory 1225 to the host interface 1230, which in turn transfers the prefetch data 1402 to the host 1236*b*. One of ordinary skill in the art having the benefit of this disclosure would readily recognize that rather than using a local memory 1225 to store prefetch data, the prefetch data may instead be sent directly to the host or processed in any other manner envisioned by a user.

As an example, if the data requested in the second memory read transaction 1271 has been stored as prefetch data 1402, and prefetch data 1402 is stored in a prefetch buffer, a forwarding transaction includes retrieving prefetch data 1402 from a prefetch buffer and forwarding prefetch data 1402 to the host that sent the second memory read transaction request 1271. Thus, memory interface 1205 may perform an internal read operation and forwarding transaction using any of the buffers, such as data registers 1264, memory controller buffers 1211, and/or DMA controllers 1212 that memory interface 1205 has allocated as prefetch buffers.

In an embodiment of the invention, the local processor 1220 executes a programmed code 1405 (which can be software 1405 or firmware 1405) so that the programmed code 1405 can permit the processor 1220 to dynamically allocate one or more of the buffers and/or data registers in the expandable buffer set 1404 as prefetch buffers for storing prefetch data 1402. In an embodiment of the invention, the local processor 1220 executes a programmed code 1405 so that the programmed code 1405 can, additionally or alternatively, permit the processor 1220 to dynamically allocate one or more of the buffers and/or data registers in the expandable buffer set 1404 as prefetch buffers for storing prefetch data 1402 and perform the allocation of prefetch buffers during the time of manufacture, during an initialization of the storage apparatus 1201, and/or during the processing of memory operations by the storage apparatus 1201. In an embodiment of the invention, the local processor 1220 executes a programmed code 1405 so that the programmed code 1405 can, additionally or alternatively, permit the processor 1220 to dynamically allocate one or more of the buffers and/or data registers in the expandable buffer set 1404 as prefetch buffers for storing prefetch data 1402 and perform the allocation of prefetch buffers initially at the time of initialization and then dynamically adjust the number of buffers allocated as prefetch buffers after initialization, depending on the amount of storage needed for data treated as prefetch data during the processing of memory read transaction requests. Allocation of a prefetch buffer may be performed, additionally or alternatively, based on other manners.

Since the storage apparatus 1201 provides a memory interface 1205 with an expandable architecture 1276, the buffer set 1404 can be varied or expanded in the X direction 1273 and/or Y direction 1275 to provide an increased or expanded number of prefetch buffers for storing prefetch data. For example, one or more of the following storage elements can be allocated as prefetch buffers: data registers 1264*a*(1) through 1264*a*(n1), data registers 1264*b*(1) through 1264*b*(n2), data registers 1264*c*(1) through 1264*c*(n3), data registers 1264*d*(1) through 1264*d*(n4), data registers 1264*e*(1) through 1264*e*(n5), data registers 1264*f*(1) through 1264*f*(n6), data registers 1264*g*(1) through 1264*g*(n7), data registers 1264*h*(1) through 1264*h*(n8), data registers 1264*i*(1) through 1264*i*(n9), memory controller buffers 1211*a* through 1211*i*, and/or DMA controller buffers 1212*a* through 1212*c*. Additional storage elements can be allocated as prefetch buffers in the buffer set 1404. Since an expanded number of prefetch buffers permits more storage of prefetch data, the expandable architecture 1276 further reduces latency in memory read operations. The program code 1405 can be configured to determine which of the storage elements will be prefetch buffers in the buffer set 1404. As also discussed above, channels can be used to couple memory controllers 1210 in a point-to-point serial topology to permit transmissions of prefetch data from one prefetch buffer in the buffer set 1404 to intervening memory controller buffer(s) 1210 (if any) and then to the local memory 1225 and/or to the host interface 1230 for subsequent transmission to a host 1236.

An advantage provided by the expandable architecture 1276 is, for example, the following. Assume that the memory interface 1205 reads a stored data 1450 in response to a memory read request 1268 from a host 1236 and returns this data 1450 as a read data to the requesting host 1236. As similarly discussed in the examples above, the data 1450 is stored in a flash device 1262 in one of the memory modules 1260. The data 1450 comprises a data portion 1455, metadata 1460 and control data 1465. As similarly discussed above, the metadata 1460 and control data 1465 are data properties of the data 1450. As an example, assume that the data 1450 is stored in the flash device 1262*g*(1) in the memory module 1260*g*, although in other examples, the data 1450 can be stored in other flash devices in other memory modules. If the metadata 1460 and/or control data 1465 meets a prefetch selection criterion (or prefetch selection criteria), then the DMA controller 1215*a* uses the flash memory controller 1210*g* to cause the flash device 1262*g*(1) to transfer a copy of the stored data 1450 to a prefetch buffer, as similarly discussed above. The DMA controller 1215*a* will store this copy of the stored data 1450 as a prefetch data into a prefetch buffer as similarly discussed above in an internal read operation.

Since the expandable architecture 1276 advantageously provides an increased number of buffers that can be used as prefetched buffers for storing prefetch data, the expandable architecture further decreases memory read latency compared to conventional storage systems. The increased number of prefetch buffers that can be allocated in the buffer set 1404 permits an increased number of stored data 1450 to be prefetched and stored in the prefetch buffers. For example, the memory interface 1205 (via local processor 1220) can allocate any, some, or all of the following storage elements as prefetch buffers for storing a copy of the storage data 1450 as a prefetch data: any, some, or all of the data register 1264*g*(1) through data register 1264*g*(n7); memory controller buffer 1211*g*; any, some, or all of the data register 1264*c*(1) through data register 1264*c*(n3); memory controller buffer 1211*c*; any, some, or all of the data register 1264*a*(1) through data register 1264*a*(n1); memory controller buffer 1211*a*; and/or DMA controller buffer 1212*a*. This increased number of allocated prefetched buffers permits the DMA controller 1215*a* to prefetch (via the memory controllers 1210*a*, 1210*c*, or 1210*g*) and permit storage of an increased number of prefetch data.

As will be discussed below, stored data 1450 in memory module 1260*h* or memory module 1260*i* can also be prefetched by the DMA controllers 1215*b* or 1215*c* (via memory controllers 1210) and stored by DMA controllers 1215*b* or 1215*c*, respectively, in allocated prefetch buffers in the buffer set 1404.

Another advantage provided by the expandable architecture 1276 is, for example, the following. Assume, for example, that the stored data 1450 is stored in a flash device 1262 in a downstream module such as, for example, the downstream memory module 1260*c* or downstream memory module 1260*g*. The stored data 1450 can also be stored in a faraway downstream memory module which is, for example, a memory module that is connected in series to the DMA controller 1215*a* such as the downstream memory module 1260*g* or another downstream memory module (not shown) that is connected via another memory controller that is serially connected to the memory controller 1210*g* in a downstream direction 1275. The DMA controller 1215*a* prefetches (via memory controller 1210*g*) a copy of the stored data 1450 from the memory module 1260*g* and stores the copy of the stored data 1450 into a prefetch buffer as prefetch data. For example, the DMA controller 1215*a* can store a copy of the stored data 1450 as prefetch data into data register 1264*g*(1) or memory controller buffer 1211*g*. Since a copy of the stored data 1450 is stored (or buffered) as a prefetch data into the data register 1264*g*(1) or memory controller buffer 1211*g*, the local processor 1220 can subsequently retrieve the prefetch data in the data register 1264*g*(1) or memory controller buffer 1211*g* for forwarding the prefetch data to the local memory 1225 and host interface 1230 (or for directly forwarding the prefetch data to the host interface 1230). The host interface 1230 then transfers the prefetch data to a host 1236 that transmitted a subsequent memory read request 1271. In this example, local processor 1220 allocated the data register 1264*g*(1) and buffer 1211*g* as prefetch buffers. However, the local processor 1220 can instead allocate any of, one of, some of, or all of the data registers 1264*g*(1) through 1264*g*(n7) and buffer 1211*g* as prefetch buffers. In this example, the data registers 1264*g*(1) through 1264*g*(n7) and buffer 1211*g* are "far away" buffers or "far away" storage elements that can store prefetch data. Data registers in one or more downstream memory modules (not shown) and memory controller buffers (not shown) of memory controllers that are coupled in series to the memory controller 1210*g* via, e.g., channel 1280*g* (FIG. 13) can also be "far away" buffers that can be prefetch buffers for storing prefetch data. The local processor 1220 can advantageously retrieve prefetch data in these "far away" buffers with reduced latency since the prefetch data are buffered in the prefetch buffers and are not retrieved from memory locations in flash devices.

Another advantage provided by the expandable architecture 1276 is, for example, the following. Multiple data can be prefetched and buffered in prefetch buffers depending on a request from a host 1236 or local processor 1220, as now discussed. With references to FIGS. 6 and 14, the stored data 1450 is read by the memory interface 1205 in response to a memory read request 1268 from a host 1236. The stored data 1450 has metadata 1460 and/or control data 1465 that matches the metadata and/or control data in the stored data 620, 621, 622, 623, and/or 624 (FIG. 6). As similarly discussed with reference to FIG. 6, this match (or matches) of the metadata and/or control data in the stored data 1450 with the metadata and/or control data of at least one of the stored data 620-624 satisfies a prefetch selection criterion so that the DMA controller 1215*a* stores a copy of the stored data 620-624 into allocated prefetch buffers comprising at least some of the data registers 1264*g*(1) through 1264*g*(n7), memory controller buffer 1211*g*, data registers 1264*c*(1) through 1264*c*(n3), memory controller buffer 1211*c*, data registers 1264*a*(1) through 1264*a*(n1), memory controller buffer 1211*a*, and DMA controller buffer 1212*a*. The multiple prefetch reads (multiple prefetching) of stored data 620-624 (or some of the stored data 620-624) in relation to the single stored data 1450 is similarly described above with reference to FIG. 6. The local processor 1220 can then forward the prefetched data (copy of stored data 620-624 buffered in prefetch buffers) to a requesting host 1236 during a forwarding transaction as similarly discussed above.

Another advantage provided by the expandable architecture 1276 is, for example, the following. With references to FIGS. 7 and 14, the stored data 1450 is read by the memory interface 1205 in response to a memory read request 1268 from a host 1236. As similarly discussed with reference to FIG. 7, this match (or matches) of the metadata and/or control data in the stored data 1450 with the metadata and/or control data of the stored data 720 satisfies a prefetch selection criterion so that the DMA controller 1215*a* stores a copy of the stored data 720 into one of the allocated prefetch buffers comprising at least some of the data registers 1264*g*(1) through 1264*g*(n7), memory controller buffer 1211*g*, data registers 1264*c*(1) through 1264*c*(n3), memory controller buffer 1211*c*, data registers 1264*a*(1) through 1264*a*(n1), memory controller buffer 1211*a*, and DMA controller buffer 1212*a*.

The copy of the data 720 (FIG. 7) is stored as a prefetch data 745*a* into a prefetch buffer, and the prefetch data 745*a* comprises metadata 710*b* and/or control data 715*b* that points to (or is linked with) an additional one or more stored data to be prefetched from a flash device and stored into a prefetch buffer as prefetch data. For example, the prefetch data 745 comprises data properties 750 (e.g., metadata 710*b* and/or control data 715*b*) matching or corresponding to data properties 751 in stored data 721 and/or data properties 756 in stored data 722. This match of data properties 750 with the data properties 751 and/or data properties 756 satisfies a prefetch selection criterion so that copy of the data 721 (FIG. 7) and/or a copy of the data 722 are stored as a prefetch data 745*b* and/or prefetch data 745*c*, respectively, into prefetch buffers.

The multiple prefetch reads (multiple prefetching) of stored data 721 and/or stored data 722 in relation to the single stored data 1450 is similarly described above with reference to FIG. 7. The local processor 1220 can then forward the prefetched data (copy of stored data 720, 721, and 722 buffered in prefetch buffers) to a requesting host 1236 during a forwarding transaction as similarly discussed above.

As similarly discussed above with reference to FIG. 9, a prefetch selection criteria can also be met for a stored data 920 that has a data address that is the next odd flash address in relation to the flash address (indicated in metadata 1460 or control data 1465) of the read data 1450 (FIG. 14) that is stored in flash memory. A prefetch selection criteria can also be met for a stored data 950 that has a data address that is the next even flash address in relation to the flash address (indicated in metadata 1460 or control data 1465) of the read data 1450 (FIG. 14) that is stored in flash memory.

Another advantage provided by the expandable architecture 1276 is, for example, the following. With references to FIGS. 11 and 14, the stored data 1100 (FIG. 11) comprises a data portion 1105a that is stored in prefetch buffers comprising at least some of the data registers 1264g(1) through 1264g(n7), memory controller buffer 1211g, data registers 1264c(1) through 1264c(n3), memory controller buffer 1211c, data registers 1264a(1) through 1264a(n1), memory controller buffer 1211a, and DMA controller buffer 1212a. The metadata 1110a and control data 1115a of stored data 1100 points to stored data 1150 that is in a flash device 1262 (FIG. 14). As discussed above with reference to FIG. 11, this repeating pattern elimination feature further permits a reduction in read latency.

In addition to or as an alternative to the above-discussed allocated prefetch buffers in the buffer set 1404, the memory interface 1205 (via local processor 1220) can allocate any, some, or all of the following storage elements as prefetch buffers for storing a copy of the storage data 1450 as a prefetch data: any, some, or all of the data register 1264h(1) through data register 1264h(n8); memory controller buffer 1211h; any, some, or all of the data register 1264d(1) through data register 1264d(n4); memory controller buffer 1211d; any, some, or all of the data register 1264b(1) through data register 1264b(n2); memory controller buffer 1211b; and/or DMA controller buffer 1212b. This increased number of allocated prefetched buffers permits the DMA controller 1215b to prefetch (via the memory controllers 1210b, 1210d, or 1210h) and permit storage of an increased number of prefetch data.

In addition to or as an alternative to the above-discussed allocated prefetch buffers in the buffer set 1404, the memory interface 1205 (via local processor 1220) can allocate any, some, or all of the following storage elements as prefetch buffers for storing a copy of the storage data 1450 as a prefetch data: any, some, or all of the data register 1264i(1) through data register 1264i(n9); memory controller buffer 1211i; any, some, or all of the data register 1264f(1) through data register 1264f(n6); memory controller buffer 1211f; any, some, or all of the data register 1264e(1) through data register 1264e(n5); memory controller buffer 1211e; and/or DMA controller buffer 1212c. This increased number of allocated prefetched buffers permits the DMA controller 1215c to prefetch (via the memory controllers 1210e, 1210f, or 1210i) and permit storage of an increased number of prefetch data.

Figure 15A:
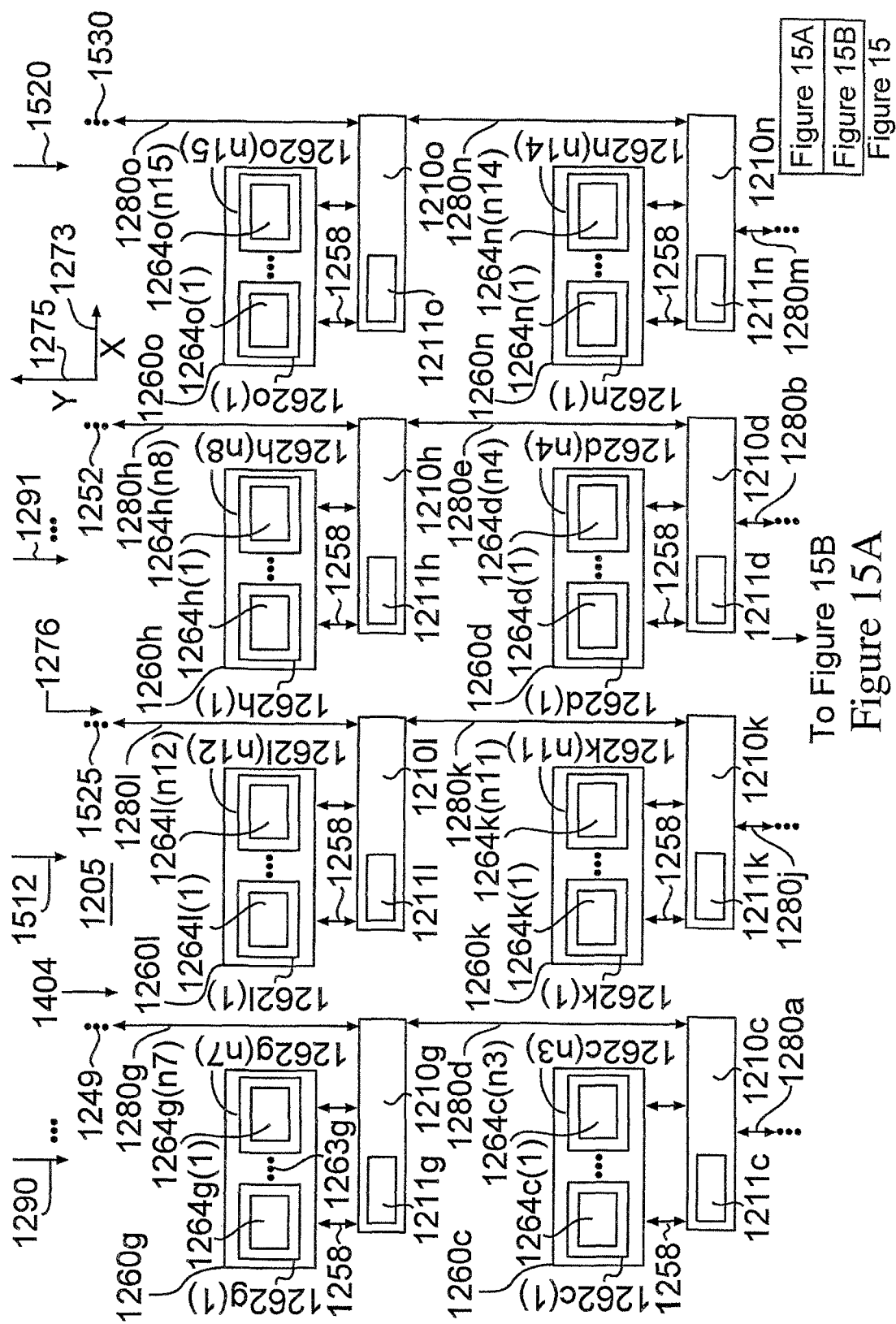
FIGS. 15A and 15B are block diagrams that illustrate a system or apparatus with a memory interface with an expandable architecture that reduces latency, in accordance with another embodiment of the invention.
Figure 15B:
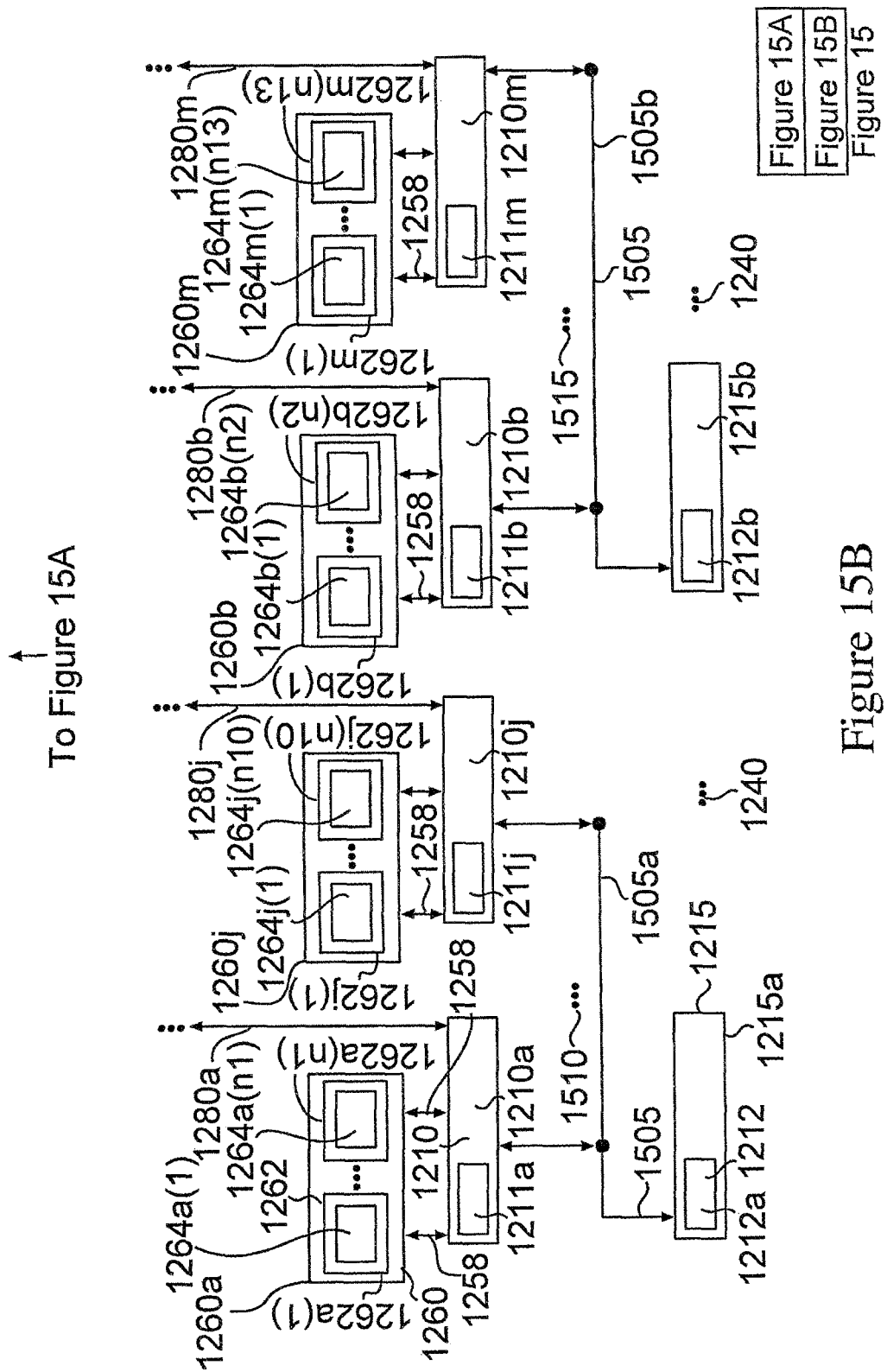

FIG. 15 is a block diagram that illustrates the expandable architecture 1276 of a memory interface 1205 in the storage apparatus 1201, in accordance with another embodiment of the invention. A DMA controller 1215 is associated with a plurality of (two or more) serial chains in the memory interface 1205 of the storage apparatus 1201. For example, at least two serial chains are coupled via bus 1505a to the DMA controller 1215a. The number of serial chains that are coupled via bus 1505a to the DMA controller 1215a may vary as shown by dot symbols 1510. In the example of FIG. 15, the serial chains 1290 and 1512 are coupled via bus 1505a to the DMA controller 1215a. Two or more serial chains (in the Y direction in the example of FIG. 15) advantageously share the same DMA controller 1215 if there are space limitations in a chip with the memory interface 1205. Therefore, two or more serial chains can share (and are directly coupled to) the same DMA controller 1215 in order to save the space and/or to optimize the space or area in a chip with the memory interface 1205 and/or in order to further increase the number of components in the X direction and/or in the Y direction in the memory interface 1205.

Additionally or alternatively, at least two serial chains are coupled via bus 1505b to the DMA controller 1215b. The number of serial chains that are coupled via bus 1505b to the DMA controller 1215b may vary as shown by dot symbols 1515. In the example of FIG. 15, the serial chains 1291 and 1520 are coupled via bus 1505b to the DMA controller 1215b.

In another example, multiple serial chains (e.g., serial chains 1290 and 1512) are coupled via bus 1505a to the DMA controller 1215a, while a single serial chain (e.g., serial chain 1291) is coupled via bus 1505b to the DMA controller 1215b.

In another example, a single serial chain (e.g., serial chain 1290) is coupled via bus 1505a to the DMA controller 1215a, while multiple serial chains (e.g., serial chains 1291 and 1520) are coupled via bus 1505b to the DMA controller 1215b.

In another example, more than two serial chains are coupled via bus 1505a to the DMA controller 1215a and/or more than two serial chains are coupled via bus 1505b to the DMA controller 1215b.

Figure 16:
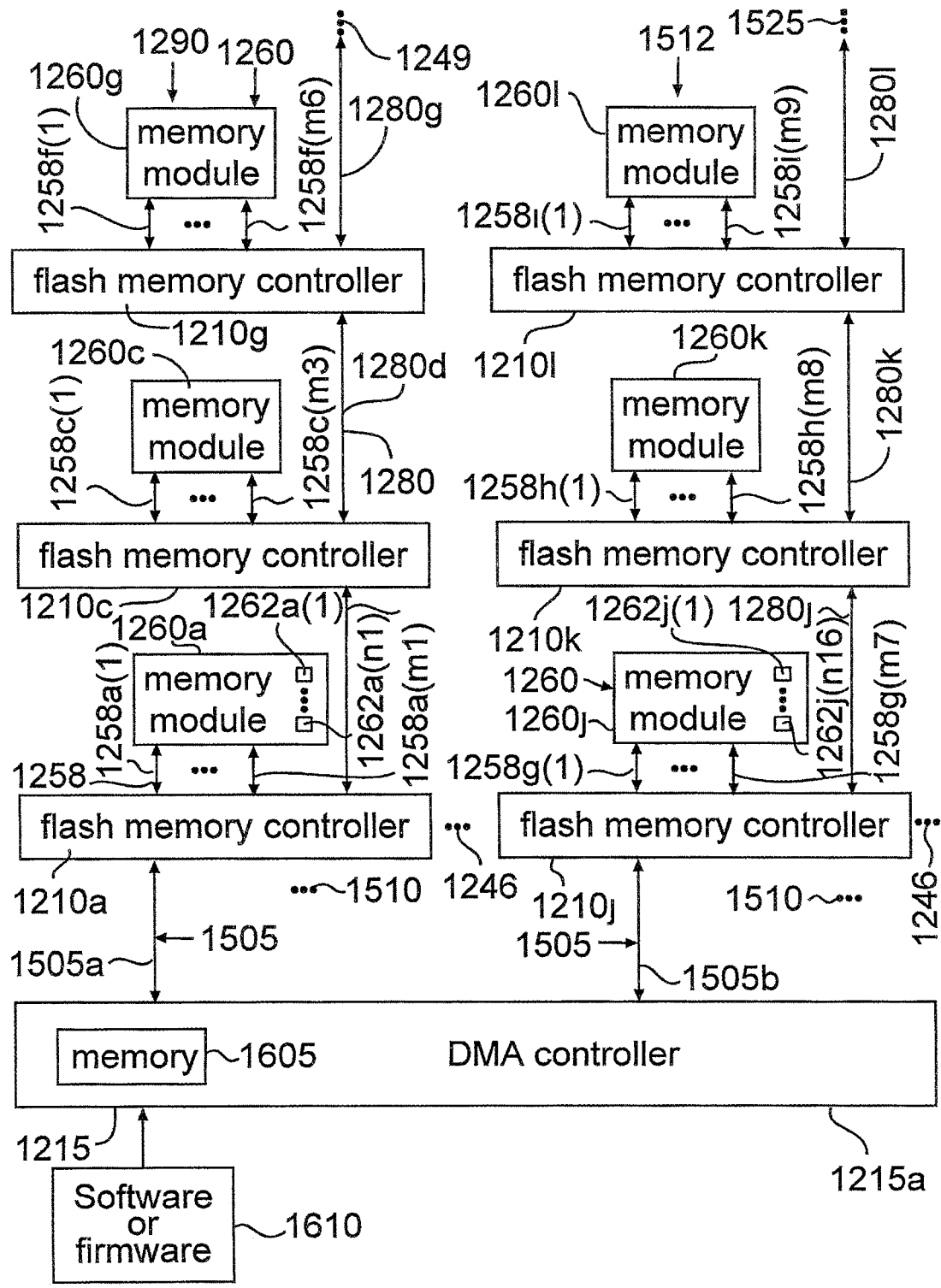
FIG. 16 is a block diagram that provides additional details that permit a DMA controller to intelligently determine and intelligently select a serial chain among a plurality of serial chains for performing a given memory transaction in a memory interface, in accordance with an embodiment of the invention.

A DMA controller 1215 intelligently determines and intelligently selects which one of the serial chains to use for performing a given memory transaction in the memory interface 1205. For example, the DMA controller 1215a intelligently selects the serial chain 1290 or the serial chain 1512 for performing a given memory transaction in the memory interface 1205, wherein the DMA controller 1215a is directly coupled to the serial chain 1290 and is directly coupled to the serial chain 1512. As another example, the DMA controller 1215a intelligently determines and intelligently selects a serial chain among a plurality of serial chains for performing a given memory transaction in the memory interface 1205, wherein the plurality of serial chains are directly coupled to the DMA controller 1215a. As will be discussed below, FIG. 16 provides additional details that permit a DMA controller 1215a to intelligently determine and intelligently select a serial chain among a plurality of serial chains for performing a given memory transaction in the memory interface 1205, in an embodiment of the invention.

The possible example configurations of serial chains 1290 and 1291 have been discussed above.

The number of flash memory controllers 1210 and memory modules 1260 in a serial chain may vary. For example, the serial chain 1512 comprises a single flash memory controller 1210j that is coupled via bus 1505a to the DMA controller 1215a and further comprises a memory module 1260*j* that is coupled via memory bus (memory buses) 1258 to the flash memory controller 1210*j*.

As another example, the serial chain 1512 comprises the following elements: a flash memory controller 1210*j* that is coupled via bus 1505*a* to the DMA controller 1215*a*, a memory module 1260*j* that is coupled via memory bus (memory buses) 1258 to the flash memory controller 1210*j*, a flash memory controller 1210*k* that is coupled via channel 1280*j* to the flash memory controller 1210*j*, and a memory module 1260*j* that is coupled via memory bus (memory buses) 1258 to the flash memory controller 1210*j*.

As another example, the serial chain 1512 comprises the following elements: a flash memory controller 1210*j* that is coupled via bus 1505*a* to the DMA controller 1215*a*, a memory module 1260*j* that is coupled via memory bus (memory buses) 1258 to the flash memory controller 1210*j*, a flash memory controller 1210*k* that is coupled via channel 1280*j* to the flash memory controller 1210*j*, a memory module 1260*k* that is coupled via memory bus (memory buses) 1258 to the flash memory controller 1210*k*, a flash memory controller 1210*l* that is coupled via channel 1280*k* to the flash memory controller 1210*k*, and a memory module 1260*l* that is coupled via memory bus (memory buses) 1258 to the flash memory controller 1210.

As another example, the serial chain 1512 comprises the above-mentioned elements that are shown in FIG. 15 and further comprises another flash memory controller 1210 that is coupled via a channel 1280*l* to the flash memory controller 1210*l* and another memory module 1260 that is coupled via a memory bus (or memory buses) 1258 to that another flash memory controller 1210*l*. Therefore, the number of flash memory controllers 1210 and memory modules 1260 in the serial chain 1512 may vary as shown by dot symbols 1525.

As an example, the serial chain 1520 comprises a single flash memory controller 1210*m* that is coupled via bus 1505*b* to the DMA controller 1215*b* and further comprises a memory module 1260*m* that is coupled via memory bus (memory buses) 1258 to the flash memory controller 1210*m*.

As another example, the serial chain 1520 comprises the following elements: a flash memory controller 1210*m* that is coupled via bus 1505*b* to the DMA controller 1215*b*, a memory module 1260*m* that is coupled via memory bus (memory buses) 1258 to the flash memory controller 1210*m*, a flash memory controller 1210*n* that is coupled via channel 1280*m* to the flash memory controller 1210*m*, and a memory module 1260*n* that is coupled via memory bus (memory buses) 1258 to the flash memory controller 1210*n*.

As another example, the serial chain 1520 comprises the following elements: a flash memory controller 1210*m* that is coupled via bus 1505*b* to the DMA controller 1215*b*, a memory module 1260*m* that is coupled via memory bus (memory buses) 1258 to the flash memory controller 1210*m*, a flash memory controller 1210*n* that is coupled via channel 1280*m* to the flash memory controller 1210*m*, a memory module 1260*n* that is coupled via memory bus (memory buses) 1258 to the flash memory controller 1210*n*, a flash memory controller 1210*o* that is coupled via channel 1280*n* to the flash memory controller 1210*n*, and a memory module 1260*o* that is coupled via memory bus (memory buses) 1258 to the flash memory controller 1210*o*.

As another example, the serial chain 1520 comprises the above-mentioned elements that are shown in FIG. 15 and further comprises another flash memory controller 1210 that is coupled via a channel 1280*o* to the flash memory controller 1210*o* and another memory module 1260 that is coupled via a memory bus (or memory buses) 1258 to that another flash memory controller 1210. Therefore, the number of flash memory controllers 1210 and memory modules 1260 in the serial chain 1520 may vary as shown by dot symbols 1530.

If multiple serial chains are coupled to a DMA controller, then the number of prefetch buffers for storing prefetch data in the buffer set 1404 is further increased. For example, one or more of the following storage elements can be additionally allocated as prefetch buffers if the serial chain 1512 is connected to the DMA controller 1215*a*: data registers 1264*j*(1) through 1264*j*(n10) in flash devices 1262*j*(1) through 1262*j*(n10), respectively; data registers 1264*k*(1) through 1264*k*(n11) in flash devices 1262*k*(1) through 1262*k*(n11), respectively; data registers 1264*l*(1) through 1264*l*(n12) in flash devices 1262*l*(1) through 1262*l*(n12), respectively; flash memory controller buffer 1211*j* in flash memory controller 1210*j*; flash memory controller buffer 1211*k* in flash memory controller 1210*k*; and flash memory controller buffer 1211*l* in flash memory controller 1210*l*.

Additionally or alternatively, for example, one or more of the following storage elements can be additionally allocated as prefetch buffers if the serial chain 1520 is connected to the DMA controller 1215*b*: data registers 1264*m*(1) through 1264*m*(n13) in flash devices 1262*m*(1) through 1262*m*(n13), respectively; data registers 1264*n*(1) through 1264*n*(n14) in flash devices 1262*n*(1) through 1262*n*(n14), respectively; data registers 1264*o*(1) through 1264*o*(n15) in flash devices 1262*o*(1) through 1262*o*(n15), respectively; flash memory controller buffer 1211*m* in flash memory controller 1210*m*; flash memory controller buffer 1211*n* in flash memory controller 1210*n*; and flash memory controller buffer 1211*o* in flash memory controller 1210*o*. Since an expanded number of prefetch buffers permits more storage of prefetch data, the buffer set 1404 further reduces latency in memory read operations.

Figure 17:
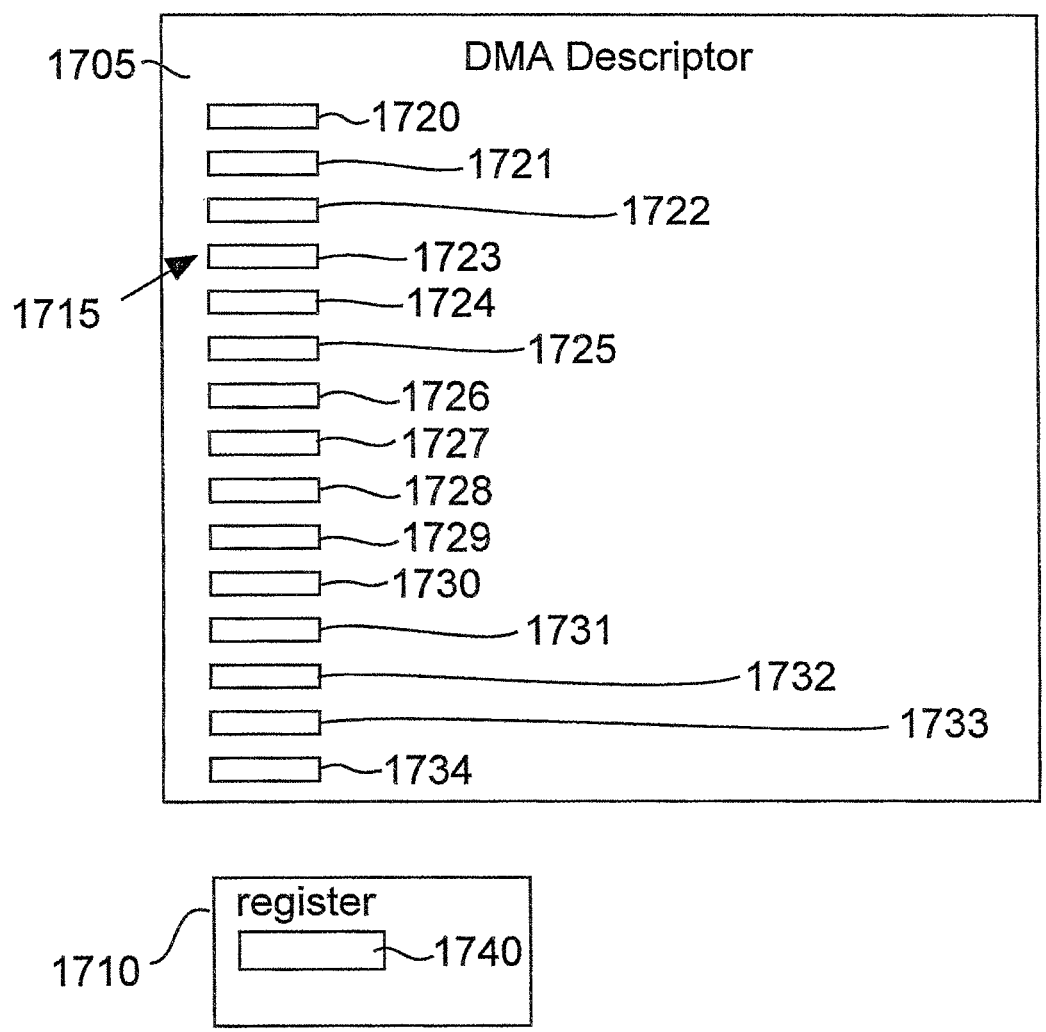
FIG. 17 is a block diagram of a descriptor and a register for permitting a DMA controller to select a serial chain among a plurality of serial chains for performing a given memory transaction in a memory interface, in accordance with an embodiment of the invention.
Figure 18:
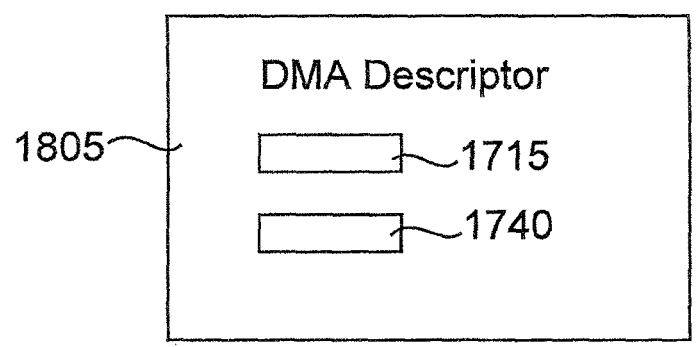
FIG. 18 is a block diagram of a descriptor for permitting a DMA controller to select a serial chain among a plurality of serial chains for performing a given memory transaction in a memory interface, in accordance with an embodiment of the invention.

Reference is now made to FIGS. 16, 17, and 18 in order to discuss an example of a DMA controller 1215 that intelligently determines and intelligently selects a serial chain among a plurality of serial chains for performing a given memory transaction in a memory interface (e.g. memory interface 1205 in FIG. 13), in accordance with an embodiment of the invention. In particular, FIG. 16 is a block diagram that illustrates at least some of the components in an expandable (or configurable) two-dimensional memory 1276 according to an embodiment of the invention, while FIGS. 17 and 18 are block diagrams that illustrate control data used by a DMA controller 1215 for intelligently selecting a serial chain for performing a memory transaction.

In FIG. 16, the DMA controller 1215 is directly coupled to the first serial chain 1290 and is also directly coupled to a second serial chain 1512.

FIG. 17 is a block diagram of a descriptor 1705 and a register 1710 for permitting a DMA controller 1215 to intelligently select a serial chain among a plurality of serial chains for performing a given memory transaction in a memory interface (e.g., memory interface 1205 in FIG. 13), in accordance with an embodiment of the invention.

The DMA descriptor 1705 is loaded by a local processor 1220 (FIG. 13) into a DMA controller memory 1605 (FIG. 16) of the DMA controller 1215. The DMA descriptor 1705 is configurable via software (or firmware) 1610 that is shown in FIG. 16 and that is executed by the local processor 1220 (FIG. 13). The DMA descriptor 1705 comprises control information 1715 that will control a given memory transaction to be performed by the DMA controller 1215. As an example, the DMA controller 1215 intelligently determines and intelligently selects one of the serial chains 1290 or 1512 for use in a given memory transaction. Of course, more than two serial chains can be directly coupled to the DMA controller 1215, and the DMA controller 1215 intelligently selects a serial chain among the more than two serial chains for use in a given memory transaction.

As an example, the control information 1715 includes at least some of the following: the amount 1720 of bytes of the data to be transferred in the memory transaction, the source address 1721 of the data to be transferred in the memory transaction, the destination address 1722 of the data to be transferred in the memory transaction, the serial chain identifier 1723 that identifies the serial chain used for the data to be transferred in the memory transaction, the memory module identifier 1724 that identifies the memory module 1260 used for the data to be transferred in the memory transaction, the flash memory device identifier 1725 that identifies the flash memory device 1262 used for the data to be transferred in the memory transaction, the flash page address 1726 of the flash page 1265 (FIG. 12) used for the data to be transferred in the memory transaction, the flash memory bus identifier 1727 that identifies the flash memory bus 1258 used for the data to be transferred in the memory transaction, the DMA-controller-to-Memory-controller bus identifier 1728 that identifies the DMA-controller-to-Memory-controller bus 1505 used for the data to be transferred in the memory transaction, the link identifier 1729 that identifies a link 1280 (if applicable) used for the data to be transferred in the memory transaction, a physical block address (PBA) to logical block address (LBA) mapping 1730 for providing a PBA-to-LBA mapping of the data to be transferred in the memory transaction, the row 1731 and the column 1732 of a LUN (logical unit number) used for the memory transaction, a pointer 1733 (if applicable) that points to the data to be transferred in the memory transaction, and other information 1734 used for the memory transaction.

The register 1710 is a command/status register 1710 in an embodiment of the invention. The register 1710 is in the DMA controller 1215. The register 1710 is configurable via software (or firmware) 1610 that is shown in FIG. 16 and that is executed by the local processor 1220 (FIG. 13). The register 1710 includes control information 1740 used for the memory transaction and will advantageously relieve a firmware of having to write a descriptor that would have this control information 1740.

The control information 1740 in the register 1710 identifies the elements in the serial chains 1290 and 1512. For example, the control information 1740 identifies the elements in the serial chain 1290 such as, for example, the flash memory controllers 1210*a*, 1210*c*, and 1210*g*, the memory modules 1260*a*, 1260*c*, and 1260*g*, the links 1280*a*, 1280*d*, and 1280*g*, the DMA-controller-to-Memory-controller bus 1505*a*, the memory buses 1258*a*(1)-1258*a*(m1), 1258*c*(1)-1258*c*(m3), 1258*f*(1)-1258*f*(m6), wherein m6 is an integer, and the flash memory devices 1262 (FIG. 13) in the memory modules 1260*a*, 1260*c*, and 1260*g*. For example, the control information 1740 identifies the flash memory devices 1262*a*(1) through 1262*a*(n1) as included in the memory module 1260*a* wherein n1 is an integer and identifies the other flash memory devices 1262 in the other memory modules 1260*c* and 1260*g*.

The control information 1740 identifies the primary buses (e.g., primary buses 1258*a*(1), 1258*c*(1), and 1258*f*(1) and the failover buses (e.g., failover buses 1258*a*(m1), 1258*c*(m3), and 1258*f*(m6)) in the serial chain 1290.

As another example, the control information 1740 also identifies the elements in the second serial chain 1512 such as, for example, the flash memory controllers 1210*j*, 1210*k*, and 1210*l*, the memory modules 1260*j*, 1260*k*, and 1260*l*, the links 1280*j*, 1280*k*, and 1280*l*, the DMA-controller-to-Memory-controller bus 1505*b*, the memory buses 1258*g*(1)-1258*g*(m7), 1258*h*(1)-1258*h*(m8), 1258*i*(1)-1258*i*(m9) wherein m7, m8, and m9 are each an integer, and the flash memory devices 1262 (FIG. 13) in the memory modules 1260*j*, 1260*k*, and 1260*l*. For example, the control information 1740 identifies the flash memory devices 1262*j*(1) through 1262*j*(n16) as included in the memory module 1260*j* wherein n16 is an integer and identifies the other flash memory devices 1262 in the other memory modules 1260*k* and 1260*l*.

The control information 1740 also identifies the primary buses (e.g., primary buses 1258*g*(1), 1258*h*(1), and 1258*i*(1) and the failover buses (e.g., failover buses 1258*g*(m7), 1258*h*(m8), and 1258*i*(m9)) in the serial chain 1512.

The control information 1740 also identifies if any of the DMA-controller-to-Memory-controller buses 1505*a* and 1505*b* is a failover bus. For example, the control information 1740 sets the DMA-controller-to-memory-controller bus 1505*b* as a failover bus.

FIG. 18 is a block diagram of a descriptor 1805 for permitting a DMA controller 1215 to intelligently select a serial chain among a plurality of serial chains for performing a given memory transaction in a memory interface (e.g., memory interface 1205 in FIG. 13), in accordance with an embodiment of the invention.

The DMA descriptor 1805 is loaded by the local processor 1220 (FIG. 13) into the DMA controller memory 1605 (FIG. 16) of the DMA controller 1215. The DMA descriptor 1805 is configurable via software (or firmware) 1610 that is shown in FIG. 16 and that is executed by the local processor 1220 (FIG. 13). The DMA descriptor 1805 comprises control information 1715 that will control a given memory transaction to be performed by the DMA controller 1215 as similarly discussed above. The DMA descriptor 1805 also comprises control information 1740 that identifies the elements in the serial chains 1290 and 1512, as similarly discussed above. If the DMA descriptor 1805 is loaded into the DMA controller memory 1605, then the control information 1740 is not required to be loaded into a command/status register 1710 in the DMA controller 1215.

Figure 19:
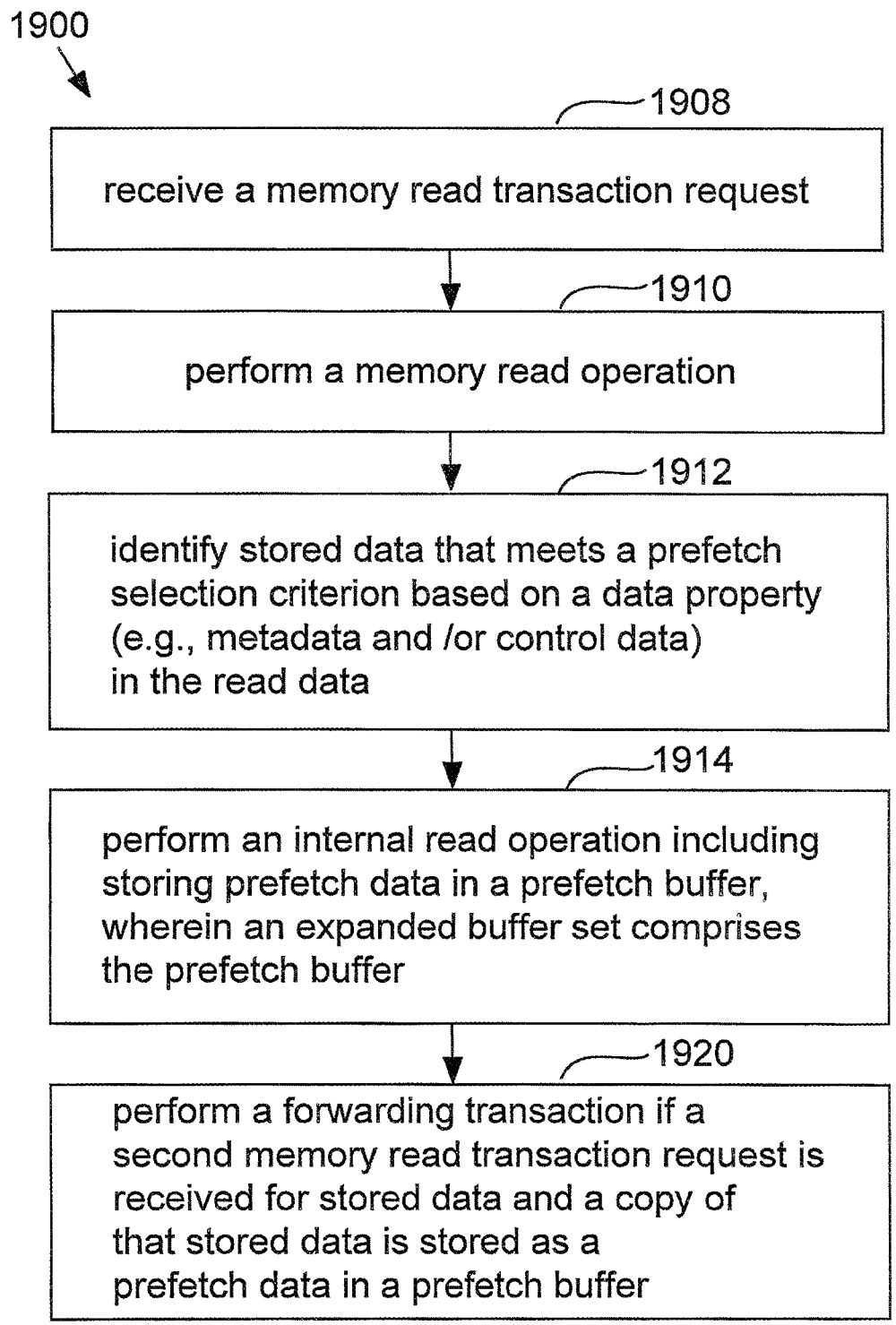
FIG. 19 is a flow diagram that illustrates a method, in accordance with another embodiment of the invention.

FIG. 19 is a flow diagram that illustrates a method 1900, in accordance with another embodiment of the invention.

Under the method shown, a memory read transaction request is received 1908 by the memory interface 1205. For example, as shown in FIG. 14, a host 1236 may send a first memory read transaction request 1268 to the storage apparatus 1201, which uses host interface 1230 to receive memory read transaction requests 1268. A memory read operation is then performed 1910. This read operation may be performed by the memory interface 1205 by obtaining read data requested by the host 1236 from one or more memory modules. For example, in FIG. 14, a memory module 1262 responds to a memory read transaction request 1268 and obtains read data (stored data 1450) from a memory module 1262, returning read data to the host 1236 if this data is available.

The local processor 104 identifies 1912 data currently stored in a memory module 1262 that meets a prefetch selection criterion. For example, in FIG. 14, the local processor 1220 identifies stored data in a memory module 1262 wherein the stored data meets a prefetch selection criterion based on a data property (e.g., metadata and/or control data) in the read data.

If prefetch data is identified, an internal read operation is performed 1914. For example, in FIG. 14, the memory interface 1205 causes a flash device in a memory module 1262 that holds this prefetch data, such as prefetch data 1402, to transfer the prefetch data 1402 from a flash page storing the prefetch data. Additionally, the internal read operation includes the local processor 1220 allocating a buffer as a prefetch buffer in the buffer set 1404 for storing prefetch data 1402. The internal read operation further includes storing prefetch data 1402 in a prefetch buffer, wherein the expanded buffer set 1404 comprises the prefetch buffer. In an embodiment of the invention, the memory interface 1205 can allocate an increased number of prefetch buffers in the X-direction 1273 and/or Y-direction 1275.

If a second memory read transaction request 1271 is received for data and that data is stored as prefetch data in a prefetch buffer, a forwarding transaction is performed 1920. For example, referring to FIG. 14, if a second memory read transaction request 1271 is received for data and that data is stored as prefetch data in a prefetch buffer (e.g., memory controller buffer 1211g that has been allocated as a prefetch buffer), the local processor 1220 responds to memory read transaction request 1271 and retrieves the prefetch data from the prefetch buffer. The local processor 1220 forwards the prefetch data from the prefetch buffer to the local memory 1225. The local processor 1220 forwards the prefetch data from the local memory 1225 to a host 1236. This transfer of prefetch data from expanded buffer set 1404 to the local memory 1225 is not depicted in FIG. 14 to avoid overcomplicating this disclosure herein in this application. In this example, the flash devices function as mass storage devices. However, in another embodiment (not shown), these flash devices may function as a cache to another type of storage device such as, for example, a set of HDDs arrange in a RAID, JBOD, or other configuration. As an example, this set of HDDs is not shown in the drawings to avoid overcomplicating the disclosure herein, but may be included as part of the memory modules 1262 in FIG. 14.

Accordingly, embodiments of the invention provides various features described herein. For example, in an embodiment of the invention, a storage apparatus, comprises: a memory interface comprising an expandable architecture; wherein the memory interface comprises at least a first DMA (direct memory access) controller and a second DMA controller; wherein the first and second DMA controllers are coupled in parallel to a system bus; wherein the memory interface further comprises a first memory controller coupled to the first DMA controller and a second memory controller coupled to the second DMA controller.

As another example, in another embodiment of the invention, a method comprises: determining if stored data meets a prefetch selection criterion, in response to a memory read transaction request and read operation; storing prefetch data in a prefetch buffer if the stored data meets a prefetch selection criterion, wherein an expanded buffer set comprises the prefetch buffer; and forwarding the prefetch data from the prefetch buffer in response to a second memory read transaction request.

As another example, in yet another embodiment of the invention, article of manufacture comprises: a non-transitory computer-readable medium having stored thereon instructions operable to permit an apparatus to: determine if stored data meets a prefetch selection criterion, in response to a memory read transaction request and read operation; store prefetch data in a prefetch buffer if the stored data meets a prefetch selection criterion, wherein an expanded buffer set comprises the prefetch buffer; and forward the prefetch data from the prefetch buffer in response to a second memory read transaction request.

As another example, in an embodiment of the invention, an apparatus comprises: a multi-dimensional memory that is expandable in a first direction; wherein the multi-dimensional memory comprises a serial chain; wherein the serial chain comprises a first serial chain that is expandable in a first direction; and wherein the first serial chain comprises a first memory controller, a first memory module coupled to the first memory controller, a second memory controller coupled to the first memory controller, and a second memory module coupled to the second memory controller.

As another example, in another embodiment of the invention, a method comprises: providing a multi-dimensional memory that is expandable in a first direction; wherein the multi-dimensional memory comprises a serial chain; wherein the serial chain comprises a first serial chain that is expandable in a first direction; and wherein the first serial chain comprises a first memory controller, a first memory module coupled to the first memory controller, a second memory controller coupled to the first memory controller, and a second memory module coupled to the second memory controller.

Data can be stored into the serial chain, wherein the data is written by a memory transaction from a host.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable medium (or non-transitory machine-readable medium or non-transient computer-readable medium or non-transitory computer-readable medium) having stored thereon instructions that permit a method (or that permit a computer) to perform any of the inventive techniques described above, or a program or code that can be stored in an article of manufacture that includes a non-transient computer readable medium (non-transitory computer readable medium) on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A storage system, comprising:
    a storage system processor connected to a central node of an expandable system bus;

a host interface connected to the central node; and
an expandable memory interface, wherein the expandable memory interface includes:
   a plurality of direct memory access (DMA) controllers residing on the expandable system bus, wherein the DMA controllers include a first DMA controller;
   a plurality of expandable serial chains, wherein each expandable serial chain includes:
      a plurality of nonvolatile memory controllers, including:
         a first nonvolatile memory controller directly connected to one of the DMA controllers via a point-to-point link; and
         one or more additional nonvolatile memory controllers;
      a plurality of nonvolatile memory modules, wherein each nonvolatile memory module is coupled to one of the plurality of nonvolatile memory controllers via a memory bus; and
      a serial channel, wherein the serial channel includes a point-to-point connector for each of the one or more additional nonvolatile memory controllers, wherein each point-to-point connector connects a unique pair of the nonvolatile memory controllers; and
   a prefetch buffer, wherein the prefetch buffer comprises a buffer set and wherein the buffer set includes one or more buffers, wherein the one or more buffers include at least one of: a data register of the first nonvolatile memory module, a buffer of the first DMA controller; and a buffer of the first nonvolatile memory controller;
   wherein:
      the expandable system bus is configured to accommodate one or more additional DMA controllers residing on the expandable system bus; and
      each serial chain is configured to accommodate one or more additional nonvolatile memory controllers.

2. The storage system of claim 1, wherein one or more of the nonvolatile memory modules comprises a flash memory device.

3. The storage system of claim 1, wherein:
each DMA controller is connected to one and only one serial chain.

4. The storage system of claim 1, wherein
two or more expandable serial chains are directly connected to the first DMA controller.

5. The storage system of claim 4, wherein the first DMA controller is configured to select, from the two or more expandable serial chains, an expandable serial chain for performing a memory transaction.

6. The storage system of claim 5, wherein the DMA controller includes a DMA descriptor stored in a memory of the first DMA controller, wherein the DMA descriptor comprises control information to control performance of the memory transaction.

7. The storage system of claim 6, wherein the DMA controller is configured to select the expandable serial chain based at least in part on the DMA descriptor.

8. The storage system of claim 7, wherein the control information includes a point-to-point link identifier that identifies the point-to-point link for the memory transaction.

9. The storage system of claim 7, wherein the control information includes a point-to-point connector identifier indicative of a point-to-point connector for the memory transaction.

10. The storage system of claim 1, wherein the host interface is coupled to a plurality of hosts.

11. The storage system of claim 1, wherein the host interface comprise a first host interface coupled to a first host and wherein the storage system includes a second host interface coupled to a second host.

12. A method, comprising:
receiving, by a storage system, a memory transaction from a host, wherein the storage system comprises:
   a storage system processor connected to a central node of an expandable system bus;
   a host interface connected to the central node; and
   an expandable memory interface, wherein the expandable memory interface includes:
      a plurality of direct memory access (DMA) controllers residing on the expandable system bus, wherein the DMA controllers include a first DMA controller;
      a plurality of expandable serial chains, wherein each expandable serial chain includes:
         a plurality of nonvolatile memory controllers, including:
            a first nonvolatile memory controller directly connected to one of the DMA controllers via a point-to-point link; and
            one or more additional nonvolatile memory controllers;
         a plurality of nonvolatile memory modules, including a first nonvolatile memory module, wherein each nonvolatile memory module is coupled to one of the plurality of nonvolatile memory controllers via a memory bus; and
         a serial channel, wherein the serial channel includes a point-to-point connector for each of the one or more additional nonvolatile memory controllers, wherein each point-to-point connector connects a unique pair of the nonvolatile memory controllers; and
      a prefetch buffer, wherein the prefetch buffer comprises a buffer set and wherein the buffer set includes one or more buffers, wherein the one or more buffers include at least one of: a data register of the first nonvolatile memory module, a buffer of the first DMA controller; and a buffer of the first nonvolatile memory controller;
      wherein:
         the expandable system bus is configured to accommodate one or more additional DMA controllers residing on the expandable system bus; and
         each serial chain is configured to accommodate one or more additional nonvolatile memory controllers; and
performing, by the storage system, the memory transaction.

13. The method of claim 12, wherein the memory transaction comprises a memory read transaction and wherein performing the memory transaction includes:
performing an internal read operation responsive to determining that data associated with the memory read transaction satisfies a criteria, wherein performing the internal read operation comprises retrieving prefetch data from DB the prefetch buffer; and
sending, to the host, the prefetch data as read data.

* * * * *